United States Patent
Lynn

(10) Patent No.: US 10,428,732 B2
(45) Date of Patent: Oct. 1, 2019

(54) ROTOR ASSEMBLY FOR AN OPEN CYCLE ENGINE, AND AN OPEN CYCLE ENGINE

(71) Applicant: Xeicle Limited, Central, Hong Kong (CN)

(72) Inventor: Robert Gulliver Lynn, Ashburton (NZ)

(73) Assignee: Xeicle Limited, Central, Hong Kong (CN)

( * ) Notice: Subject to any disclaimer, the term of this patent is extended or adjusted under 35 U.S.C. 154(b) by 935 days.

(21) Appl. No.: 14/787,662

(22) PCT Filed: Apr. 29, 2014

(86) PCT No.: PCT/NZ2014/000077
§ 371 (c)(1),
(2) Date: Oct. 28, 2015

(87) PCT Pub. No.: WO2014/178731
PCT Pub. Date: Nov. 6, 2014

(65) Prior Publication Data
US 2016/0102608 A1   Apr. 14, 2016

(30) Foreign Application Priority Data
Apr. 29, 2013 (NZ) ........................................ 609948

(51) Int. Cl.
*F02C 3/08* (2006.01)
*F02C 3/36* (2006.01)
(Continued)

(52) U.S. Cl.
CPC .................. *F02C 3/36* (2013.01); *F01D 9/02* (2013.01); *F01D 25/24* (2013.01); *F02C 3/04* (2013.01);
(Continued)

(58) Field of Classification Search
CPC .... F02C 3/045; F02C 3/05; F02C 3/08; F02C 3/085; F02C 3/09; F02C 3/103
See application file for complete search history.

(56) References Cited

U.S. PATENT DOCUMENTS 2,514,874 A * 7/1950 Kollsman ............... F01D 15/10
415/142
4,081,957 A * 4/1978 Cox, Jr. .................... F23R 3/14
60/737
(Continued)

FOREIGN PATENT DOCUMENTS

EP          2400137       12/2011
KR   10 2004 0097 968    11/2004
(Continued)

OTHER PUBLICATIONS

International Search Report for International Application No. PCT/NZ2014/000077 dated Nov. 6, 2014 (3 pages).

*Primary Examiner* — Gerald L Sung
(74) *Attorney, Agent, or Firm* — Merchant & Gould P.C.

(57) ABSTRACT

A rotor assembly for an engine, comprising: a rotor, supported on bearings for axial rotation, a rotor portion forming a compression passage extending outwards from the axis, gases entering the rotor through inlets at the axis and flowing outwards through the compression passage; a combustion chamber supported within the compression passage near the maximum radius of the rotor having a closed outer end and combustion chamber gases inlets through which gases enter the combustion chamber, each combustion chamber having a fuel inlet, and; one or more expansion passages in fluidic connection with and extending radially inwards from the combustion chamber within a compression passage and fluidically connecting at or near the rotor axis to a combustion gas outlet tube that extends along the rotor axis, combustion gases created by combustion of fuel with inlet
(Continued)

gases within the combustion chamber expanding as they flow inwards through the expansion passage.

47 Claims, 13 Drawing Sheets

(51) Int. Cl.
| | |
|---|---|
| *F02C 3/16* | (2006.01) |
| *F01D 9/02* | (2006.01) |
| *F01D 25/24* | (2006.01) |
| *F02C 3/04* | (2006.01) |
| *F02C 7/14* | (2006.01) |
| *F02C 7/22* | (2006.01) |
| *F02C 7/24* | (2006.01) |
| *F02C 7/28* | (2006.01) |
| *F23R 3/00* | (2006.01) |
| *F23R 3/28* | (2006.01) |
| *F23R 3/42* | (2006.01) |
| *F01D 15/08* | (2006.01) |

(52) U.S. Cl.
CPC .............. *F02C 3/16* (2013.01); *F02C 3/165* (2013.01); *F02C 7/14* (2013.01); *F02C 7/222* (2013.01); *F02C 7/24* (2013.01); *F02C 7/28* (2013.01); *F23R 3/002* (2013.01); *F23R 3/007* (2013.01); *F23R 3/28* (2013.01); *F23R 3/42* (2013.01); *F01D 15/08* (2013.01); *F02C 3/08* (2013.01); *F05D 2220/32* (2013.01); *F05D 2240/24* (2013.01); *F05D 2240/35* (2013.01); *F05D 2240/50* (2013.01); *F05D 2240/55* (2013.01); *F05D 2260/85* (2013.01); *F05D 2300/121* (2013.01); *F05D 2300/2261* (2013.01); *F05D 2300/2283* (2013.01); *F05D 2300/603* (2013.01); *Y02E 20/16* (2013.01); *Y02T 50/672* (2013.01); *Y02T 50/6765* (2018.05)

(56) References Cited

U.S. PATENT DOCUMENTS

| | | | | |
|---|---|---|---|---|
| 4,912,931 | A * | 4/1990 | Joshi | F23C 6/045 |
| | | | | 60/732 |
| 6,151,882 | A * | 11/2000 | Cavanagh | F02C 3/045 |
| | | | | 60/226.1 |
| 6,244,034 | B1 * | 6/2001 | Taylor | F02C 6/16 |
| | | | | 60/39.094 |
| 6,260,349 | B1 * | 7/2001 | Griffiths | F01D 1/10 |
| | | | | 60/39.17 |
| 2007/0137216 | A1 * | 6/2007 | Joshi | F02C 3/10 |
| | | | | 60/791 |
| 2009/0241549 | A1 * | 10/2009 | Clay | F01D 1/32 |
| | | | | 60/767 |
| 2010/0288429 | A1 * | 11/2010 | Mathon | B29C 70/541 |
| | | | | 156/243 |

FOREIGN PATENT DOCUMENTS

| | | |
|---|---|---|
| WO | WO 2005/017332 | 2/2005 |
| WO | WO 2007/129032 | 11/2007 |

* cited by examiner

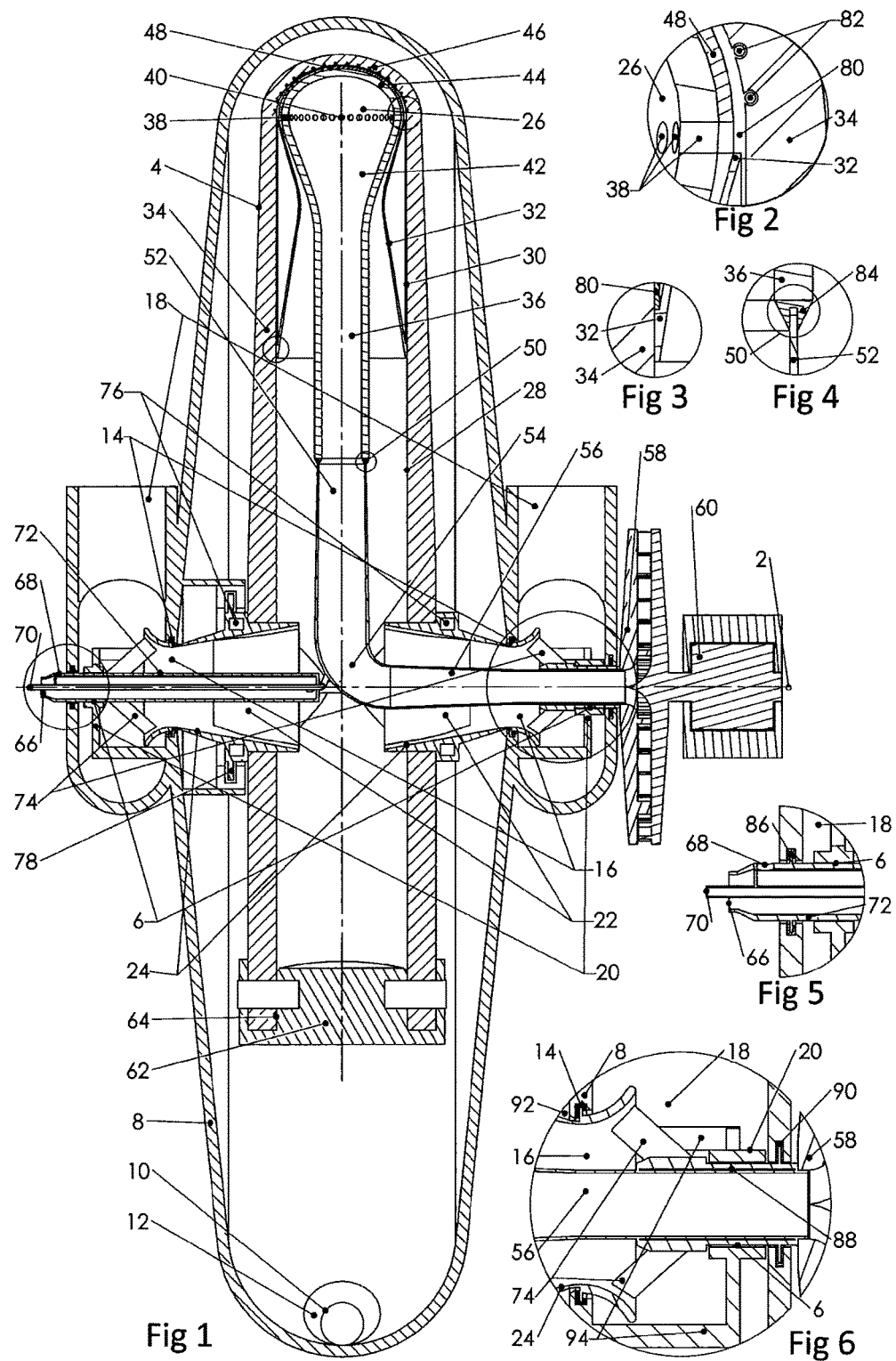

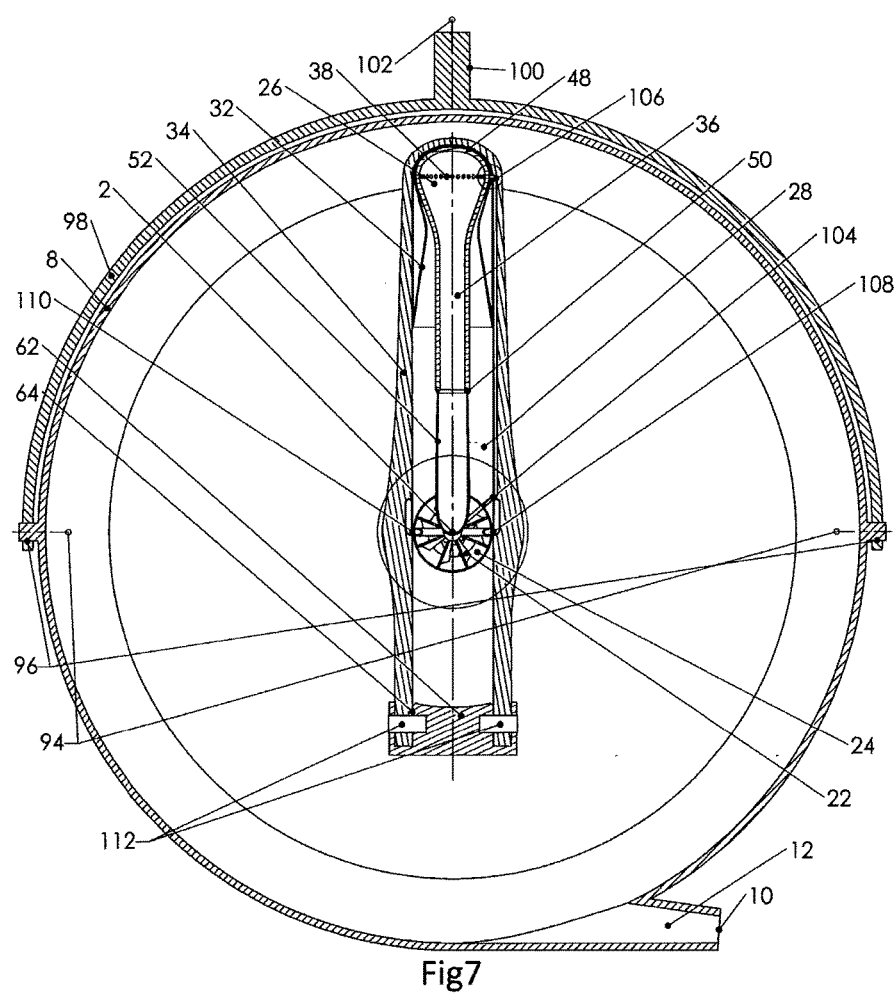
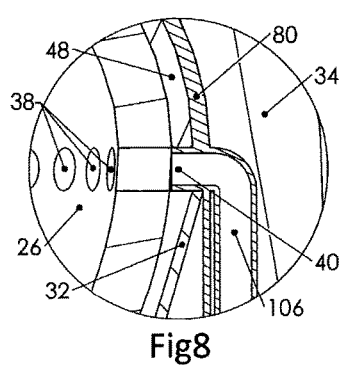
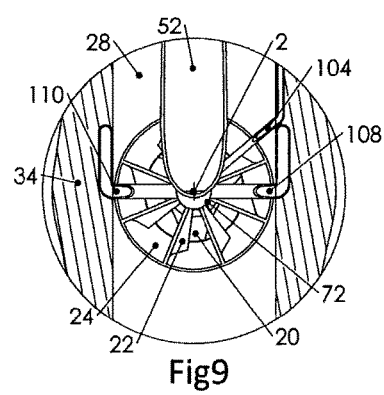
Fig7
Fig8
Fig9

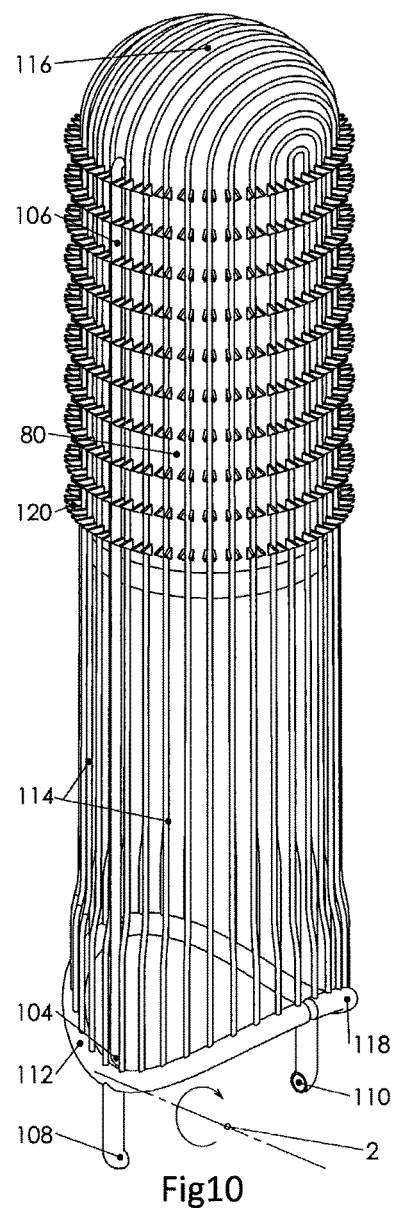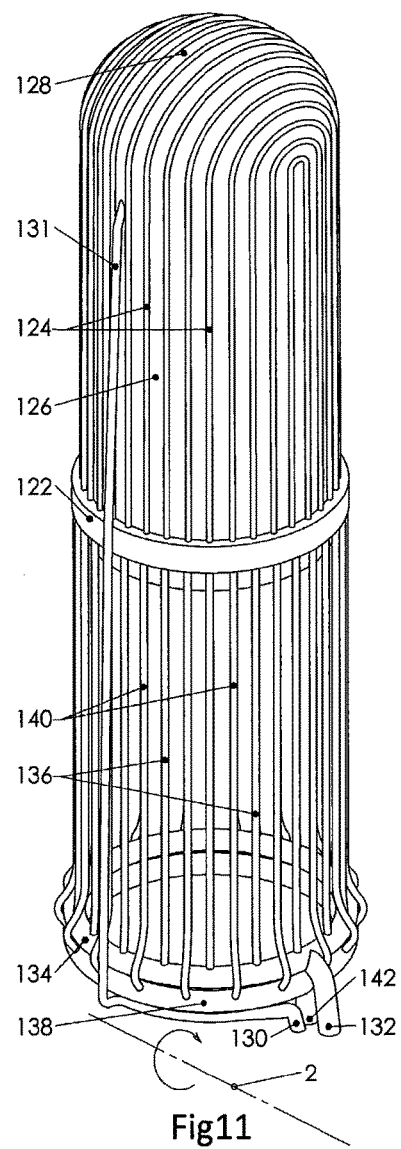

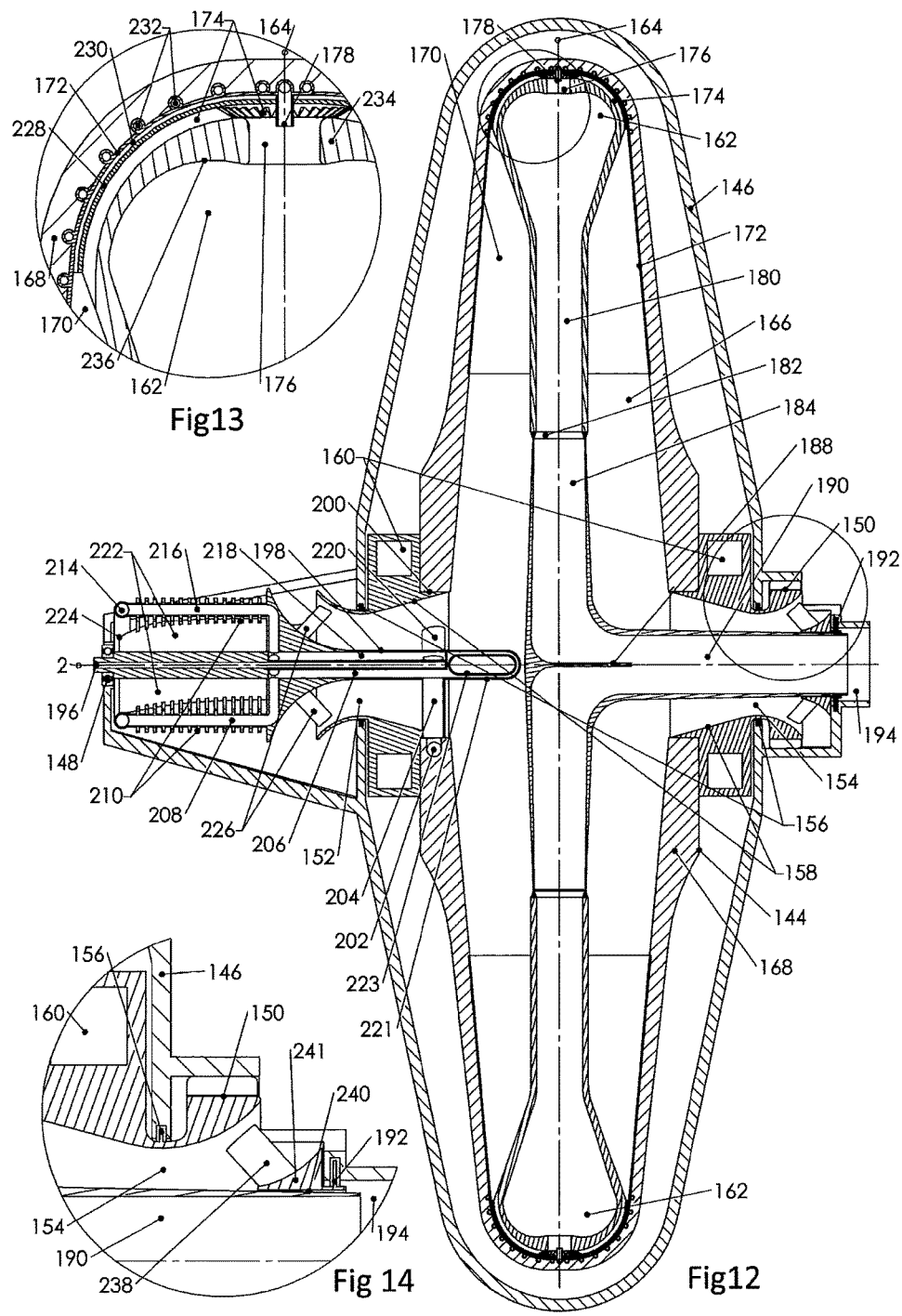

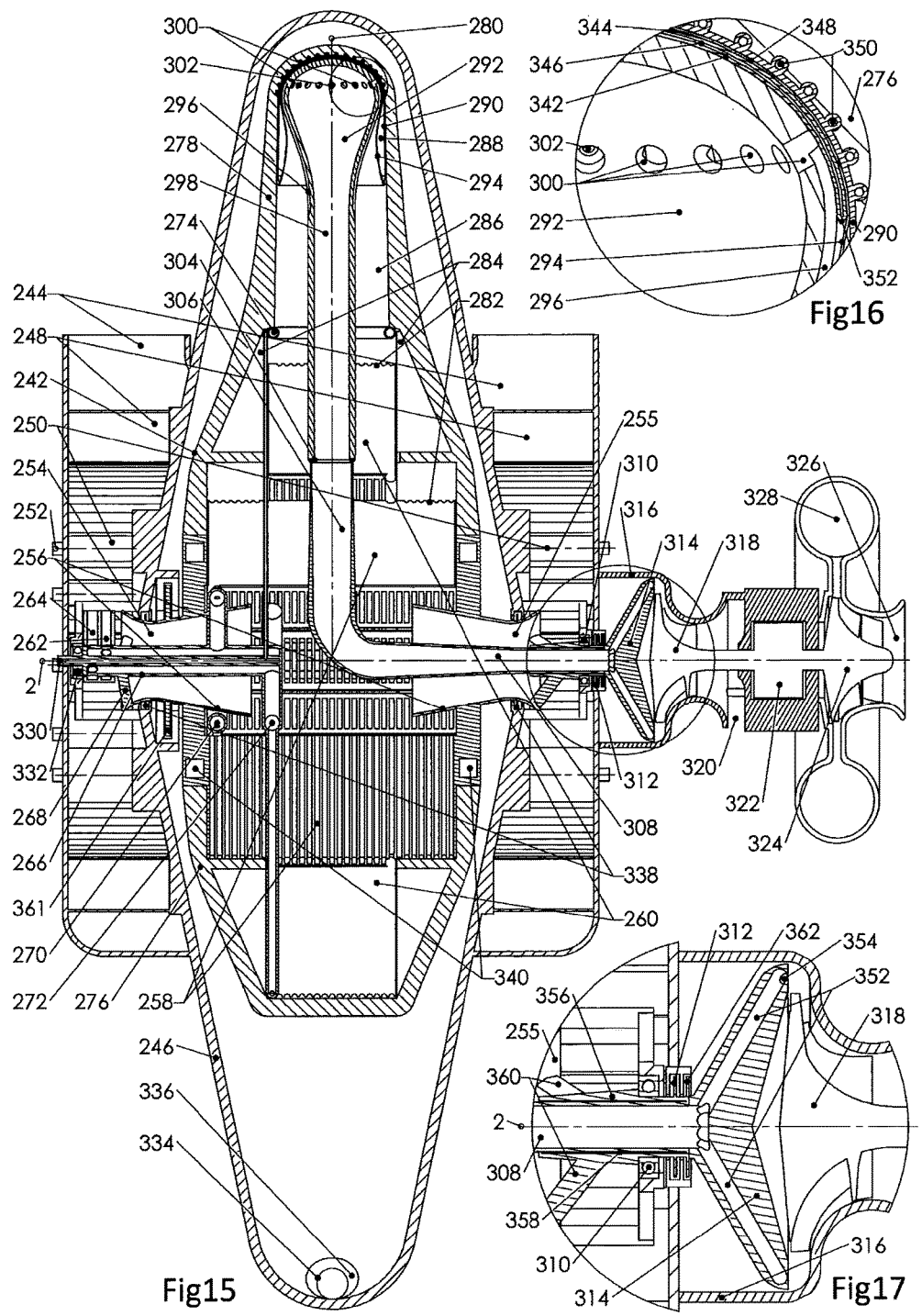

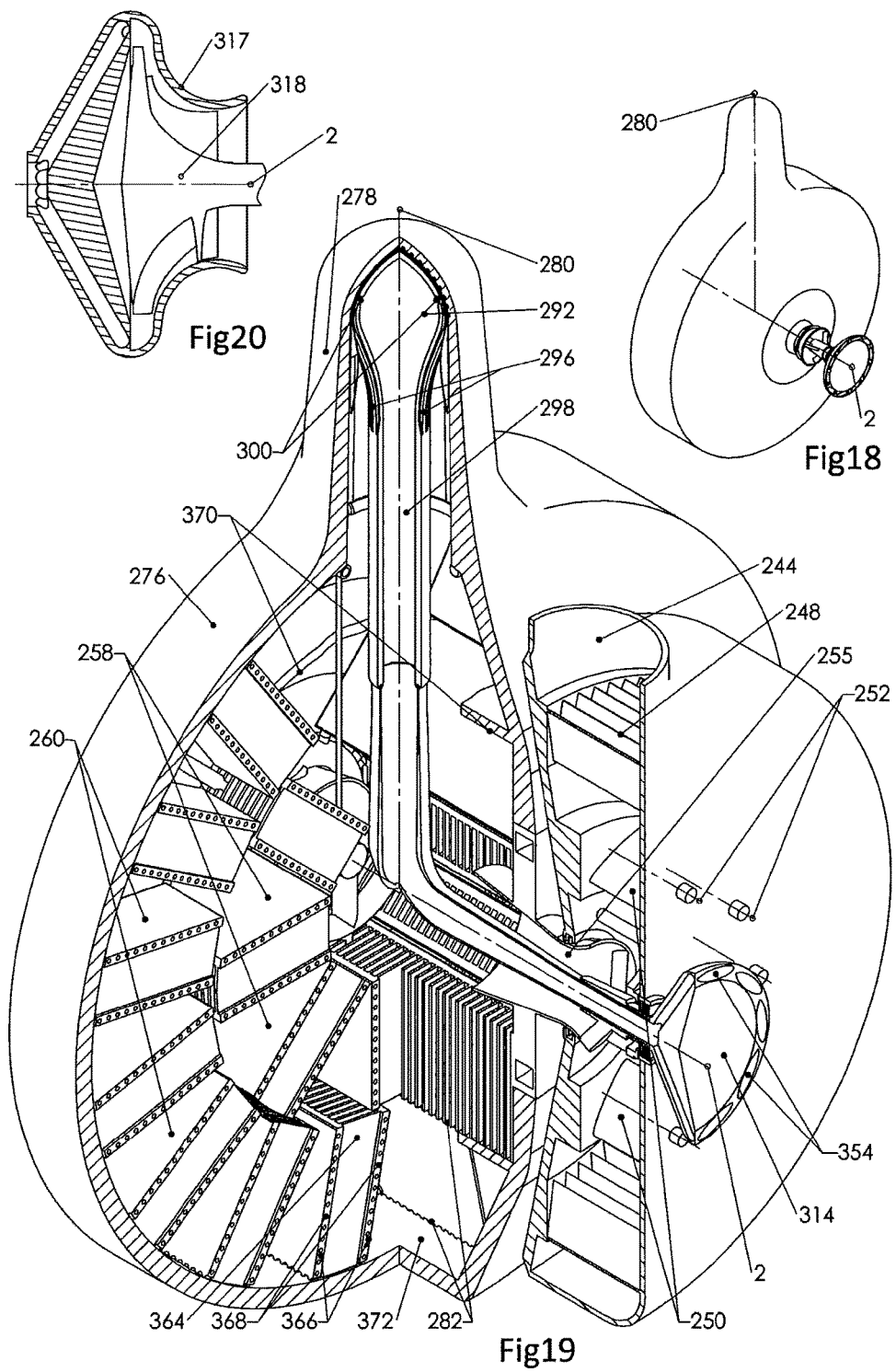

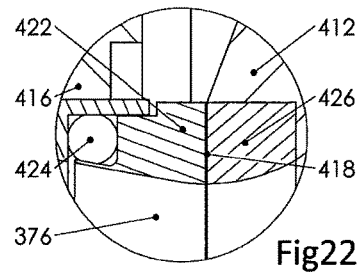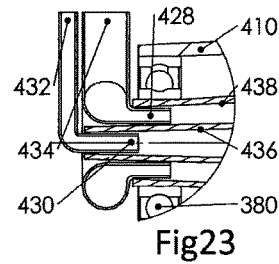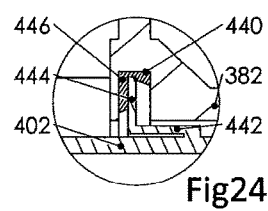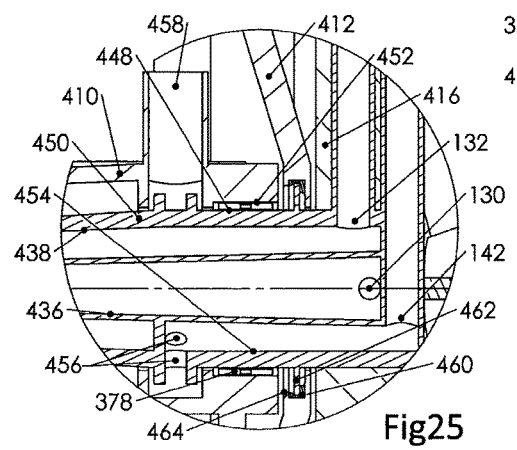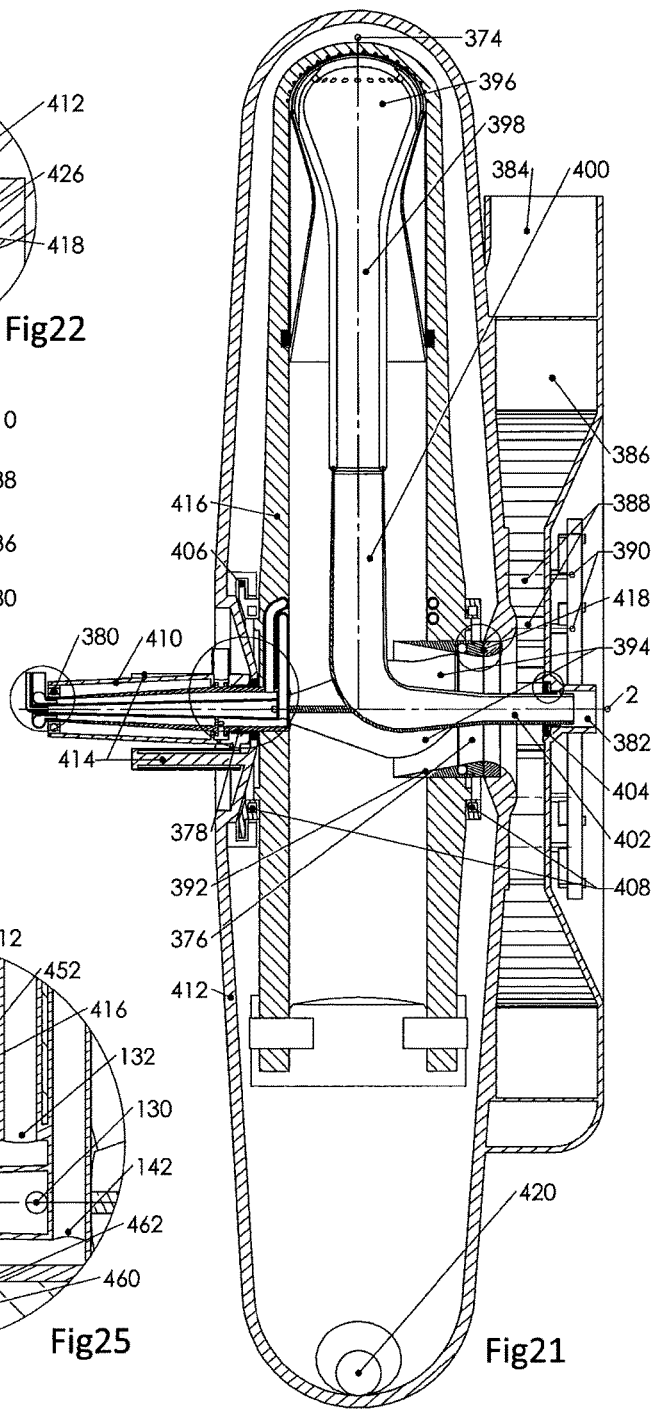

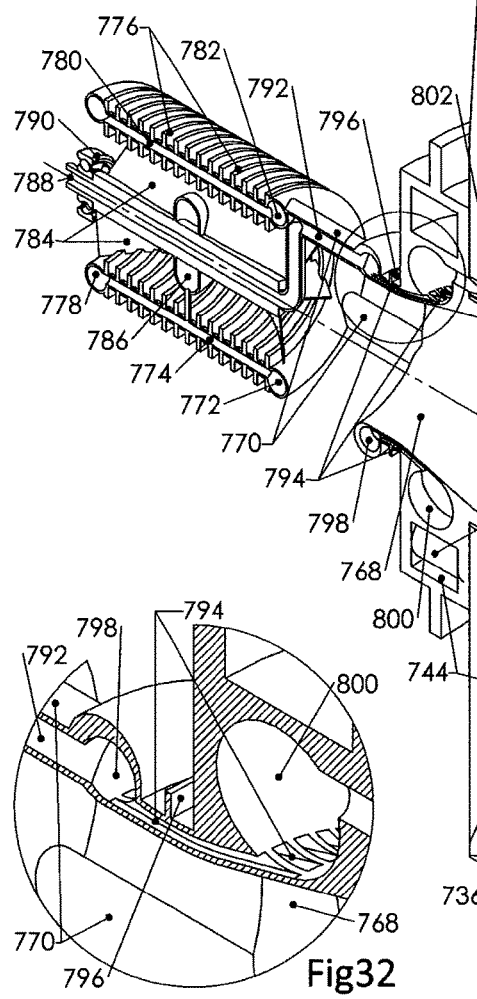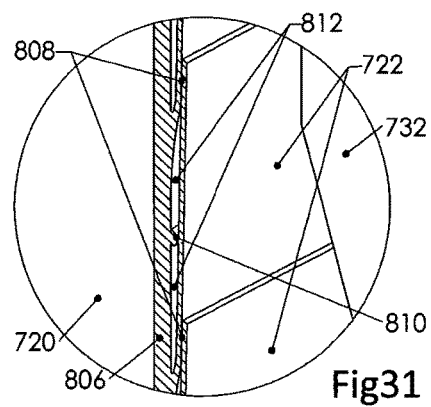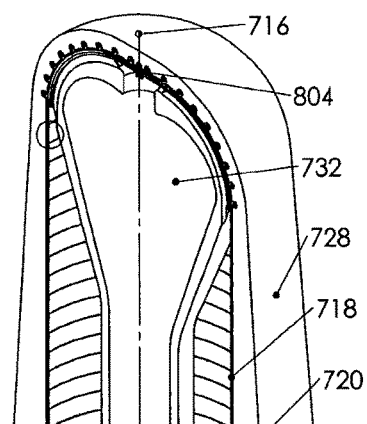

ROTOR ASSEMBLY FOR AN OPEN CYCLE ENGINE, AND AN OPEN CYCLE ENGINE

This application is a National Stage Application of PCT/NZ2014/000077, filed 29 Apr. 2014, which claims benefit of Serial No. 609948, filed 29 Apr. 2013 in New Zealand and which applications are incorporated herein by reference. To the extent appropriate, a claim of priority is made to each of the above disclosed applications.

FIELD OF THE INVENTION

The present invention relates to an open cycle gas turbine engine. More particularly, the present invention relates to a pressure gain rotor (hereinafter "rotor") assembly for an open cycle gas turbine engine that has at least one rotor which rotates about a rotor axis inside a windage reducing casing, and which rotor contains at least one compression passage that provides a conduit for air to flow from one or more air inlets at or near the rotor axis to at least one combustion chamber distal the rotor axis in which the air is heated by combustion with a fuel, an expansion passage connected to each said combustion chamber through which the combustion gases expand to exit the rotor through one or more combustion gas outlet(s) at or near the rotor axis at elevated pressure relative to the rotor inlet air, the combustion gas outlet(s) of the rotor being connectable to an external turbine through which the combustion gases may expand to produce work, the rotor in combination with an external turbine forming a gas turbine engine.

BACKGROUND TO THE INVENTION

Thermodynamic engines utilize a working fluid such as air undergoing continuous or cyclic thermodynamic process in order to create mechanical work output. In most engines the working fluid is compressed then heat energy is added to it before it is expanded to produce a net work output. Increasing the amount of compression or the amount of heat energy added generally serves to increase the efficiency. In general the most desirable combination of characteristics for such a thermodynamic engine is compact size, low mass, low cost and high efficiency. Additionally the ability to operate on a variety of fuels may be advantageous for some applications. Examples of typical thermodynamic engines are given below.

Internal Combustion Engines

Amongst the most common engines are internal combustion (IC) engines in which the working fluid air, or an air fuel mixture, is compressed in an enclosed volume by the movement of a piston and is then heated by igniting the air fuel mixture (spark ignition) or by introducing and burning fuel (diesel), before being expanded against the piston to extract work. While the theoretical efficiency of a lossless internal combustion engine may be high, in practice there are many loss mechanisms that reduce their efficiency including: unwanted heat transfer from the gases to the engine walls, friction between moving parts, flow losses in valves and passages caused by high flow velocities and turbulence.

Diesel engines are generally the most efficient internal combustion engines and are up to about 40% efficient in cars, 45% in trucks, and just over 50% in very large ship engines. However, diesels also suffer from a number of serious disadvantages: they typically require vibration and noise suppression systems, they create a lot of waste heat to be dissipated by heavy and bulky coolers, they may produce unacceptable emissions requiring emissions treatment systems, they are also typically bulky and heavy making them unsuitable for many applications. It is therefore an objective of the current invention to provide an engine that is efficient and relatively quiet and vibration free when compared to IC engines, as well as requiring no or relatively little exhaust emissions treatment compared to internal combustion engines.

Internal combustion engines are frequently developed to make use of a specific fuel formulation such as Diesel, Ethanol or Natural Gas, and in some cases may not be able to run on other fuels even when those other fuels may be preferable for reasons of cost, availability or reduced emissions. It is therefore an objective of the current invention to provide an engine that has the potential to allow for running on a variety of fuels with minimal modification, or to at least provide the public with a useful choice.

Gas Turbines

Simple cycle gas turbines (GT) engines are based on the ideal thermodynamic Brayton cycle in which the gas undergoes adiabatic compression followed by isobaric heat addition, adiabatic expansion and finally isobaric heat rejection. In practice GT engines generally use a turbo compressor to compress ambient air and deliver it under pressure to a combustion chamber where fuel is burnt at approximately constant pressure producing combustion gases that are then expanded through a turbine where work is extracted to drive the compressor and supply external loads.

GT engine efficiency generally increases with increasing compressor pressure ratio, but material temperature limits and compressor and turbine inefficiencies limit the practical maximum pressure ratios and efficiencies. In practice GT engines can achieve efficiencies of about 40% in large sizes (higher than 10 MW), but lower compressor and turbine efficiencies in small sizes typically greatly reduce the efficiencies possible at power levels in the sub 100 kW range unless the GT engine is combined with heavy and bulky high temperature heat exchangers such as in recuperated or regenerated Brayton cycles.

GT engines are widely employed in aircraft, ships and power stations where they have some major advantages over IC engines including: high power to mass ratios that can exceed 10 kW/kg with little or no external cooling required. But GT engines also have a number of disadvantages when compared to IC engines of similar power: They are generally less efficient and far more expensive with high precision parts made from expensive materials. Their rotors also have large angular momentum that typically makes them slow to start up and relatively slow to respond to changes in demand. GT engines also generally have relatively limited ratios of efficient maximum to minimum power output.

These disadvantages have severely restricted the applications in which GT engines see common use. It is therefore an objective of the current invention to offer an engine that shares many of the advantages of GT engines while diminishing the listed disadvantages and thereby increase the range of applications for which the engine of the current invention is suitable or at least offer the public a useful choice.

In GT engines the continuous compression and expansion of the gases is typically achieved using one or more compressor and turbine stages respectively. It is these compressor and turbine stages that are the principal source of inefficiency in GT engines.

In each compressor stage the working fluid, normally air, is subjected to an increase in pressure as a result of a work input that generally produces a velocity increase followed by a diffusion process to convert the increased fluid velocity into increased pressure. This process is performed continuously in an axial flow or centrifugal compressor (turbo-compressors) with components rotating relative each other imparting successive velocity and pressure changes to the working fluid.

GT compressors typically have a relatively small range of flow rates over which they can sustain close to their maximum pressure ratio owing to blade stall and sonic choking. This acts to limit the range of power outputs over which high GT engine efficiencies can be maintained. It is therefore an objective of the current invention to offer a method for achieving a continuous compression process in which high pressure ratios may be maintained over a wider range of flow rates with very high efficiencies in both small and large engines, and in which a large range of power outputs from an engine may be efficiently attained, or to at least offer the public a useful choice.

In each GT turbine stage the working fluid, most normally air combined with fuel combustion products, undergoes reductions in pressure and temperature as the expanding gas produces work output. This process can be performed continuously in an axial flow or radial inflow turbines with components rotating relative each other imparting successive velocity and pressure changes to the working fluid.

To achieve high efficiencies some GT engines with over 10 MW output operate with turbine inlet temperatures of up to 1600° C., far beyond the melting temperatures of the materials that they are made of, and relying upon very complex and intricate cooling methods to allow them to survive. Owing to a number of economic and physical factors these cooling methods are not normally applied in smaller engines, thereby typically limiting the maximum combustion temperatures in relatively small gas turbine engines (less than 1 MW output) to less than 1000° C. and consequently limiting achievable efficiencies. It is therefore an objective of the current invention to offer a method for continuous expansion of combustion gases that allows high combustion and gas temperatures to be utilized in relatively low power output engines or at least offer the public a useful choice.

Conventional GT compressors and turbines typically have gases flowing through them at velocities of hundreds of meters per second, and are subject to many inefficiencies and loss mechanisms that reduce the overall compression and expansion efficiencies possible within conventional turbomachinery. These losses include: mechanical friction in seals and bearings, viscous gas losses that are primarily associated with high flow velocities and/or small cross section flow passages fluid friction due to viscosity of gases, turbulence that dissipates pressure, gas leakage from high to low pressure regions such as blade-tip losses where gases leak over the end of blades from the high to the low pressure side and diffusion losses where a reduction in fluid velocity is imperfectly converted to an increase in pressure and unwanted heat transfer that either adds heat during compression or extracts heat during expansion. Most of these losses are generally greater in smaller compressors and turbines and contribute to the lower efficiency of small gas turbine engines relative to internal combustion engines of similar power output. It is therefore an objective of the current invention to offer an engine in which the overall fluid compression and expansion processes can be achieved with greater efficiency than in conventional compressors and turbines, thereby producing an engine with greater efficiency than a conventional GT engine of similar power output, or to at least offer the public a useful choice.

Rotor and stator blades in turbo-compressor and turbine stages are typically highly loaded and may be required to be formed to precise aerodynamic shapes, in many cases requiring the use of expensive materials and manufacturing processes. In addition, to achieve high engine pressure ratios requires many stages that further increase costs. This may limit the economic viability of GT engines in some applications. It is therefore an objective of the current invention to reduce the overall cost of the components used to achieve continuous compression and expansion processes with high pressure ratios and thereby reduce the overall cost below that of an equivalent conventional GT engine or to at least offer the public a useful choice.

High combustion temperatures, typically above 1600K, can contribute significantly to the formation of undesirable Nitrous Oxides ($NO_x$) emissions, particularly when combined with high pressures and long combustion residence times, the duration for which air is maintained at high temperature during combustion. However, high temperatures and pressures are typically also associated with high engine efficiencies. It is therefore an objective of the current invention to offer the potential for achieving high efficiencies while also limiting the production of $NO_x$, or to at least offer the public a useful choice.

GT engines typically have a very large amount of rotational kinetic energy in the fast spinning compressor and turbine, and the energy required to change the speed of these heavy compressors and turbines typically leads to relatively slow response to changing power demand that may be problematic for some applications.

Large GT engines are frequently combined with steam turbines driven by steam heated by the GT exhaust into Combined Cycle power plants with thermal efficiencies of up to 60%, which discounting fuel cells is the highest efficiency currently widely available for power production from hydrocarbon fuels. They are commonly used for electricity production and in some cases ship propulsion. But while the high efficiency and relatively low cost of Combined Cycle power plants makes them economically attractive for power production, they have some very unattractive attributes as well: In the absence of large volumes of cooling water from a source in the environment cooling towers that utilise the atmosphere for cooling are generally large and impose significant maintenance costs; The amount of stored kinetic energy and stored thermal energy in the steam turbine, steam and other components is very high leading to extremely slow response to changing power demand and start up times that are frequently measured in hours, which may create problems in responding to variable demand or production requirements in an electrical power supply grid and may also occasionally be problematic for ship propulsion. It is therefore an objective of the current invention to offer an engine that has a combination of high efficiency and fast response to power demand changes, or to at least offer the public a useful choice.

Combined Cycle power plants are most efficient in sizes greater than 100 MW output, and lower efficiency in smaller sizes generally leads to bigger sizes being preferred. But such large plants are typically considered unsightly and take up a lot of land area, requiring powerful electrical grid connections, high capacity fuel supplies, and imposing very large localized heat loads on the environment. All of which factors typically lead to the plants being sited far away from cities and towns and taking years to plan, approve and build, while also having increased transmission losses and spending on high-power transmission infrastructure that may together add significantly to the cost of electricity delivered to users. It is therefore an objective of the current invention to provide an engine that can be used to generate electricity at efficiencies competitive with Combined Cycle power plants in far smaller sizes that may be more readily situated close to or within cities and towns, while reducing the time required to install such an engine to far below that required for a Combined Cycle power plant, or to at least offer the public a useful choice.

A wide variety of industrial processes require a supply of compressed air. Compressed air is commonly created by relatively inefficient and expensive processes such as electric motor or engine driven compressors. Additionally electricity typically costs several times as much as fuel for the same amount of energy. It is an therefore an objective of the current invention to provide a means for producing compressed air using a combustible fuel as an energy source and to do so at potentially lower costs than competing air compression technologies, or to at least offer the public a useful choice.

Further objects and advantages of the invention will be brought out in the following portions of the specification, wherein the detailed description is for the purpose of fully disclosing the preferred embodiment of the invention without placing limitations thereon.

The background discussion (including any potential prior art) is not to be taken as an admission of the common general knowledge.

SUMMARY OF THE INVENTION

In a first aspect, the invention may broadly be said to consist in a rotor assembly for an engine, comprising:

a rotor, supported on one or more bearings configured to allow the rotor to rotate about a rotor axis, a portion of the rotor forming at least one compression passage that extends outwards from the rotor axis, gases entering the rotor through rotor gas inlets at or near the rotor axis and flowing outwards from the rotor gases inlets through the one or more compression passages undergoing compression as the rotor rotates;

one or more combustion chambers, each located and supported within a compression passage at or near the maximum radius of the rotor from the rotor axis, each combustion chamber having a closed radially outermost end and one or more combustion chamber gases inlets distributed around the combustion chamber through which gases enter the combustion chamber, each combustion chamber further having at least one fuel inlet adapted to allow fuel to enter the combustion chamber and therein mix and combust;

one or more expansion passages, each in fluidic connection with and extending radially inwards from a combustion chamber within a compression passage and fluidically connecting at or near the rotor axis to a combustion gas outlet tube that extends along the rotor axis, in use combustion gases created by combustion of fuel with inlet gases within the combustion chamber expanding as they flow radially inwards through the expansion passage.

Preferably the outer surface of the outer end of the at least one combustion chamber incorporates external grooves through which gases flow to the combustion chamber inlet or inlets.

Preferably the at least one combustion chamber has a single combustion chamber gases inlet at the radially outermost point of the outer end.

Preferably the combustion chamber gases inlet is further configured for the injection of fuel in use.

Preferably the at least one combustion chamber wall is thicker in the region around the combustion chamber gases inlet.

Preferably the at least one combustion chamber has a plurality of combustion chamber gases inlet holes spaced about the combustion chamber at approximately constant radius from the rotor axis.

Preferably the at least one combustion chamber's gases inlets are formed towards the outer end of the combustion chamber, the outer surface of the outer end of the combustion chamber incorporating external grooves through which gases flows to the combustion chamber gases inlets.

Preferably fuel is injected into the at least one combustion chamber through one or more of the combustion chamber gases inlets.

Preferably the at least one combustion chamber further comprises a thermally insulating layer on part or whole of the inner surface of the outer end.

Preferably each combustion chamber has a domed outermost end.

Preferably the inner end of the at least one combustion chamber transitions from a convex domed outer end into an expansion passage of smaller cross sectional area than the maximum cross sectional area of the combustion chamber.

Preferably the compression and expansion passages are substantially radially aligned.

Preferably the domed outer end of the at least one combustion chamber is held within a complementary radially inwards facing concave cup formed by the outer end of the compression passage, a combustion chamber interlayer located between the combustion chamber and the convex cup, the interlayer formed so as to be compliant/deformable in response to applied stresses.

Preferably the at least one combustion chamber interlayer incorporates thermal insulation.

Preferably the at least one combustion chamber interlayer incorporates both metallic and non-metallic materials.

Preferably the at least one combustion chamber interlayer incorporates elements formed from one or more constituents from a list that includes: powder, fibre, wire.

Preferably at least one combustion chamber interlayer incorporates one or more of: silica, calcium silicate and calcium alumosilicate.

Preferably the combustion chamber interlayer incorporates a plastically flowing material or liquid that may plastically deform or flow during rotor operation.

Preferably the combustion chamber interlayer comprises a sealed double walled metallic shell that contains a plastically deformable material or liquid that may move about within the double walled metallic shell.

Preferably a coolant fluid is circulated through the sealed double walled metallic shell.

Preferably the combustion chamber interlayer incorporates a metallic domed shell in contact with the combustion chamber.

Preferably the at least one combustion chamber comprises a means for increasing the rate of heat transfer to a gas exterior to the combustion chamber to cool the combustion chamber.

Preferably the means for increasing the rate of heat transfer is exterior surface features configured to increase the exterior surface area of the combustion chamber.

Preferably the means for increasing the rate of heat transfer is exterior surface grooves through which gases flow.

Preferably the at least one combustion chamber is configured to increase the rate of heat transfer to a gas exterior to the combustion chamber to cool the combustion chamber.

Preferably an exterior surface of the combustion chamber comprises features that increase the exterior surface area of the combustion chamber.

Preferably the features are exterior surface grooves through which gases flow.

Preferably the at least one combustion chamber is at least partly formed from a ceramic material.

Preferably the at least one combustion chamber is at least partly formed from at least one of: Silicon Carbide, Silicon Nitride, Mullite, Alumina.

Preferably that portion of the rotor that forms the at least one compression passage is formed at least partially from a fibre reinforced polymer composite.

Preferably at least part and preferably all of the length of the at least one compression passage has an inner surface that is tapered inwards with increasing radius from the rotor axis towards the maximum radius of the rotor, so that the inner wall has surface normals that in all areas point at least partially towards the rotor axis.

Preferably the wall thickness of the at least one compression passage decreases with increasing radial distance from the rotor axis towards the maximum radius of the rotor.

Preferably the at least one compression passage has an inner wall coating that is impermeable to air.

Preferably at least the radially outermost portion of the at least one compression passage comprises a metallic inner liner.

Preferably the metallic inner liner is formed from at least one layer of radially overlapping foil rings that are each bonded at their radial innermost end to the inner liner of the compression passage.

Preferably the metallic inner liner is formed from a foil helical spiral, each successive turn of the spiral overlapping one or more previous turns.

Preferably spacing protuberances are formed on the inner liner of at least one compression passage to maintain thermally insulating air gaps along the majority of the length of each foil ring or foil helical spiral.

Preferably a plurality of coolant flow passages are embedded within the wall of the at least one compression passage to form a coolant fluid manifold, the coolant flow passages extending along the compression passage and over and around the outer end and supported by a fibre reinforced polymer composite that overwraps the inner liner, in use a coolant flowing through manifold to cool the metallic inner liner.

Preferably the coolant flow passages are substantially evenly spaced and radially aligned, and substantially follow the curve of the domed outer end of the combustion chamber.

Preferably the coolant flow passages are bonded to the metallic inner liner of at least one compression passage.

Preferably the coolant flow passages extend radially outwards from a coolant distribution tube and a coolant collection tube, each at nearly constant radius from the rotor axis.

Preferably a plurality of inner liner anchors that engage within an encasing fibre reinforcing polymer composite tensile structure are bonded to and distributed over the outer surface of one or more of a list that includes: the compression passage inner liner, coolant flow passages, foil rings, foil helical spiral, the inner liner anchors configured to provide structural support to the components to which the wall anchors are bonded.

Preferably the rotor assembly further comprises a combustion chamber shroud located in the at least one compression passage, the outer end of the shroud substantially coterminous with but outside the perimeter of the base of the combustion chamber outer end so that there is an air gap between the external surface of the combustion chamber and the shroud, the shroud having a constricted waist area through which gases flows radially outwards.

Preferably the combustion chamber shroud is supported off of the inner liner at the radially innermost end of the combustion chamber shroud and/or at the radially outermost end of combustion chamber shroud and/or at multiple locations along the length of the combustion chamber shroud.

Preferably the combustion chamber shroud is partly or wholly constructed from one or more of a list that includes: ceramics, ceramic matrix composites, metal matrix composites, titanium alloys, superalloys and high strength steels.

Preferably the radially outer section of the at least one expansion passage is formed as part of the combustion chamber, the radially inner section of the expansion passage formed separately to the radially outer section of the expansion passage and fluidically connected to the radially outer section by a radial expansion joint that accommodates relative radial motion between the radially inner section and radially outer section while also providing a partial or complete fluid seal to thereby restrict combustion gas leakage into the compression passage.

Preferably at least the inner surface of the radially outer section of the expansion passage tapers inwards towards the rotor axis over at least some portion of its radial extent.

Preferably the radially inner section of the expansion passage is formed from metal.

Preferably at least part of the radially outer section of the expansion passage is formed from a ceramic material.

Preferably the at least one expansion passage has a minimum cross sectional flow area at greater than 50% of the radius of the combustion chamber gases inlets.

Preferably at least part of the expansion passage and/or the combustion gas outlet tube is thermally insulated to reduce the rate of heat transfer from the combustion gases to the gases undergoing compression.

Preferably the bend between the at least one expansion passage and the at least one combustion gas outlet tube contains internal flow vanes.

Preferably the rotor assembly further comprises a rotor casing that forms a shell of revolution within which the rotor rotates, the rotor casing having rotor casing openings at one or both axial ends of the rotor casing on the rotor axis through which fluids may enter and/or exit the rotor.

Preferably the rotor casing is filled with a rotor casing gas with low density relative to the ambient atmosphere surrounding the rotor casing, the rotor casing gas being maintained in partial or complete fluid isolation from the ambient atmosphere during rotor operation by rotor vacuum seals that provide a rotating seal between the rotor and the rotor casing at or near the rotor casing opening or openings.

Preferably the rotor casing gas is of lower average molecular mass than air.

Preferably the rotor casing gas is mostly or wholly composed of one or more gases selected from a list that includes: hydrogen, helium, methane, steam, ammonia.

Preferably the rotor casing has a vacuum pump inlet configured for attachment to a vacuum pump so that gases inside the rotor casing may be evacuated.

Preferably the vacuum pump inlet forms the outer end of a vacuum pump inlet diffuser shaped and oriented such that the diffuser recovers and converts some of the velocity of the rotor casing gases into increased pressure at the vacuum pump inlet.

Preferably the rotor assembly further comprises a vacuum pump configured to operate discontinuously and that may shut down once sufficiently low pressure is achieved within the casing.

Preferably the rotor casing gas is at reduced pressure relative to ambient air.

Preferably the rotor casing is constructed at least partially from fibre reinforced polymeric materials and/or ceramic materials.

Preferably at least part of the outer end of the combustion gas outlet tube extends into or forms part of a combustion gas outlet.

Preferably the combustion gas outlet tube is concentrically located within a rotor gases inlet.

Preferably the rotor has two rotor gases inlets, the combustion gas outlet tube passing through one of the rotor gases inlets, a rotor fuel inlet passing through the other of the rotor gases inlets.

Preferably the rotor assembly has a rotor combustion gas outlet rotary seal that seals between the rotating rotor combustion gas outlet and the adjacent rotor gases inlet.

Preferably the rotor combustion gas outlet rotary seal incorporates one or more of the following: brush seals, gas or liquid lubricated face seals, labyrinth seals, polymeric lip seals and dynamic seals.

Preferably the rotor combustion gas outlet rotary seal incorporates a dynamic seal that uses water or oil as the barrier liquid and as a coolant.

Preferably a clearance seal, such as a labyrinth, brush or gas lubricated face seal, is interposed between the combustion gases and rotor combustion gas outlet rotary seal to reduce the temperature of gases that the rotor combustion gas outlet rotary seal is directly exposed to.

Preferably the at least one compression passage is formed in part from a metallic or ceramic material and is retained against centrifugal reaction forces by a polymer composite band that makes contact with the radially outermost end of the compression passage, the region of mutual contact between compression passage and polymer composite band being separated by a thermally insulating layer.

Preferably the polymer composite band incorporates cooling tubes through which a coolant fluid flows in use.

Preferably the rotor assembly further comprises at least one polymer composite tensile structure configured to encase a combustion chamber within the radially outermost end of at least one compression passage.

Preferably the polymer composite comprises carbon fibre embedded within an epoxy, bismaleimide or polyimide polymer matrix.

Preferably the polymer composite tensile structure further comprises cooling tubes in contact with or embedded within the polymer composite tensile structure through which a coolant fluid flows in use.

Preferably the polymer composites are at least partially constructed by a filament winding process.

Preferably the rotor has a single combustion chamber, and a counterweight element diametrically opposite the combustion chamber, the outer radius of the counterweight element less than the maximum rotor radius.

Preferably the radius of the counterweight element is less than 90% of the maximum rotor radius.

Preferably the rotor is configured so that a braking gas or fluid can be introduced into the rotor casing during operation to rapidly stop rotation of the rotor.

Preferably the braking gas or fluid is water.

Preferably at least one of the rotor vacuum seals is of the barrier liquid type, the barrier liquid having low vapour pressure at the rotor vacuum seal's operating temperature.

Preferably at least one of the rotor vacuum seals is a dynamic seal located between the rotor casing and the rotor, the rotor casing further comprising an annular cavity within which at least part of the rotor vacuum seal rotates with clearance, the annular cavity at least partially filled with the barrier liquid.

Preferably the barrier liquid vapour pressure is less than 100 Pa.

Preferably the barrier liquid is also used for rotor bearing lubrication.

Preferably the barrier liquid in at least one of the rotary vacuum seals is cooled either by cooling of seal components or by circulating through a cooling system away from the rotor vacuum seals.

Preferably evaporated barrier liquid is cooled by condensing vaporised barrier liquid on a cold surface within the rotor casing.

Preferably the cold surface is distributed around the rotor axis as an annular or cylindrical surface that is part of a labyrinth seal or other clearance seal or the like.

Preferably the rotor vacuum seal or seals incorporate a magnetic fluid seal that provides sealing when the rotor is stopped and/or spinning at some range of speeds.

Preferably the rotor vacuum seal incorporates a polymeric seal element that provides sealing when the rotor is stopped and/or spinning at some range of speeds.

Preferably at least one rotor vacuum seal incorporates a gas lubricated face seal.

Preferably at least one gas lubricated face seal element is mounted on an axially compliant mount such as a bellows or polymeric element that allows the faces of the face seal to maintain alignment with close clearance.

Preferably at least one rotor gases inlet is configured to have minimum flow area at or near a rotor vacuum seal.

Preferably at least one rotor gases inlet further comprises an inlet diffuser downstream of the location of minimum cross sectional flow area in the rotor gases inlet.

Preferably the inlet diffuser or diffusers are in general overall form conical frustrums with axis coincident with the rotor axis.

Preferably the inlet diffuser or diffusers further comprise radial vanes at least partially interior to the inlet diffuser.

Preferably at least one rotor gases inlet or inlet diffuser incorporates a gases inlet inducer.

Preferably the gases inlet inducer or inducers are radial vanes with variable helical twist about the rotor axis.

Preferably the rotor assembly further comprises inlet guide vanes mounted on the rotor casing to induce swirl in the gases prior to the gases entering at least one rotor gases inlet.

Preferably the inlet guide vanes are adjustable during operation of the engine.

Preferably the rotor has two rotor gases inlets, one facing each axial end of the rotor, each of similar internal diameter such that there are similar diameter rotor vacuum seals at each end of rotor.

Preferably the combustion gas outlet tube passes along and through the centre of a rotor gases inlet to form a hot end of the rotor, the coolant fluid inlet and outlet passing along and through the centre of a second one of the rotor gases inlets to form a cold end of the rotor.

Alternatively the rotor casing has a single rotor gases inlet and single rotor combustion gas outlet both at the same axial end of the rotor, with a single rotor vacuum seal being a gas lubricated face seal or other clearance seal at the same end of the rotor.

Preferably the rotor assembly further comprises at least one rotor bearing mounted between the rotor casing or an extension from the rotor casing and the rotor to support the rotor for rotation about the rotor axis.

Preferably the at least one rotor bearing is a rolling element bearing.

Alternatively the at least one rotor bearing is a hydrodynamic journal bearing.

Preferably the at least one hydrodynamic journal bearing has an intermediate cylindrical bush/floating ring between an inner journal and an outer bushing.

Preferably the at least one hydrodynamic journal bearing also in part acts as a gas seal with a gas pressure differential between the two axial sides of the hydrodynamic journal bearing.

Preferably the at least one rotor bearing further comprises a circulating lubricant and is configured so that the lubricant can pass through the at least one rotor bearing from an external supply.

Preferably rotor bearings of the hydrodynamic journal or rolling element type are structured so that rotor inlet gases are blocked from flowing through the bearing inner bores, the inner bore of the hydrodynamic journal or rolling element rotor bearings adjacent to rotor gases inlets configured to be partially or wholly connected to the rotor by a plurality of bridging struts that bridge across the annular opening of the adjacent rotor gases inlet.

Preferably the rotor assembly is configured so that a single rotor combustion gas outlet tube passes through the inner bore of a rotor bearing at one axial end of the rotor.

Preferably the rotor assembly is configured so that fuel and/or coolant fluid pass through the inner bore of one or more rotor bearings.

Preferably the at least one rotor bearing is either a gas lubricated bearing or a magnetically levitated bearing.

Preferably the at least one rotor bearing is a gas lubricated bearing of the foil air bearing type.

Alternatively the at least one rotor bearing is a magnetically levitated radial passive magnetic bearing, and the rotor assembly further has another rotor bearing of different type to constrain axial movement of the rotor.

Preferably the rotor assembly is configured so that the inlet gases that enter the rotor pass through the inner bore of the at least one rotor bearing.

Preferably the rotor casing comprises rotor casing openings at both axial ends of the rotor casing, and is configured so that the combustion gas outlet tube passes along and through the centre of one rotor gases inlet to form a hot end, the opposite rotor casing opening forming a cold end, the rotor assembly having a rolling element or hydrodynamic journal rotor bearing at the cold end of the rotor and a magnetically levitated or gas lubricated rotor bearing at the hot end of rotor.

Preferably the rotor casing is configured to have rotor casing openings at both axial ends of the rotor casing, the combustion gas outlet tube passing along and through the centre of one rotor gases inlet to form a hot end, the opposite rotor casing opening forming a cold end, the rotor assembly comprising: a single rotor gases inlet at the hot end of the rotor, a combustion gas outlet tube passing through the centre of the hot end rotor gases inlet, a hot end rotor bearing that is either a magnetically levitated bearing or a gas lubricated bearing, and a cold end rotor bearing that is either a rolling element or a hydrodynamic journal bearing, gases entering the rotor by flowing through the inner bore of the hot end rotor bearing.

Preferably one or more of the rotor bearings is cooled by heat transfer to one or more heat sink fluids from a list that includes: air, rotor inlet gases, coolant fluid, fuel.

Preferably the rotor assembly further comprises a coolant fluid manifold within the rotor, configured so that in use a coolant fluid can circulate around the coolant fluid manifold to cool rotor components.

Preferably the coolant fluid manifold is configured to contain a coolant fluid.

Preferably the rotor assembly further comprises a coolant fluid with a primary constituent comprising one or more of: hydrogen, helium, ammonia, alkanes, alcohols, water.

Preferably the coolant fluid manifold is structured so that the coolant fluid is at least partially cooled over a span of radii within the rotor that are more proximal the rotor axis than the span of radii where the majority of the heat energy is deposited within the coolant fluid as it cools rotor components, or other fluids within the rotor, or both, circulation of the coolant fluid at least partially driven by centrifugal thermosiphon.

Preferably the rotor assembly further comprises an off-rotor coolant cooler external to the rotor, in use coolant fluid exiting the rotor and entering the cooler so as to be at least partially cooled.

Preferably the rotor assembly further comprises a filter located external to the rotor configured to filter coolant fluid.

Preferably the assembly is configured so that in use the coolant fluid is cooled by heat transfer to at least one heat sink fluid, the heat sink fluid(s) comprising one or more of: fuel, gases that enter the rotor, gases external to the rotor, air, heat sink fluids partially or wholly composed of water, other heat sink fluids external to the rotor.

Preferably the rotor assembly further comprises an exterior rotor integrated coolant cooler configured to cool the coolant fluid in use.

Preferably the exterior rotor integrated coolant cooler is connected to the rotor exterior adjacent to the cold end rotor gases inlet, the exterior rotor coolant cooler comprising axial tubes distributed about the rotor axis through which the coolant fluid flows in use, the axial tubes passing through and being bonded to a plurality of generally parallel annular fins centred on the rotor axis.

Preferably the exterior rotor integrated coolant cooler is attached to and rotates with the rotor in use so that the heat sink fluid is pumped through the exterior rotor integrated coolant cooler by dynamic pumping action.

Preferably the integrated coolant cooler further comprises gases inducing blades configured to in use draw gases in through one or both axial ends of the exterior rotor integrated coolant cooler to flow out between said annular fins.

Preferably the blades are configured to draw in air.

Preferably the coolant fluid manifold within the rotor incorporates either an accumulator containing a sealed and expandable coolant fluid reservoir configured to accommodate changes in liquid coolant fluid volume and/or coolant fluid manifold volume during rotor operation by partially emptying or filling with liquid or gaseous coolant fluid, the reservoir further configured to contain a reserve quantity of coolant fluid to in use reduce the rate of pressure drop due to coolant fluid leakage from the coolant fluid manifold.

Preferably the coolant fluid reservoir is located at a radius smaller than minimum radius of passages through which coolant fluid circulates.

Preferably the coolant fluid reservoir is located at or close to the rotor axis.

Preferably the coolant flow passages within the rotor are at least partially formed from aluminium.

Preferably the rotor assembly further comprises a coolant fluid that is helium.

Preferably the rotor assembly further comprises further comprising a coolant fluid that is hydrogen.

Preferably the rotor assembly further comprises metal hydride within the rotor assembly to store additional hydrogen.

Preferably the rotor assembly further comprises an internal intercooler located either radially inwards of or within the compression passage, configured to cool the inlet gases over a span of radii as the inlet gases undergo compression while flowing generally radially outwards from the rotor axis.

Preferably the internal intercooling extends over a span of radii from a radius where the radially outflowing inlet gases temperature exceeds the temperature of the coolant fluid within the internal intercooler to a radius less than 80% of the radius where the gases enter the combustion chamber or chambers.

Preferably the radial outer extent of the internal intercooler is between 40-60% of the radius where the gases enters the combustion chamber or chambers.

Preferably the internal intercooler is comprised of one or more plate and fin heat exchangers each having fins with faces approximately parallel to the rotor axis.

Preferably the internal intercooler plate and fin heat exchanger plates have approximate mirror symmetry in planes that are coincident with the rotor axis.

Preferably the internal intercooler is comprised of more than one plate and fin heat exchanger extending over different radial spans.

Preferably the internal intercooler incorporates one or more plate and fin type heat exchangers at least one of which is retained within the rotor against centrifugal reaction forces by contact with radially inwards facing surfaces of the rotor tensile structure at the radial outer end of the plate and fin type heat exchangers.

Preferably the internal intercooler or intercoolers are partly or wholly constructed from aluminium alloys and/or copper alloys.

Preferably the internal intercooler is configured for use with a coolant fluid whose primary constituent is water or alcohol.

Preferably the rotor assembly comprises a single rotor that contains a single combustion chamber, the internal intercooler located within the rotor so as to at least partly counterbalance the mass of the combustion chamber and associated compression passage as it rotates about the rotor axis.

Preferably the rotor assembly further comprises a motor connected to the rotor and configured to spin the rotor up to the desired speed on initial startup in use.

Preferably the motor is an electric motor.

Alternatively the motor is an axial flux motor mounted within the rotor casing.

Preferably the motor is further configured for use as a generator when the rotor is decelerated or if there are fluid forces that would otherwise accelerate the rotor.

Alternatively the motor is an internal combustion engine.

Alternatively the motor is a turbine driven by fluid pressure.

Preferably the motor is a belt or geared transmission driven by a rotary torque providing means.

Preferably the rotor assembly further comprises an external compressor adapted to compress gases prior to the gases entering the rotor.

Preferably the external compressor is of the dynamic/turbomachine type.

Alternatively the external compressor is an axial flow compressor.

Alternatively the external compressor is a centrifugal compressor.

Preferably the external compressor is configured to be at least partly driven by an external turbine of the dynamic/turbomachine type.

Alternatively the external compressor is configured to be at least partly driven by an electrical motor or motor/generator.

Preferably the rotor assembly is configured so that in use the external compressor is operated before or during the acceleration of the rotor on startup to maintain gases flow through the rotor prior to initiation of combustion within the at least one combustion chamber.

Preferably the rotor assembly is configured so that in use operation of the external compressor pre-heats the gases in the at least one combustion chamber by compression induced heating of gases flowing through the rotor while it is spinning.

Preferably the rotor assembly is configured so that in use fuel is injected into the pre-heated hot gases within the at least one combustion chamber and auto-ignites.

Preferably the rotor assembly further comprises a combustor configured to pre-heat the inlet gases by combustion with a fuel prior to entry of the gases into the rotor and initiation of combustion within the rotor.

Preferably the rotor assembly further comprises an electrically powered heater configured to pre-heat the inlet gases prior to entry of the gases into the rotor and initiation of combustion within the rotor.

Preferably the rotor assembly is configured so that the inlet gases/fuel mixture is ignited at the rotor combustion gas outlet, combustion propagating backwards through the gases/fuel mixture flow to at least one combustion chamber.

Preferably a variable flow restriction such as an exhaust control valve or similar is located downstream of the rotor combustion gas outlet or outlets to restrict the rate of flow and thereby allow the combustion to propagate back through the flow to the at least one combustion chamber.

Preferably the rotor assembly is configured so that initial ignition is achieved by injecting a gaseous fuel with lower average molecular mass than air into the at least one combustion chamber of the spinning rotor to create a combustible mixture that flows towards the rotor combustion gas outlet.

Preferably the fuel used is predominantly hydrogen or methane.

Preferably the fuel is altered to a different fuel after ignition.

Preferably the rotor assembly is configured so that gaseous fuel is supplied to the rotor until combustion is established.

Preferably the rotor assembly is configured so that fuel is injected into the at least one combustion chamber at a smaller radius than the combustion chamber gases inlets.

Preferably fuel is injected closer to the rotationally trailing side of the at least one combustion chamber than to the rotationally leading side.

Preferably the at least one combustion chamber or the at least one associated expansion passage or both further comprise multiple small orifices or porous walls, configured so that gases and/or fuel can be injected through the multiple small orifices or porous walls to in use partially or wholly transpiration cool the combustion chamber or expansion passage or both.

Preferably the internal intercooler is configured to intercool the inlet gases utilised for transpiration cooling one or both of the combustor or expansion passage within the rotor.

Preferably the internal intercooler is configured so that the gases utilised for transpiration cooling of the combustor or expansion passage or both are intercooled over a greater radial span within the rotor than the gases that enter the combustion chamber without being used for transpiration cooling.

Preferably the assembly further comprises a separate high pressure rotor air inlet configured to supply air for transpiration cooling of at least one combustion chamber or expansion passage or both.

Preferably the rotor assembly further comprises a fuel injector configured for injecting additional fuel into the combustion gases as they flow expanding and cooling through the at least one expansion passage or passages towards the rotor axis.

Preferably the rotor assembly further comprises an external combustor configured to inject and burn additional fuel in the combustion gases after they have exited the rotor.

Preferably the rotor assembly further comprises at least one external inlet gases filter configured to filter the inlet gases before the gases enter the rotor.

Preferably the external gases filter air at or below atmospheric pressure.

Preferably the rotor assembly further comprises a propulsive nozzle, the rotor combustion gases outlet or outlets configured to supply pressurised combustion gases from the rotor to the propulsive nozzle, the nozzle configured to expand the gases to provide a propulsive force.

Preferably the rotor assembly further comprises an external turbine, the rotor combustion gases outlet configured to supply pressurised combustion gases created within the rotor to the external turbine wherein they may be expanded to supply mechanical power to a load.

Preferably the external turbine comprises a single spool.

Preferably the external turbine comprises a single radial inflow external turbine.

Alternatively the external turbine comprises multiple spools that each rotate at different speeds.

Preferably the external turbine incorporates variable inlet guide vanes on one or more stages of said external turbine configured to be adjustable during operation of the engine.

Preferably the external turbine comprises one or more stages of radial inflow turbine with variable inlet guide vanes configured to be adjustable during operation of the engine.

Preferably the external turbine comprises at least two contra-rotating spools that rotate in opposite directions about a common axis of rotation.

Preferably the external turbine is of the multistage radial outflow type also known as a Ljungström turbine.

Preferably one disk of the Ljungström turbine is attached to the rotor so that in use combustion gases pass through the disk from the rotor combustion gas outlet tube to enter the Ljungström turbine.

Preferably the rotor combustion gas outlet incorporates one or more torque producing nozzles that is/are configured to impart mass-specific angular momentum to the rotor combustion gas outflow about the rotor axis and with opposite orientation to the angular momentum of the rotor, to create a reaction torque upon the rotor that at least partially drives the rotor's rotation.

Preferably the torque-producing nozzles are configured so that the mass-specific angular momentum about the rotor axis of the combustion gases exiting the torque producing nozzles is in use averaged to be less than −0.1% of the maximum mass specific angular momentum of the gases within the rotor.

Preferably the rotor assembly further comprises an external turbine and wherein the torque producing nozzles are configured so that in use the partially expanded combustion gases exiting the torque producing nozzles are then directed to further expand through the external turbine.

Preferably the external turbine is configured to rotate about an axis of rotation approximately coincident with the rotor axis but in the opposite direction to the rotor.

Preferably the rotor motor is further configured for use as a generator to generate electrical power from the reaction torque imparted by the Ljungström turbine disk or alternatively the torque producing nozzles attached to the rotor.

Preferably the rotor bearings have a radial stiffness sufficiently low that the fundamental natural frequency of radial oscillation of the rotor-bearing system is below the maximum operating angular frequency of the rotor.

Preferably the rotor further comprises one or more autobalancers configured so that in operation at rotor angular frequencies above the fundamental natural frequency of radial oscillation they will tend to move the centre of mass of the rotor towards the rotor axis.

Preferably the autobalancers comprise one or more cavities of revolution about the rotor axis within the rotor, each cavity of revolution containing a plurality of substantially identical rollers configured to roll freely about the circumference of the cavity.

Preferably the autobalancer cavity or cavities are partially or wholly filled with a liquid in addition to the rollers.

Preferably the rotor assembly has a single autobalancer located substantially in the same plane perpendicular to the rotor axis as the centre of mass of the rotor during operation.

Preferably the rotor assembly has two autobalancers, located so that the centre of mass of the rotor during operation lies axially between the two autobalancers.

Preferably the rotor assembly is configured to be mounted within a vehicle with the rotor axis approximately aligned with the axis about which the fastest rotational motions of the vehicle generally occur.

In a second aspect, the invention may broadly be said to consist in a vehicle comprising:
 a rotor assembly as outlined in any one of the preceding statements;
 a platform mounted within the vehicle, and;
 a gimbal connected to the platform;
 the rotor assembly mounted within the gimbal to allow the rotor axis to maintain a constant orientation as the platform to which the gimbal is attached rotates about the rotor axis.

In a second aspect, the invention may broadly be said to consist in an engine containing a rotor assembly as claimed in any one of the preceding statements wherein the rotor assembly further comprises an external turbine through which atmospheric gases are expanded to reduce their pressure prior to entry into the rotor.

Preferably the engine containing a rotor assembly further comprises a regenerator or a recuperator configured to transfer heat to the gases about to pass through the external turbine prior to their entering the rotor from the combustion gases exiting the rotor and prior to their exhaustion.

Preferably the engine containing a rotor assembly further comprises an engine external intercooler configured to cool the gases after expansion through the external turbine and prior to entering the rotor.

Preferably the engine containing a rotor assembly is configured so that a portion of the combustion gases exiting the rotor are routed through and expanded in the external turbine to mix with inlet gases that are routed through and expanded in the external turbine, the mixed gases routed through the external intercooler and then into the rotor.

In a third aspect the invention may broadly be said to consist in a vehicle having a rotor assembly as outlined in any one of the preceding statements mounted within the vehicle, the rotor axis of the rotor assembly approximately aligned with the axis about which the fastest rotational motions of the vehicle occur.

Preferably the gases are comprised mostly or entirely of air.

BRIEF DESCRIPTION OF THE DRAWINGS

Embodiments of the present invention will now be described, by way of example only, with reference to the accompanying drawings, in which:

FIG. 1 shows a cross sectional view of a preferred embodiment of the Engine of the current invention in which a Rotor made up of a large number of components rotates at a Rotor Angular Speed on Rotor Hydrodynamic Journal Bearings about the Rotor Axis in a clockwise direction when viewed from the left within a Rotor Casing that is in general form a shell of revolution about the Rotor Axis, the Engine incorporates a multiple stage radial outflow External Turbine (also known as Ljungström Turbine) to extract work from the combustion gases produced within a single combustor;

FIG. 2 shows an enlarged detail view of the Engine cross section of FIG. 1, that shows part of a ceramic Combustion Chamber that forms part of the invention, and its interface with a surrounding Tensile Structure;

FIG. 3 shows an enlarged detail view of the Engine cross section of FIG. 1 that shows the radially innermost end of the Combustion Chamber Shroud where it is supported off of the metallic Cooled Inner Wall or liner that is bonded to the inner surface of the Tensile Structure;

FIG. 4 shows an enlarged detail view of the Engine cross section of FIG. 1 that shows the Radial Expansion Joint that allows relative radial movement between the Outer Expansion Passage that is formed as part of the Ceramic Combustion Chamber and the Inner Expansion Passage that extends radially outwards from near the Rotor Axis;

FIG. 5 shows an enlarged detail view of the Engine cross section of FIG. 1 that shows the Fuel Inlet, Coolant Fluid Inlet and Coolant Fluid Outlet, in addition to one of the Rotor Hydrodynamic Journal Bearings, that runs on the cylindrical outer surface of the Fluid Inlet Tube through which by means of three separate flow passages the Fuel enters the Rotor and the Coolant Fluid both enters and exits the Rotor;

FIG. 6 is an enlarged detail view of the Engine cross section of FIG. 1 that shows the end of the Rotor from which the Combustion Gases exit the Rotor;

FIG. 7 is a cross sectional view of the Engine of FIG. 1 taken in a plane perpendicular to the Rotor Axis and through the centre of the Combustion Chamber when viewed from the Hot End of the Rotor with the Ljungström External Turbine;

FIG. 8 is an enlarged detail view of the Engine cross section of FIG. 7 that shows where the Fuel that has flowed outwards in the Radial Fuel Delivery Tube through the Tensile Structure passes through the Cooled Inner Wall of the Tensile Structure and is injected into the Combustion Chamber by the Fuel Injector on the rotationally trailing side of the Combustion Chamber to be combusted with the air that enters the Combustion Chamber by means of the Combustion Chamber Air Inlets;

FIG. 9 is an enlarged detail view of the Engine cross section of FIG. 7 that shows the area near the Rotor Axis;

FIG. 10 is an isometric view, in isolation, of the Coolant Fluid Manifold, Fuel Delivery Manifold, and Cooled Inner Wall that are embedded within the Tensile Structure of the Engine of FIGS. 1-9 viewed from the Cold End of the Rotor through which the Coolant Fluid enters and exits;

FIG. 11 is an isometric view, in isolation, of the Coolant Fluid Manifold, Fuel Delivery Manifold, and Cooled Inner Wall that are embedded within the Tensile Structure of the Engine of FIGS. 21-25;

FIG. 12 shows a cross sectional view coincident with the Rotor Axis of another preferred embodiment of the Engine of the current invention in which a Symmetrical Two Radial Compression and Combustion Arm Rotor, incorporating two diametrically opposed Combustion Chambers and made up of a number of components, rotates at a Rotor Angular Speed about a Rotor Axis within a partially evacuated Rotor Casing that is in general form a shell of revolution about the Rotor Axis;

FIG. 13 is an enlarged detail view of the Engine cross section of FIG. 12 that shows the Domed End of one of the ceramic Combustion Chambers;

FIG. 14 is an enlarged detail view of the Engine cross section of FIG. 12 that shows the Hot End of the Rotor;

FIG. 15 shows a cross sectional view coincident with the Rotor Axis of another preferred embodiment of the Engine of the current invention that incorporates Internal Intercooling into the Rotor that made up of many components;

FIG. 16 is an enlarged detail view of the Engine cross section of FIG. 15 that shows part of the Combustion Chamber, and the various parts that lie between the Combustion Chamber and the Tensile Structure;

FIG. 17 is an enlarged detail view of the Engine cross section of FIG. 15 that shows the Combustion Gas outlet through the Tangential Nozzle Wheel attached to the end of the Rotor Combustion Gas Outlet Tube with the Combustion Gas outlet from the Tangential Nozzle Wheel driving a contra-rotating External Radial Inflow Turbine;

FIG. 18 is an isometric view of the complete Rotor of the Engine of FIGS. 15-19 from the Hot End of the Rotor, without the Rotor Casing, Turbine Casing, External Radial Inflow Turbine, External Motor Generator or External Compressor showing;

FIG. 19 is an isometric view of the Rotor of the Engine of FIGS. 15-19 from the Hot End with a quarter section removed, the quarter section having one sectioning face perpendicular to the Rotor Axis and coincident with the Radial Arm Axis and the other sectioning face coincident with both the Radial Arm Axis and the Rotor Axis;

FIG. 20 shows a cross sectional view coincident with the Rotor Axis of an alternative preferred embodiment to the Tangential Nozzle Wheel of the Engine of FIGS. 15-19 in which the Turbine Casing attached to the Rotor Casing is replaced by a Tangential Nozzle Wheel And Turbine Casing in which the Turbine Casing that surrounds the External Radial Inflow Turbine is attached directly to the Tangential Nozzle Wheel, thereby eliminating the need for the separate Turbine Casing and also reducing the pressure differential that must be withstood by the Combustion Gas Outlet Rotary Dynamic Seal to the pressure difference between the Air Inlet Manifold and the ambient atmosphere;

FIG. 21 shows a cross sectional view coincident with the Rotor Axis and the Radial Arm Axis of another preferred embodiment of the Engine of the current invention in which there is a single Rotor Air Inlet at the Hot End of the Rotor and in which the Rotor is supported on a Floating Ring Hydrodynamic Bearing and a Rolling Element Bearing that are both at the Cold End of the Rotor opposite the Hot End of the Rotor with the Combustion Gas Outlet Manifold;

FIG. 22 is an enlarged detail view of the Engine cross section of FIG. 21 that shows part of the Rotor Air Inlet and the Air Lubricated Face Seal;

FIG. 23 is an enlarged detail view of the Engine cross section of FIG. 21 that shows a non-contacting Annular Coolant Fluid Inlet and circular non-contacting Liquid Fuel Inlet to the Rotor, with Fuel and Coolant Fluid being supplied to the Rotor by an External Fuel Supply Tube and an External Coolant Supply Tube respectively;

FIG. 24 is an enlarged detail view of the Engine cross section of FIG. 21 that shows the Rotor Combustion Gas Outlet Tube that passes through the Combustion Gas Outlet Rotary Dynamic Seal and into the Combustion Gas Outlet Manifold;

FIG. 25 is an enlarged detail view of the Engine cross section of FIG. 21 near the Rotor Axis on the Cold End of the Rotor;

FIG. 30 shows an isometric cross sectional view coincident with the Rotor Axis and the Radial Arm Axis of the Rotor of another preferred embodiment of the Engine of the current invention in which the Cooled Compression Passage in which the air temperature exceeds the temperature capabilities of the Rotor Structure is lined by radially overlapping Foil Rings that are each bonded at their radial innermost end to the Cooled Inner Wall of the Cooled Compression Passage and that in their overlapping arrangement create small air gaps that serve to partially insulate the Cooled Inner Wall from the hot air, thereby reducing the amount of cooling required for the Cooled Inner Wall;

FIG. 31 is an enlarged detail view of the isometric Rotor cross section of FIG. 30 that shows radially overlapping Foil Rings bonded to the Cooled Inner Wall of the Compression Passage that protects the Tensile Structure of the Rotor from being over-heated;

FIG. 32 shows an enlarged detail view of the isometric Rotor cross section of FIG. 30 that shows the Fluid Connecting Passages in the wall of the Cold End Air Inlet at the minimum diameter point where the Cold End Air Inlet passes through the Rotor Vacuum Seal.

DESCRIPTION OF THE INVENTION

Figure 26:
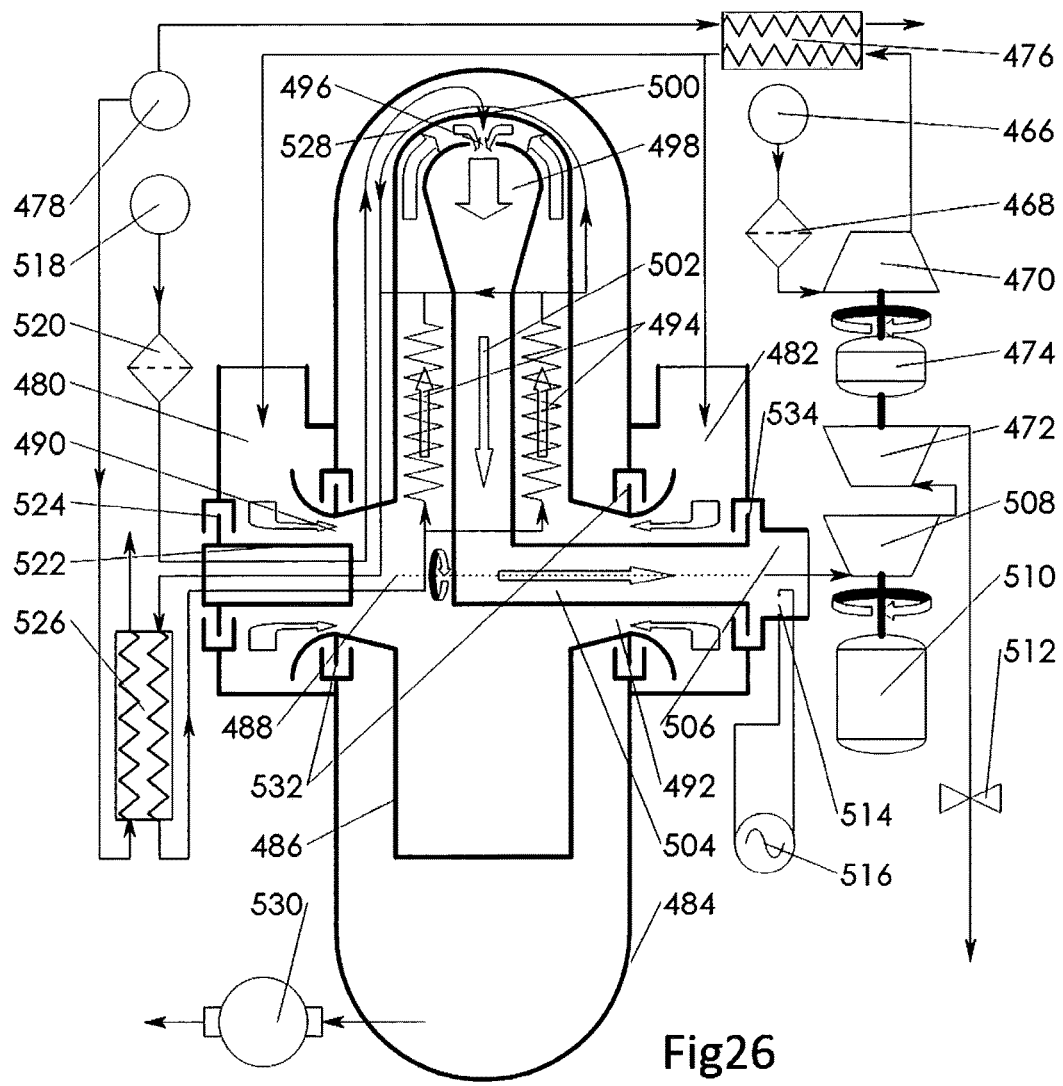
FIG. 26 is a simplified flow diagram and cross-section of an Internally Intercooled Engine of the current invention that omits much detail and some components to improve clarity and shows the general configuration of fluid flows within the Engine.

The invention will now be described in general terms before expanding upon various areas and features in more detail.

The current invention comprises a highly efficient and compact heat Engine that utilises air as a gaseous working fluid and uses combustion of a fuel in the air to release heat energy. There are a number of variations of the heat Engine of the current invention but all utilise a continuous flow process in which air is compressed, combusted with fuel and then partially expanded within a Rotor, with the resulting Combustion Gases being typically further expanded within an External Turbine to produce a net work output, though there may be additional cooling and or heating processes integrated within the overall air compression and combustion gas expansion processes.

Rotor Compression/Expansion Attributes, Calculations and Efficiency

The Engine of the current invention makes use of a highly efficient process for compression and expansion of air, fuel and Combustion Gases within a Rotor that spins at high Rotor Angular Speed around a Rotor Axis. The spinning Rotor has large internal centripetal accelerations that induce radial pressure gradients within the fluids in the Rotor. As fluids flow radially away from the Rotor Axis within the Rotor they are compressed and increase in pressure and density, while as they move radially towards the Rotor Axis they expand and reduce in pressure and density. With relatively low flow velocities to reduce frictional flow losses and in the absence of significant heat transfer from the fluids to the walls of the Rotor passages that they are flowing within these compression and expansion processes may be nearly isentropic and adiabatic and may contribute to achieving very high Engine efficiencies.

Compression Process

Before entering the Rotor the air is first optionally compressed in an External Compressor and optionally intercooled in an External Intercooler. The air then optionally passes through an External Air Filter to remove particulate matter entrained in the air before the air enters the Rotor through one or more Rotor Air Inlets at or near the Rotor Axis at one or both ends of the Rotor. The air then flows in parallel through one or more Compression Passages in the Rotor radially outwards from the Rotor Axis towards the Maximum Flow Radius undergoing compression and heating as it does so. There may optionally be an Internal Intercooler within the Rotor that cools the air during the compression process within the Rotor by transferring heat to a Coolant Fluid that either flows into and out of the Rotor at or near the Rotor Axis or alternatively is cooled by heat transfer to another Heat Sink Fluid in a Rotor Integrated Coolant Cooler that is part of the Rotor. Optionally some or all of the Fuel may be injected into the air before or during the compression process prior to the air reaching the Maximum Flow Radius.

Combustion and Expansion Process

The compressed air enters one or more Combustion Chambers at or near the Maximum Flow Radius. Fuel is injected into the air in the Combustion Chamber and/or at some point prior to the air entering the Combustion Chamber. The air and Fuel combust within the Combustion Chamber producing hotter and less dense Combustion Gases compared to the relatively cooler air entering the Combustion Chamber. The Combustion Gases then undergo an expansion process as they flow radially inwards from the Combustion Chamber through one or more Expansion Passage/s towards the Rotor Axis reducing in pressure, temperature and density as they expand. The Combustion Gases are hotter than the air undergoing compression, resulting in a smaller pressure drop as they expand towards the Rotor Axis than what the air flowing from the Rotor Air Inlet Ports towards the Maximum Flow Radius gains. This creates an overall pressure gain for the Combustion Gases at the Rotor Axis compared to the air at the Rotor Air Inlets.

Centrifugal Thermosiphon

Air compression followed by combustion near the Maximum Flow Radius and expansion of the hot Combustion Gases within the centripetally accelerating environment of the Rotor is an example of a Thermosiphon. Thermosiphons more commonly operate using the action of gravity upon a fluid that changes density with temperature thereby creating buoyancy forces that create pressure differentials between flow passages at the same elevation, or in the case of a spinning Rotor the same radius. The pressure differentials in gravity driven thermosiphons are typically used to drive fluid circulation to transport heat as the pressure gradients are typically too small in the relatively weak gravity of earth to be useful for efficient power generation. Chimneys on burners are a common example of a Thermosiphon, and in the case of large thermal power stations are frequently used to provide a slight enhancement of overall efficiency with the pressure gain created by a tall chimney.

The Rotor in total acts as a pressure gain device that produces a Rotor outlet flow of Combustion Gases at elevated pressure relative to the air entering the Rotor as a result of a Centrifugal Thermosiphon.

Rotor Outlet

The Combustion Gases then exit the Rotor through a Rotor Combustion Gas Outlet or Outlets. Optionally the Rotor Combustion Gas Outlets may take the form of nozzles through which the Combustion Gases flow with significant velocity tangential to the Rotor at some radial distance from the Rotor Axis thereby creating a reaction torque upon the Rotor.

In most cases it will be preferable to have a single Rotor Combustion Gas Outlet at one end of the Rotor (the Hot End) in order to reduce the number of hot components and rotating seals subjected to high temperature and high pressure Combustion Gases.

Coolant Fluid

One or more varieties of Coolant Fluid are required to cool components within the Rotor. This will generally include cooling the Tensile Structure of the Rotor in close proximity to hot air or Combustion Gases, but may also include cooling of the air undergoing compression in Internal Intercoolers and will require that the Coolant Fluid is itself cooled by heat transfer to a Coolant Heat Sink.

Some types of fuel, in particular liquid fuels may have significant cooling capacity that may provide for some or all of the cooling needs of the Rotor. But for some fuels, particularly some gaseous fuels, there may be benefits to cooling the fuel using the Coolant Fluid.

The Coolant Fluid will preferably be heated at greater radii from the Rotor Axis cooling loads such as the Tensile Structure or the Internal Intercooler than where it is cooled. This will enable the circulation of the Coolant Fluid to be at least partially driven by centrifugal thermosiphon as the Coolant Fluid will heat up and reduce in density while flowing radially inwards thereby gaining in pressure relative to the colder and more dense Coolant Fluid flowing outwards at the same radius. In most cases once a Coolant Fluid flow is established in a circulating loop in one direction it will be maintained in the same direction even if the heating is occurring both in radially outwards flow direction and radial inwards flow direction.

If the Coolant Fluid is a liquid such as water then the pressures near the Maximum Flow Radius may reach extremely high levels of many hundreds of MPa, in such cases the Coolant Fluid flow passages within Rotor will need to be very strong to withstand these high pressures.

Off-Rotor Coolant Cooler

In one preferred arrangement the Coolant Fluid will be cooled externally to the Rotor in an Off-Rotor Coolant Cooler with the Coolant Fluid entering the Rotor through a Coolant Fluid Inlet Rotary Fluid Coupling at or near the Rotor Axis at or near one end of the Rotor and exiting the Rotor through a Coolant Fluid Outlet Rotary Fluid Coupling at or near the Rotor Axis at or near one end of the Rotor. In such case the Coolant Fluid will preferably be water or some other relatively low density non-toxic liquid with relatively low vapour pressure compared to water, of which alcohols in general, as well as some hydrocarbon liquids and alcohols are preferred examples, though lower density toxic liquids such as ammonia may be preferable for some applications to reduce the Coolant Fluid pressure within the Rotor at large fractions of the Maximum Flow Radius, and there are many other liquids and gases such as Hydrogen and Helium that could also be used with more sophisticated and expensive Coolant Fluid Rotary Fluid Couplings.

Cooling the Coolant Fluid externally to the Rotor in an Off-Rotor Coolant Cooler will typically result in lower Coolant Fluid temperatures that are particularly advantageous for increasing efficiency in Engines of the current invention that use Internal Intercooling of the air within the Rotor, and is thus preferred for use in Engines of the current invention that use Internal Intercooling of the air within the Rotor.

The Coolant Fluid will preferably be chemically conditioned and filtered to remove detritus and prevent the formation of deposits that could otherwise accumulate within the Rotor.

The centrifugal thermosiphon may advantageously reduce or even eliminate the need for a Coolant Fluid Circulation Pump external to the Rotor.

The Coolant Fluid will preferably enter and exit the Rotor through the Cold End of the Rotor opposite to the Hot End of the Rotor that has a single Rotor Combustion Gas Outlet. Fuel will preferably also enter the Rotor at the Cold End.

Rotor Integrated Coolant Cooler

One or more varieties of Coolant Fluid may be circulated in a sealed system within the Rotor, being cooled in a Rotor Integrated Coolant Cooler at a radius more proximal the Rotor Axis than the radius at which the majority of the heat is added to it, it will thus be circulated around a closed heating and cooling loop driven by centrifugal thermosiphon.

The Rotor Integrated Coolant Cooler will then deposit the heat into one or more Heat Sink Fluids from a list that includes: the Fuel, the Air entering the Rotor, Air external to the Rotor, a coolant liquid external to the Rotor, other Heat Sink Fluids external to the Rotor.

It will typically be advantageous to use a relatively high density fluid as the Heat Sink Fluid, though this may not always be the preferred solution, as this will typically reduce the necessary size of the Rotor Integrated Coolant Cooler.

Internal Air Heat Sink

If the Heat Sink Fluid in the Rotor Integrated Coolant Cooler is the air that has entered the Rotor and that is undergoing compression then it will typically reduce the Engine efficiency, but may be beneficial in reducing the complexity and size of the Rotor.

Internal Fuel Heat Sink

The Fuel may be able to make a contribution to the cooling as Heat Sink Fluid in a Rotor Integrated Coolant Cooler, and depositing heat into the fuel to pre-heat it before it reaches the Combustion Chamber is typically beneficial to efficiency so long as it does not cause overheating of the fuel flow passages within the Rotor or chemical decomposition of the Fuel. However some gaseous Fuels may themselves need to be cooled as they undergo compression.

If the Fuel is a liquid hydrocarbon then it may be simpler to use the Fuel Flow Passages that deliver the fuel to the Combustion Chamber to themselves do some cooling.

External Heat Sink Fluid and Exterior Rotor Integrated Coolant Cooler

Passing the Coolant Fluid to and from the Rotor by means of Coolant Fluid Rotary Fluid Couplings so that it can be cooled in an Off-Rotor Coolant Cooler may be problematic in that it requires the use of rotating seals that are subject to wear and possible leakage, while also potentially creating a path through which detritus or other contaminants may be able to enter the Rotor and accumulate and block cooling tubes with extremely damaging consequences. Seal leakage in a Coolant Fluid Rotary Fluid Coupling may be particularly serious if the Coolant Fluid is expensive, toxic, or difficult to replace, as may be the case with Coolant Fluids other than water.

A preferred solution is therefore to have a Rotor Integrated Coolant Cooler attached to the Rotor exterior to the Rotor Air Inlets and preferably not at the Hot End of the Rotor. The Coolant Fluid may then pass to and from this Exterior Rotor Integrated Coolant Cooler while remaining in a sealed Rotor Coolant Fluid Manifold connected to the Rotor free from external sources of contamination or detritus. This Exterior Rotor Integrated Coolant Cooler may then be cooled by a Heat Sink Fluid being one or more of a list that includes: ambient air, cooling liquids completely or primarily composed of water, other cooling fluids.

The Exterior Rotor Integrated Coolant Cooler may be advantageously configured so that its Rotor linked rotation pumps or otherwise causes the Heat Sink Fluid to be moved over its cooling surfaces so that no external fan or other pumping device is required to maintain the necessary level of cooling. This is particularly preferred in the case of use of ambient air as the Heat Sink Fluid.

Preferred Coolant Fluids

For liquid Coolant Fluids generally desirable attributes are: low density in order to reduce the peak pressures within the Rotor, high specific heat in order to reduce the necessary mass flow in the coolant passages for a given amount of heat flux and high Bulk Modulus to reduce the amount of heating of the Coolant Fluid that occurs when it is compressed. In most cases it is expected that water will be the preferred Coolant Fluid as it has very desirable thermodynamic properties that include high Bulk Modulus that result in little heating as it undergoes compression and a high specific heat and density that may make it possible to use smaller diameter Cooling Tubes than would be possible with other Coolant Fluids, though in some cases the peak pressure within the water may be too high for a satisfactory design to be created.

Ammonia and lightweight hydrocarbons including methane, ethane, propane, butane and pentane are preferred alternative Coolant Fluids, as they all have relatively low liquid densities when compared to water and will not freeze in typical cold ambient conditions. However while preferred as Coolant Fluids for use in a Rotor Integrated Coolant Cooler they have high vapour pressures at ambient conditions that may make them less suitable for transfer through Coolant Fluid Rotary Fluid Couplings for cooling in an Off-Rotor Coolant Cooler external to the Rotor. For use in an Off-Rotor Coolant Cooler heavier hydrocarbons such as lubricating oils or alcohols with lower density than water, and relatively low vapour pressures may be preferred, oils having the added benefit of being useful as lubricants in other parts of the Engine.

Hydrogen and helium as gaseous Coolant Fluids are advantageous as they result in relatively low pressures within the Fluid Cooling Passages at the maximum radius of the Coolant Fluid, and while hydrogen has a greater tendency to diffuse through metal walls and leak away than helium it also has superior heat transfer properties and will typically create a larger temperature differential between the hydrogen and the Tensile Structure that it is cooling owing to a much higher value of isobaric specific heat. This cooling advantage may allow hydrogen to be used at a lower pressure and lower temperatures than helium thereby reducing the rate of unwanted hydrogen diffusion (leakage).

If hydrogen or helium is used as a Coolant Fluid and is cooled within a rotor integrated Coolant cooler then a Coolant Fluid Storage Reservoir containing extra hydrogen or helium to compensate for Coolant Fluid leakage will preferably be part of the Rotor. Hydrogen has an advantage in that it may be stored in relatively compact and lightweight chemicals of which Metal Hydrides are a preferred example, while in contrast storing the same mass of helium to compensate for leakage requires a relatively large and heavy high pressure Coolant Fluid Storage Reservoir tank. If hydrogen or helium is used as the Coolant Fluid then aluminium is the preferred material to make the Cooling Tubes and Coolant Fluid Manifold from owing to its combination of low density, relatively low permeability to hydrogen and helium and relatively high thermal conductivity for good cooling heat transfer from the Tensile Structure.

In larger Rotors with larger thicker Coolant Tubes that contain greater volumes of Coolant Fluid the leakage of hydrogen or helium will be proportionally reduced and hydrogen will become increasingly attractive as a potential Coolant Fluid.

The Coolant Fluids are therefore preferably one or more of a selection from the list: hydrogen, helium, ammonia, alkanes, alcohols and water.

For Rotors that utilise a Rotor Integrated Coolant Cooler with the Coolant Fluid sealed within the Rotor there will generally be significant changes in the density of the Coolant Fluid with Rotor Speed and Temperature. It is therefore preferred that there be a Coolant Fluid Reservoir that automatically compensates for such changes in the density of the Coolant Fluid volume by filling or emptying the Coolant Fluid Reservoir slightly and having some portion of the space within the Coolant Fluid Reservoir filled by a gas. It is generally preferred that such a Coolant Fluid Reservoir be radially inwards of the minimum radius of the passages through which the Coolant Fluid circulates so that any gas or vapour within the circulating Coolant Fluid system will tend to accumulate within the Coolant Fluid Reservoir.

Alternatively changes in the density of a Coolant Fluid sealed within the Rotor may be accommodated by an Accumulator within the Rotor in which a sealed Accumulator Bladder full of a pressurised gas presses upon the Coolant Fluid and accommodates changes in Coolant Fluid volume by compressing or expanding the gas within the Accumulator Bladder. This Accumulator is preferably close to the Rotor axis, but this is not essential so long as the gas pressure within the Accumulator Bladder is maintained at sufficiently high pressure.

Centrifugal Heat Pipe

The Coolant Fluid may alternatively be a liquid circulated partially in its vapour phase in a Centrifugal Heat Pipe in which the liquid phase of the Coolant Fluid only partially fills the volume of a Cooling Tube or Coolant Fluid Manifold, with the rest of the volume being filled by the Coolant Fluid in its vapour phase. The liquid is pushed out to the largest radii within this Cooling Tube or Coolant Fluid Manifold by centrifugal reaction forces, and when heated will boil at its radial inner surface to produce vapour that will then travel radially inwards expanding and cooling as it does so until it reaches a Rotor Integrated Coolant Cooler where it will be condensed back into liquid form that will then flow radially outwards back to the rest of the liquid Coolant Fluid. The advantage that this has is that the pressure within the Coolant Fluid at or near the Maximum Flow Radius will be substantially lower than if the Cooling Tube or Coolant Fluid Manifold is entirely filled with the Coolant Fluid in liquid form.

Ammonia and water are the two most favoured fluids for use in such a Centrifugal Heat Pipe due to their relatively high isobaric specific heats $c_p$ in the vapour phase, but ammonia is generally superior to water due to its lower liquid density, higher $c_p$ and higher vapour pressure at typical atmospheric temperatures that together mean that its fluid pressure will generally be lower, and that the Cooling Tube sizes can probably be smaller due to higher vapour density of ammonia being condensed compared to water.

Applications

There are many potential applications for the elevated pressure Combustion Gases leaving the Rotor: They may be expanded through an External Turbine to supply mechanical power to a load such as a generator or vehicle propulsion; They may be expanded through a nozzle to provide a propulsive force, such as for a jet aircraft or through nozzles on the tips of a propeller or a fan; They may be used to supply compressed Combustion Gases for industrial purposes; They may be used as a supply of pressurised Combustion Gases for cooling and subsequent expansion in a turbine or the like to create a gas stream that is below the ambient temperature for refrigeration or cryogenic cooling.

Rotor Tip Speed

Increasing the peripheral speed of the Rotor presents one of the greatest challenges in designing the Rotor. Increasing the Rotor Tip Speed (tangential velocity of the Rotor at the Maximum Flow Radius) will typically increase the efficiency of the Engine, and with the increasing air pressure it creates it will generally also decrease the volume required for combustion. But while Rotor Tip Speeds as high as 1500 m/s may be beneficial to achieving high Engine efficiency, available materials will typically limit the achievable Rotor Tip Speeds to far lower than this due to the high temperatures and pressures that make maintain structural integrity of the Combustion Chamber and Expansion Passage increasingly difficult due to greater rates of heat transfer as well as the very high stresses created within the materials that the Rotor is constructed from.

There is also a possible trade-off between overall Rotor diameter with increased Rotor Casing and Rotor mass and Rotor Vacuum Seal losses. Increasing Rotor Tip Speed will typically reduce the optimal amount of pre-rotor compression, and for the same diameter the Rotor Vacuum Seal sliding speeds will be increased. The combustion is most efficient if it happens all at maximum radius, but in practice will be spread over a range of radii within the Combustion Chamber.

Theory and Calculations

If there is no Internal Intercooling the air undergoing compression within the Rotor will increase in temperature in approximate proportion to the increase in the square of the tangential speed v of the Rotor at any given radius. Assuming that the air and Combustion Gases behave as ideal gases this can be described by the equation $T_2=T_1+0.5(v_2^2-v_1^2)/c_p$ where T is Temperature in K, and v is tangential speed in m·s$^{-1}$ while $c_p$ is the isobaric specific heat of the gas undergoing compression or expansion within the Rotor, for dry air undergoing compression $c_p$ is about 1005 J·kg-1·K$^{-1}$ at 300K, while for hotter air and Combustion Gases $c_p$ will typically be somewhat higher. Assuming no heat transfer or other losses the pressure p within the Rotor can then be approximately predicted using the equation for adiabatic compression: $p_2=p_1·(T_2/T_1)z$, where $z=c_p/R$ and R, the gas constant for air=287 J·kg$^{-1}$·K$^{-1}$ so that z=3.5.

By way of example: for Rotor inlet conditions of $V_1=0$ ms$^{-1}$, $T_1$=300K then lossless adiabatic compression with constant $c_p$ out to a radius where the tangential speed $V_2$=500 ms$^{-1}$ gives $T_2$=424K and $p_2$=3.36 $p_1$. For $v_2$=1000 ms$^1$ the temperature will increase to $T_2$=798K and pressure will increase to $p_2$=30.63 $p_1$.

Given ideal gases with lossless adiabatic compression and expansion processes the maximum theoretical efficiency η attainable with a lossless Rotor that is not internally intercooled and with an External Turbine efficiency of $η_t$ is given by $η=η_t(1-T_{inlet}/T_{tip})$ where tip is the Maximum Flow Radius where it is assumed that all combustion occurs. Given that $T_{tip}=T_{inlet}+0.5 \, v_{tip}^2/c_p$ it can thus be seen that the attainable Engine efficiency is highly dependent upon the Rotor Tip Speed $v_{tip}$ at the Maximum Flow Radius. It is anticipated that a Rotor Tip Speeds of up to or exceeding 1000 ms$^{-1}$ may be employed in order to achieve high Engine efficiencies.

Internal intercooling may be utilised to produce substantially higher pressures and lower temperatures at the same Rotor Tip Speed and may thereby enable higher Engine efficiencies to be achieved at a given Rotor Tip Speed.

Liquids such as water are relatively incompressible, and within the Rotor will undergo changes in pressure p with radius given approximately by the equation $p_2=p_1+0.5ρ(v_2^2-v_1^2)$ where ρ is the liquid density in kg·m$^{-3}$. For example: for a cooling tube extending from the Rotor Axis to a radius where the tangential velocity is 1000 m·s$^{-1}$ the pressure may exceed 500 MPa.

Reheating

Optionally there may be Internal Reheat in which additional fuel is injected and combusted within the Combustion Gases as they flow towards the Rotor Axis from the Combustion Chamber, thereby increasing the temperature and pressure of the Combustion Gases flowing out of the Rotor Combustion Gas Outlet/s. There may also be additional fuel injection and combustion after the Combustion Gases exit the Rotor in External Reheat prior to or during the passage of the Combustion Gases through an External Turbine.

Reheating in the form of Internal Reheat and/or External Reheat may be particularly useful in cases where the maximum combustion temperature is limited by considerations such as the formation of undesirable emissions, high-temperature materials strength or corrosion, or excessive cooling requirements. Reheating will generally reduce the amount of air flow through the Rotor for a given power output and may consequently reduce the necessary Rotor size. Reheating will also generally increase the temperature of the Combustion Gases exhausted from the External Turbine, and may therefore enhance the attainable efficiencies of a heat Engine such as a steam turbine, Rankine Cycle or Stirling Cycle driven by heat recovered from the exhaust of an External Turbine.

Bypass Operation

The use of an External Compressor and External Turbine in combination with an External Combustor that may optionally also be used for External Reheat gives a further potential benefit in that the Engine of the current invention may then potentially be operated while bypassing the air flow around the Rotor, feeding the output from the External Compressor directly to the External Combustor and then to the External Turbine. This bypassing arrangement may be useful in situations where faster Engine starting is desired or in conditions where the operation of the Rotor is unsafe. This bypass operation may be particularly beneficial in aircraft or in applications that require very fast start up.

Rotor Casing

The Rotor rotates within a Rotor Casing in which a Rotor Casing Gas that surrounds the spinning Rotor is maintained at a low density relative to the ambient air surrounding the Rotor Casing in order to reduce the Rotor Windage Drag caused by the interaction of the spinning Rotor with the gas that surrounds it. The Rotor Casing Gas is maintained at low density relative to the ambient air through some combination of: employing a Rotor Casing Gas with lower molecular weight than air, preferred examples of which include hydrogen, helium, methane, steam, or ammonia; elevating the temperature of the Rotor Casing Gas above that of the ambient air; and most importantly reducing the pressure of the Rotor Casing Gas relative to the ambient air. By creating a partial vacuum within the Rotor Casing the Rotor Windage Drag can be reduced to very low levels. The use of a Rotor Casing Gas with lower molecular weight than air has an additional potential advantage in that the stagnation temperature of the gases impacting upon the fast moving Rotor is reduced owing to the relatively higher isobaric specific heats of low molecular weight gases, and this may be helpful in keeping exterior parts of the Rotor relatively cool.

The Rotor Casing will typically be in general form a shell of revolution about the Rotor Axis, and will have Rotor Casing Ports at one or both axial ends of the Rotor through which fluids may enter or leave the Rotor and through which mechanical connections such as bearing mounts and rotary drives may be connected to the Rotor. The Rotor Casing Ports will generally be circular and will be partially or completely sealed by rotary Rotor Vacuum Seals between the spinning Rotor and the Rotor Casing so that fluids may enter and exit the Rotor in partial or complete fluid isolation from the Rotor Casing Gas. If the Rotor Vacuum Seals are subject to some leakage either at rest or during operation then it will generally be necessary to make use of a vacuum pump to reduce the pressure of the Rotor Casing Gas.

Motor

A Motor or other Rotary Torque Providing Means is required to start and maintain the rotation of the Rotor at the desired operational speed. Typically the fluids that flow through the Rotor will enter and exit the Rotor with relatively little angular momentum about the Rotor Axis so that in many cases there will be is little or no torque required to maintain the flow of fluids through the Rotor, other than to overcome frictional torques such as are produced by Rotor Windage, Rotor Vacuum Seals and Rotor Bearings.

The Rotary Torque Providing Means may be a selection of one or more of the following group: an Electric Motor, a fuel burning Engine such as an Internal Combustion Engine, a Turbine driven by fluid pressure, a rotary transmission such as a belt drive or gearbox driven by a Rotary Torque Providing Means.

In a preferred embodiment the Rotary Torque Providing Means is an electric Motor, with a Motor Stator mounted off of the Rotor Casing and a Motor Rotor mounted off of the Rotor within the Rotor Casing where it will be subject to reduced Windage losses due to the low density of the Rotor Casing Gas. This also allows the Motor to be of larger diameter without incurring large Windage losses, which in turn may allow the Motor to be made substantially lighter. It is preferred that the Motor within the Rotor Casing be of an axial-flux type in which the magnetic forces are primarily in an axial direction so that they do not create unwanted radial forces upon the Rotor Bearing mounts.

Vacuum Pump Inlet

If a Vacuum Pump is required to maintain the Rotor Casing Gas at low pressure then it will typically be advantageous to use the rotary motion of the Rotor to provide some enhancement to the vacuum pumping by positioning the Vacuum Pump Inlet within the Rotor Casing near the maximum radius from the Rotor Axis where the Rotor Casing Gas tangential velocity about the Rotor Axis is greatest. The Vacuum Pump Inlet may optionally incorporate a Vacuum Pump Diffuser that converts some of the tangential velocity of the Rotor Casing Gas into increased static pressure at the Vacuum Pump Inlet.

Rotor Casing Fragment Retention, and Location of Auxiliary Equipment

The Rotor Casing also helps to prevent dangerous fragments from being released in the event of a failure of the Rotor. For this reason in applications where light weight is desirable the Rotor Casing may be partially or completely constructed from lightweight materials that can provide ballistic protection, such as high strength fibres and ceramics.

Locating Engine components that are external to the Rotor such as heat exchangers, radiators, filters, generators and pumps around the circumference of the Rotor Casing may also provide an increased level of safety in case of Rotor failure without incurring significant extra weight as any Rotor fragments released will have a greater chance of being stopped by impact with those external Engine components. The positioning of the external Engine components may be concentrated in certain sectors around the Rotor Axis to better protect sensitive equipment or people.

Rotor Vacuum Seals

The Rotor Vacuum Seals are very important to the efficient operation of the Rotor. For many potential types of Rotor Vacuum Seal there will be a limitation in Seal Sliding Speed, the tangential velocity of the seal at the maximum inner diameter of the seal. The Seal Sliding Speed limitation will in many cases have a dominant influence on the overall Rotor diameter as there will be a minimum required flow area through the centre of the Rotor Vacuum Seals to allow the fluids to get into and out of the Rotor efficiently and there will also be a desired Rotor Tip Speed in order to achieve the desired Engine efficiency.

It will generally be preferable to have smaller pressures across the Rotor Vacuum Seals. In most Engines it will be preferable for the Rotary Vacuum Seal to seal between the Vacuum and the Rotor inlet Air Pressure at or near the location of maximum air flow velocity into the Rotor where the air static pressure is lowest. But if there is an External Compressor supplying air to the Rotor then it may be advantageous for the Rotor Vacuum Seals to only seal between the vacuum and the atmospheric pressure, with another rotary seal between the atmospheric pressure and the Rotor Air Inlet pressure, thereby reducing the pressure across the Rotary Vacuum Seal.

There are two main classes of seals that may be used: Liquid Barrier Seals and Clearance Seals.

Liquid Barrier Seals

Liquid Barrier Seals such as Hydrodynamic Seals, Dynamic/Expeller/Repeller Seals, Magnetic Fluid Seals, Lubricated Face Seals and Lubricated Lip Seals all have the potential to prevent any gas leakage during operation, but the heat generated by the viscosity of the lubricating Barrier Liquid in the space between the rotating and the stationary parts of the seal will typically limit the allowable Seal Sliding Speeds to much lower speeds than are possible with Clearance Seals. This will tend to result in the Rotor being larger diameter than would be necessary with Clearance Seals.

The level of vacuum that can be maintained by a Liquid Barrier Seal may be limited by the boiling of the Barrier Liquid as it gets hotter, for this reason it may be necessary to utilise a low vapour pressure Barrier Liquid in the seal such as a vacuum pump lubrication oil and also to cool the seal and possibly using a cold labyrinth seal or other clearance seal between the Liquid Barrier Seal and the Rotor Cavity to condense and drain away any Barrier Liquid that does evaporate on the low pressure side of the Rotor Vacuum Seal. To limit the overall Rotor size while maintaining the low Seal Sliding Speeds and having the lowest pressure differential across the Rotor Vacuum Seals as well as cooling the Rotor Vacuum Seals with Inlet Air it will generally be preferable to have annular Rotor Air Inlets passing through similarly sized Rotor Vacuum Seals at each end of the Rotor and locate the Combustion Gas Rotor Outlet Tube through which the Combustion Gases flow out of the Rotor radially interior to the Rotor Air Inlet at one end of the Rotor with Fuel and any Coolant Fluid inlets and outlets radially interior to the Rotor Air Inlet at the other end of the Rotor.

Dynamic Seals otherwise known as Repeller or Expeller Seals are a preferred type of Rotor Vacuum Seal for the Engine of the current invention. They operate by spinning a Barrier Liquid rapidly about the Rotor Axis within an inwards facing Dynamic Seal Barrier Liquid Cavity that is a cavity of revolution about the Rotor Axis, thereby establishing a radial pressure gradient within the Barrier Liquid. A Dynamic Seal Rotor that is a body of revolution about the Rotor Axis and that rotates about the Rotor Axis relative to the Dynamic Seal Barrier Liquid Cavity is partially immersed in the Barrier Liquid within the Dynamic Seal Barrier Liquid Cavity and drives the rotation of the Barrier Liquid within the Dynamic Seal Barrier Liquid Cavity. When a pressure differential is imposed between the two axial sides of the Dynamic Seal Rotor it leads to a radial displacement of the free surface of the Barrier Liquid on either axial side of the Dynamic Seal Rotor thereby compensating for the pressure differential using the radial pressure gradient within the rotating Barrier Liquid, so that on the lower pressure side the free surface of the Barrier Liquid will be at a smaller radius from the Rotor Axis than on the higher pressure side. To create the necessary radial pressure gradient within the Barrier Liquid either the Dynamic Seal Barrier Liquid Cavity may rotate, or the Dynamic Seal Rotor may rotate about the Rotor Axis. Dynamic Seals of this type can accommodate a relatively large amount of misalignment as well as radial and axial movement between the Dynamic Seal Barrier Liquid Cavity and the Dynamic Seal Rotor while maintaining a gas-tight seal, and they do not wear, but they do not seal without rotation.

Optionally Dynamic Seals utilised in the Current Invention may be combined with a secondary seal that provides better sealing at low speed, and stops functioning as speed and centrifugal forces increase, preferred examples of such secondary seals include: Polymeric lip seals attached to the Rotor that deform and lose sealing contact when subjected to sufficient centripetal acceleration, Magnetic Fluid Seals in which magnetic fields hold a liquid that contains magnetic particles in place against gas pressure.

More than one Dynamic Seal may be linked together with intermediate bodies rotating at speeds that are intermediate to the Rotor and the Rotor Casing, thereby reducing the velocity differential that exists in each seal, though each seal experiences the same pressure differential, and thereby reduce the amount of power dissipated in each Dynamic Seal to reduce heating, and potentially increase the overall Seal Sliding Speed that may be achieved using Dynamic Seals.

Clearance Seals

Clearance Seals such as Gas Lubricated Face Seals or Labyrinth Seals or Brush Seals may all allow Seal Sliding Speeds of over 200 $m \cdot s^{-1}$, but at the cost of significant air leakage that must then be compensated for by a vacuum pump of sufficient size to maintain the Rotor Casing Gas at the desired low pressure to reduce Windage.

The ratio of seal circumference leakage flow to bore area flow means that such Clearance Seals may be the optimal solution for large Engines, particularly when it is necessary to limit the overall Rotor diameter. As the proportion of gas leakage flow relative to total flow through the centre of the seal will typically reduce as size increases. Gas Lubricated Face Seals in which two annular sealing faces are separated by a very small axial gap through which a small amount of gas leaks are a preferred solution as they have no wear and very low leakage rates. However such gas lubricated face seals are typically very expensive and require precise alignment to maintain their very small face clearances. The typically high expense of such seals, along with a leakage rate that is primarily dependent on circumference and the very high allowable Seal Sliding Speeds means that in many cases it will be preferable to have a single relatively large diameter Gas Lubricated Face Seal as the Rotor Vacuum Seal at one end of the Rotor through which all Air enters the Rotor by means of an annular Rotor Air Inlet concentric with the Rotor Axis and Combustion Gases exit the Rotor by means of a Rotor Combustion Gas Outlet Tube radially interior to this Rotor Air Inlet. Coolant Liquids and Fuel would preferably enter and exit the Rotor through the opposite end of the Rotor through relatively small diameter Rotor Vacuum Seals such as a Dynamic Seals.

To allow for imbalance and misalignment between a Gas Lubricated Face Seal and the Rotor it is preferred that a gas-tight compliant fluid joint such as a pipe bellows or flexible polymeric seal link between the Rotor and the rotating face of the Gas Lubricated Face Seal thereby allowing the rotating face of the Gas Lubricated Face Seal to move slightly relative to the Rotor and maintain a close clearance to the stationary face of the Gas Lubricated Face Seal.

Inlet Diffusers and Guide Vanes

In order to reduce the required diameter and therefore Seal Sliding Speed of the Rotor Vacuum Seals it is preferred that the Rotor Air Inlets have a minimum flow area at or near the Rotor Vacuum Seals, and that once the inlet air has passed through the Rotor Vacuum Seal or Seals that it be diffused by passing through an Inlet Diffuser of gradually increasing flow area within the Rotor in order to recover some of the dynamic pressure of the faster flowing air passing through the Rotor Air Inlets into increased static air pressure within the Rotor.

Once inside the Rotor air will preferably be accelerated tangentially by one or more internal surfaces that prevent the air from rotating in a vortex around the Rotor Axis at a rate different to the Rotor Angular Speed in order to reduce turbulence losses that might otherwise occur if such a vortex did form in absence of such internal surfaces.

In a preferred embodiment the Inlet Diffuser Passages will preferably be of generally conical frustum form about the Rotor Axis, and will also preferably incorporate one or more generally radial blades to accelerate the inlet air up to nearly the same angular velocity about the Rotor Axis as the Rotor. The radial blades may be twisted helically around the Rotor Axis to form an Air Inlet Inducer that will more gradually impart angular acceleration to the inlet air. Optionally there may also be Air Inlet Guide Vanes external to the Rotor that impart a rotation to the inlet air about the Rotor Axis prior to the inlet air entering the Rotor Air Inlets, the Air Inlet Guide Vanes may optionally be adjustable to better match changing inlet air volume flow rate.

Internal Intercooler

In a preferred embodiment of the current invention the air undergoing compression within the Rotor is intercooled by an Internal Intercooler comprising one or more Internal Intercooling Heat Exchangers that transfer heat energy from the air to the Coolant Fluid that is optionally cooled in an Off-Rotor Coolant Cooler, or in an Exterior Rotor Coolant Cooler. Internal Intercooling creates a number of useful benefits: The temperature of the Air flowing through the Compression Passage/s towards the Maximum Flow Radius is reduced significantly, helping to reduce material temperatures and making the air undergoing compression into a more useful coolant that may be used to reduce the temperature of the Combustion Chamber and Expansion Passage walls, thereby potentially allowing higher combustion temperatures; The pressure of the air entering the Combustion Chamber near the Maximum Flow Radius is increased significantly because Internal Intercooling makes the air cooler and denser while being compressed by the same centripetal accelerations, this increases the overall Engine pressure ratio and in many cases will increase the attainable efficiency for the same Rotor Tip Speed and may allow a smaller volume Combustion Chamber and smaller cross sectional area Expansion Passage to be used, which in turn may advantageously reduce the mass of these components and the loads they impose upon the Tensile Structure; More fuel may be burnt within the Combustion Chamber to give a greater temperature increase while still maintaining the same peak temperatures, this adds extra mass flow to the Combustion Gases, and ultimately to the External Turbine, and also provides greater potential for the fuel to be used as a coolant within the Tensile Structure.

Water and Alcohols or mixtures of water and alcohol are generally preferred for use as coolants for Internal Intercooling owing to their high specific heat capacities that reduces the volume flow rate required to enter and exit the rotor. They also have the benefit of being relatively cheap and non-toxic.

The typical overall effect of Internal Intercooling is to slightly increase Engine efficiency for the same Rotor Tip Speed, while also reducing the mass flow of air through the Rotor for the same power output, which may in turn lead to smaller diameter Rotary Vacuum Seals and a smaller Rotor diameter being required. The pressure at the Rotor Combustion Gas Outlet is also typically increased by Internal Intercooling, reducing the necessary Rotor Combustion Gas Outlet flow area and potentially also increasing the External Turbine efficiency slightly, but it may also require the use of more External Turbine stages, which may be uneconomic in small Engine sizes.

Internal intercooling will preferably be applied to the air undergoing compression within the Rotor over a span of radii that starts at a radius where the air slightly exceeds the temperature of the Coolant Fluid and extends out to a significant fraction of the Maximum Flow Radius, though efficiency will typically be reduced if the Internal Intercooling extends to the Maximum Flow Radius. In almost all cases intercooling will optimally be less than 80% of the Maximum Flow Radius, and in many cases will be somewhere within the range of 40-60% of the Maximum Flow Radius. However the optimum is a function of both the rotor speed and the maximum allowable combustion temperature as well as the temperature of the air within the internal intercooler and in some cases will be outside this range Typically slower rotor speeds and higher combustion temperatures lead to more intercooling being optimal. With sufficient Coolant Fluid flow and a large Internal Intercooler the Internal Intercooling process may approximate the thermodynamic ideal of isothermal compression, and may also have relatively low flow pressure losses.

The stresses arising from the very powerful centripetal accelerations within the Rotor make the implementation of an Internal Intercooler very challenging, particularly when the outer radius of the Internal Intercooler is a large fraction of the Maximum Flow Radius. Centripetal acceleration induced stresses within rings and constant thickness disks rotating at a given speed are typically much higher than they are in radial arms, and this makes some obvious heat exchanger configurations less feasible in practice.

In a preferred embodiment the Internal Intercooler is comprised of a plurality of plate-and-fin heat exchangers, each plate and fin heat exchanger being made up of a plurality of fins that are parallel to each other and that have their faces perpendicular or nearly perpendicular to the Rotor Axis. The fins are mechanically bonded to cooling plates along two edges of the fins through which cooling plates the Coolant Fluid flows in passages internal to the coolant plates. The plate and fin heat exchangers are arrayed around the Rotor Axis at the same radius and aligned in a radial direction so that the two cooling plates are approximately symmetrically disposed about a plane that is coincident with the Rotor Axis. The plate and fin heat exchangers are preferably partially or wholly constructed from aluminium alloys and/or copper alloys, but may incorporate other materials for added strength. This arrangement advantageously aligns the long dimensions of the fins and the plates in a nearly radial direction parallel or nearly parallel with the centripetal accelerations, so they may better withstand the high loads induced by the centripetal accelerations by acting as columns without being subjected to large bending loads. Advantageously the individual plate and Fin Heat exchangers may make Rotor construction simpler by allow assembly of the Internal Intercooler by inserting parts through a relatively small opening into the Tensile Structure. Optionally there may be more than one type of plate and fin heat exchanger used at different radii, with the radial outermost plate and fin heat exchanger type preferably having a smaller Rotor axial length that the radial innermost plate and fin heat exchanger type.

In a preferred embodiment the Internal Intercooler is contained within a Rotor Intercooler Casing that is a shell of revolution about the Rotor Axis and is partially or wholly constructed from composite materials. The Rotor Intercooler Casing contains the air pressure created within the Rotor and may optionally provide the structural strength required to retain the components parts of the Internal Intercooler against the centrifugal reaction forces created within the spinning Rotor. The Rotor Intercooler Casing may optionally also have one or more Radial Compression and Combustion Arms containing a Compression Passage, a Combustion Chamber and an Expansion Passage extending radially outwards from it.

Preferably if there is a single Radial Compression and Combustion Arm then the mass of the Internal Intercooler will be distributed around the Rotor Axis in a way that at least partially counterbalances the mass of the single Radial Compression and Combustion Arm.

Compression Passage

Some or all of a liquid Fuel may be optionally introduced into the air at some point prior to or during the compression within the Rotor to cool the air using evaporation of the fuel and thereby potentially increase the Combustion Chamber pressure due to increased density or reduced ratio of specific heats of the air-fuel mixture, or to better mix the air and fuel to improve combustion or reduce emissions.

The air flows to the Maximum Flow Radius through one or more Compression Passages, increasing in pressure and temperature as it does so. In the case of a Rotor employing an Internal Intercooler the air temperature within the Compression Passage may remain sufficiently low to allow the use of high specific tensile strength materials such as polymer composites or high strength steels to form the entirety of the Compression Passage and contain the air. If using polymer composites to form the Compression Passage walls then it may be necessary to use a thin impermeable barrier coat such as a layer of metal on the Inner Wall or liner of the Compression Passage to prevent air leakage out of the Rotor though micro-cracks within the polymer composite.

It is preferred that a Compression Passage surround and enclose the Combustion Chamber and Expansion Passage in those areas where combustion gas temperatures exceed the temperature capabilities of the Combustion Chamber and Expansion Passage wall in order to provide regenerative cooling of the Combustion Chamber and Expansion Passage walls using the air undergoing compression. Compression Passage, Combustion Chamber and Expansion Passage collectively comprise a Radial Compression and Combustion Arm.

The Compression Passage may optionally be tapered inwards with decreasing radius to advantageously reduce the mass of the Compressive Passage as well as increasing the radial air flow velocity to increase the regenerative cooling of the outside of the Combustion Chamber and Expansion Passage.

Optionally a thermally insulating coating may be applied to the inner surface of the Compression Passage to reduce cooling Compression Passage cooling requirements.

In a preferred embodiment a Compression Passage is formed as a radial tube with a closed end at the radially outermost end and having a thin metal Cooled Inner Wall that has Cooling Tubes bonded to it through which a Coolant Fluid flows, and over which Cooled Inner Wall and Cooling Tubes a high density-specific tensile strength polymer composite being part of the Tensile Structure is wrapped and bonded to support and retain the Cooled Inner Wall and Cooling Tubes against the internal air pressure and centripetal accelerations of the Rotor. Optionally the Compression Passage tapers inwards with increasing radii so that part of the centrifugal reaction forces presses the Cooled Inner Wall against the surrounding polymer composite Tensile Structure to improve the bonding between them and to allow the insertion of the Combustion Chamber through an opening in the Rotor more proximal the Rotor Axis.

Preferably there are exterior anchoring features bonded to the metal Cooled Inner Wall and/or the Cooling Tubes that mechanically engage within the polymer composite Tensile Structure in order to enhance the strength of the bond between them.

Optionally the exterior anchoring features of the Cooled Inner Wall and/or Cooling walls are formed by a selective metal sintering process utilising deposition and fusing of metal powders on the metal surface using a laser or an electron beam. Alternatively the exterior anchoring features are formed by modifying the surface of the Cooled Inner Wall and/or Cooling Tubes using a laser or electron beam that is moved over the surface in a manner that creates suitable surface protuberances.

Optionally a Combustion Chamber Shroud, exterior to the Combustion Chamber and Expansion Passage and mounted inside of and off of the Tensile Structure and/or the Tensile Structure's Cooled Inner Wall and supported at its radially innermost end and/or radially outermost end and/or at multiple locations along its radial length is incorporated within the Compression Passage and spans some part of the radial interval over which the Cooled Inner Wall is cooled by the Coolant Fluid. The Combustion Chamber Shroud reduces the Compression Passage flow area increasing the radial air flow speed around the Combustion Chamber and Expansion Passage, thereby enhancing their regenerative cooling while also reducing heat transfer to the Cooled Inner Wall, Tensile Structure and the Coolant Fluid. The Combustion Chamber Shroud is made of a material or a combination of materials that have lower density specific strength than the polymer composite of the Tensile Structure, but higher temperature capabilities. Parts of the Combustion Chamber Shroud may be loaded compressively if supported at locations more distal the Rotor Axis than the compressively loaded regions within the Combustion Chamber Shroud. Examples of materials from which the Combustion Chamber Shroud may be made in part or wholly from include: Ceramics, Ceramic Matrix Composites, Metal Matrix Composites, Titanium Alloys, Superalloys and High Strength Steels.

Uncooled Inner Compression Passage Wall

Preferably an Uncooled Inner Compression Passage Wall is supported off of or bonded to the Cooled Inner Wall or liner at intermittent locations of support and reduces the rate of heat transfer to the Inner Cooled Wall through some combination of air gaps and/or thermally insulating materials.

In a preferred embodiment the Uncooled Inner Compression Passage Wall is constructed from Foil Rings that fit with a small gap inside the Cooled Inner Wall and are bonded to the Cooled Inner Wall or liner at their radially innermost end, with their radially outermost end overlapping and optionally touching, but not bonded to the radially innermost end of the next Foil Ring in the direction of increasing radius, thereby allowing the radially outermost end to move relative to the Cooled Inner Wall or liner to accommodate differences in thermal expansion and stress induced strain between the Cooled Inner Wall and the Foil Rings. It is preferred that there be many Foil Rings as with reduced radial length each Foil Ring will have less tensile stress and there will be less vigorous centrifugal thermosiphon driven convection within radially shorter air gaps between the Foil Rings and the Cooled Inner Wall. The Foil Rings may optionally change in size and material composition with increasing radius and gas temperatures. Optionally the distinct Foil Rings may be replaced by a helical spiral of similar construction, with each successive turn of the spiral overlapping one or more the previous turns.

It is preferred that when the Rotor is not operating each Foil Ring have a significantly larger gap to the Inner Cooled Wall at the radial outermost end in order to compensate for the greater thermal expansion of the hotter radial outermost end compared to the cooler radial innermost end that during operation will cause the large gap at the radial outermost end to be reduced by its relative thermal expansion compared to the Cooled Inner Wall.

Optionally there may be intermittent protuberances from the Cooled Inner Wall or liner between the areas where the Foil Rings are bonded to the Cooled Inner Wall in order to prevent the Foil Rings from contacting the Cooled Inner Wall over large areas. The foil Rings will thereby only contact with the tips of the intermittent protuberances.

It may be desirable to have multiple overlapping layers of Foil Rings to further reduce the amount of heat transfer to the Cooled Inner Wall.

Metal alloys with high strength, good corrosion resistance and low thermal conductivity at elevated temperature are preferred for construction of the Foil Rings.

Compression Passage with Composite Band Over End

In another preferred embodiment the Compression Passage is formed as a radial tube with a closed end at the maximum radius, and is made in part or wholly out of a metallic or ceramic material having high density specific strength, and is retained against the large centrifugal reaction forces upon the Compression Passage by a Polymer Composite Band that extends from the Rotor at a radius more proximal the Rotor Axis and wraps over the radial outer end of the Compression Passage without making contact with the Compression Passage wall outside of the radially outer end region. The Polymer Composite Band optionally has a layer of thermal insulation between itself and the Compression Passage in the area of mutual contact and preferably incorporates Cooling Tubes that have a Coolant Fluid flowing within them bonded to or within the Polymer Composite Band. The Compression Passage is preferably compressively loaded in the radial direction over some span of radii radially inwards from the Maximum Flow Radius, though the compressive loading may eventually transition to tensile loading closer to the Rotor Axis, the Compression Passage may be tapered inwards with decreasing radius to advantageously reduce the mass of the Compressive Passage as well as to reduce the compressive stress levels and increase the radial air flow velocity to increase the regenerative cooling of the outside of the Combustion Chamber and Expansion Passage.

Composite Tensile Structure and Cooling Of Composite Tensile Structure

Density specific strength, measured in $m^2 \cdot s^{-2}$, of the materials used to construct the Rotor is extremely important, with higher values at higher temperatures being most desirable.

Titanium Silicon Carbide metal matrix composites have density specific tensile strength up to 400,000 $m^2 \cdot s^{-2}$ at temperatures near 700° C. This may make it possible to construct uncooled Tensile Structures adjacent to but outside of the Combustion Chamber, though metal matrix composites are exceptionally expensive to manufacture, and so may not be economic for many applications.

A variety of metal alloys such as Maraging Steels and Titanium alloys have density specific tensile strengths above 200,000 $m^2 \cdot s^{-2}$ at temperatures up to 300-400° C. range, while a number of Ceramic and Ceramic Matrix Composite materials have density specific tensile strength exceeding 200,000 $m^2 \cdot s^{-2}$ at temperatures up to 1000° C., but are typically difficult to manufacturing and severely weakened by small flaws due to a lack of ductility. Some Titanium Aluminide and Nickel alloys exhibit density specific tensile strengths of about 150,000 $m^2 \cdot s^{-2}$ at 700° C. but may be subject to creep that will necessitate operation at much lower loadings. They may find some areas of application within the hotter areas of the Rotor.

Polymer fibre composites such as carbon fibre in epoxy, bismaleimide or polyimide matrix may have exceptionally high density specific tensile strength of up to 2,500,000 $m^2 \cdot s^{-2}$ along the length of the fibres, but even the most expensive polyimides will typically need to operate at less than 250° C. for long life. If used for Tensile Structures they will generally need to be cooled at least in the areas nearest the Combustion Chamber.

It is generally preferred that polymer fibre composites form part or all of the Tensile Structure that extends radially outwards past the Maximum Flow Radius to retain components such as the Combustion Chamber against the centrifugal reaction forces created by the Rotor centripetal accelerations. As polymer fibre composites typically cannot withstand exposure to combustion temperatures or even to the temperature of the compressed air at the Maximum Flow Radius they will preferably be in contact with or incorporate metallic Cooling Tubes that have a Coolant Fluid flowing within them to effect cooling of the Tensile Structure.

It is preferred that there be a plurality of Cooling Tubes through which the Coolant Fluid flows in parallel to thereby increase the flow velocity and heat transfer coefficients that can be achieved for a given pressure drop across the Cooling Tubes as well as to reduce the temperature rise of the Coolant Fluid in each Cooling Tube. Preferably the Cooling Tubes are aligned in a primarily radial direction so as to approximately minimise the length of each Cooling Tube required to transport the Coolant Fluid from the radially innermost end to the radially outermost extent of the Cooling Tube and thereby generally reduce the total pressure loss through the Cooling Tubes as well as advantageously approximately aligning them with the centrifugal reaction forces and the majority of the fibres within the polymer fibre composite of the Tensile Structure. Advantageously radially aligned Cooling Tubes may also add greater buckling resistance to the Cooled Inner Wall of the Compression Passage that they are bonded to. Coolant Flow through the Cooling Tubes will generally be at least partially driven by centrifugal thermosiphon.

It is preferred that the Tensile Structure made of polymer fibre composite be at least partially manufactured by automated filament winding over top of Cooling Tubes and Cooled Inner Wall.

Advantageously in the event of a Rotor failure, polymer fibre composites have relatively low density and tend to have very high energy dissipation as they break apart. Compared to metals they have a reduced tendency to produce large dense fragments that might be dangerous to surrounding people or equipment.

Combustion Chamber

Combustion is important to the overall efficiency of the Engine, and unlike many other components of the Engine is less able to be scaled down owing to the typically relatively constant combustion residence times required for combustion processes to occur. However, volume specific combustion intensities measured in $W \cdot m^{-3}$ are typically proportional to combustion pressures so that higher pressures allow more power to be released in the same volume, favouring higher pressures for reducing the Combustion Chamber volume.

Within the extremely high centripetal acceleration environment within the Combustion Chamber any localized source of heat such as a pocket or zone of combustion will lead to extremely powerful convective recirculation driven by relative differences in gas density between relatively hotter and cooler zones at the same radius from the Rotor Axis. This recirculation is somewhat analogous to the recirculation visible in the mushroom-cloud of an atmospheric nuclear explosion, though with the addition of Coriolis effects the convection will typically be of the form of a vortex rotating in the same direction as the Rotor rotation with cooler gases flowing radially outwards at the Rotationally trailing interior face of the Combustion Chamber and hotter gases flowing radially inwards at the rotationally leading interior face of the Combustion Chamber. This will lead to very rapid flame mixing and flame propagation and may contribute to the feasibility of very high volume specific combustion intensities and very short combustion residence times to allow the reduction of the Combustion Chamber volume and an increase in allowable combustion temperatures without creating excessive Nitrous Oxides ($NO_x$). Injection of the fuel near the maximum radius and closer to the trailing internal face of the Combustion Chamber is therefore preferred to enhance mixing and flame propagation. Injection of some proportion of the fuel to mix with the air prior to it entering the Combustion Chamber to improve mixing may also speed the combustion process and reduce $NO_x$ formation.

The use of liquid fuels is favoured as the extremely high pressures that may be evolved within a liquid fuel as it flows through a constraining Fuel Injector to the Combustion Chamber near the Maximum Flow Radius of the Rotor means that it may be injected under extremely high pressures leading to very rapid mixing and evaporation thereby speeding the combustion. Liquid Fuels will therefore generally not need to be supplied to the Rotor under significant pressure. Liquid fuels do present some danger if ignition fails or combustion stops and the liquid starts to accumulate in the rapidly spinning Rotor, and for this reason it may be advantageous under some circumstances to vaporise liquid fuels and supply them as gases under pressure to the Rotor. Alternatively a burst disk or other emergency valve that opens in case of over-pressure within the Combustion Chamber may be incorporated into the Rotor to release any accumulation of liquid such as Fuel or leaking Coolant Fluid within the Rotor into the Rotor Casing without causing a catastrophic Rotor failure.

Gaseous fuels with lower average molecular weight than air such as methane or ammonia will typically need to be supplied to the Rotor under pressure if they are to be injected directly into the Combustion Chamber. This may be partly compensated for by intercooling the gaseous fuel within the Rotor to increase its pressure as it flows radially outwards towards the Combustion Chamber.

Combustion temperatures will typically need to be limited to prevent the formation of excessive amounts of $NO_x$. This is particularly true for high pressures that may be encountered in the Engine of the current invention. While undesirable NO formation may limit the operational temperatures and pressures of the Combustion Chamber in some cases the Engine of the current invention may be required to operate at Combustion Chamber gas pressures that exceed 10 MPa and/or gas temperatures that exceed 1500° C. while still maintaining physical integrity in the very high centripetal acceleration environment near the Maximum Flow Radius. Creating a Combustion Chamber design that can survive in these conditions presents an extremely difficult challenge.

The use of high density specific strength materials helps to increase the span of tangential velocities over which they can support a load. Ceramics such as Silicon Carbide and Silicon Nitride have extremely high density specific compressive strengths on the order of $1,000,000 \ m^2 \cdot s^{-2}$ which is 10-100 times higher than metal superalloys at temperatures above 1000° C. Unfortunately ceramics like Silicon Carbide and Silicon Nitride are typically far weaker and less reliable in tension than in compression and generally difficult to manufacture in complex shapes or with thin sections. Additional problems arise with their low ductility, high stiffness and hardness that make it difficult to machine them and to transfer loads to them from other parts. They are also typically subject to rapidly worsening erosion by water vapour in combustion gases as temperatures rise above about 900° C. as well as in higher water vapour partial pressures and when exposed to higher gas flow velocities. This erosion temperature limitation and the lack of alternative materials capable of surviving the environment of the Combustion Chamber will in general necessitate the use of a design in which the Combustion Chamber and possibly also Expansion Passage wall are cooled by a fluid to reduce their temperature.

While there are some special metal alloys that can be exposed to Combustion Gases at higher temperatures than 900° C. without significant corrosion, they generally have very low density specific tensile and compressive strength when compared to ceramics such as Silicon Carbide and Silicon Nitride. They also have relatively low thermal conductivity and high thermal expansion rates that may lead to high thermally induced stresses when high heat fluxes pass through them as in a wall with coolant on one side and high temperature combustion gases on the other.

It is therefore a preferred solution to construct the Combustion Chamber and Expansion Passage in part or wholly from a ceramic of which Silicon Carbide, Silicon Nitride, Alumina and Mullite are preferred examples, and to retain each Combustion Chamber and optionally part or all of the Expansion Passage within a cooled Tensile Structure made out of a high strength polymer fibre composite.

Heat transfer from the Combustion Gases to the Combustion Chamber wall and Expansion Passage typically reduces Engine efficiency as it extracts heat energy from the Combustion Gases that might otherwise be turned into useful work in a turbine.

Within the Rotor there are strong recirculating flows on surfaces that are colder or hotter than the adjacent gas due to the same buoyancy effects that drive centrifugal thermosiphons. In the Combustion Chamber and Expansion Passage a cooler jet flow is formed by Combustion Gases that are cooled by the walls and flows radially outwards on surfaces that face tangentially towards the direction of rotation, while in the Compression Passage a warmer jet flows radially inwards on surfaces that face tangentially away from the direction of rotation. The bigger the difference in temperature between the gas and the wall the faster these flows will become and consequently the rate of heat transfer from the Combustion Gases to the Combustion Chamber wall and Expansion Passage wall is highly dependent on the temperate difference between the Combustion Gases and the walls. Ideally the temperature of the wall and gas should be kept as close to each other as possible.

It is thus highly advantageous to operate the Combustion Chamber wall and Expansion Passage wall with smaller temperature differences to the Combustion Gases and this will generally mean operating the materials at close to their maximum temperature limits set by corrosion/erosion and strength limitations. It is also generally helpful to reduce the total wall area exposed to the Combustion Gases to reduce the amount of heat energy lost to cooling. This makes the use of a single Combustion Chamber and Expansion Passage within the Rotor advantageous, though in some cases it may be desirable or necessary to use more than one Combustion Chamber for Rotor balancing purposes or to reduce the size of the Combustion Chambers in a large Engine, or because the Combustion Chamber walls would otherwise need to be made excessively thick with increasing size.

While it would be possible to use a Coolant Fluid to directly cool the Combustion Chamber and Expansion Passage the potentially large amount of heat energy extracted from the Combustion Gases would in most cases be wasted, and would increase the required Coolant Fluid cooling, whereas by utilising the air undergoing compression to regeneratively cool the Combustion Chambers and Expansion Passage that heat energy is returned to the Combustion Gases when it undergoes combustion, thereby generally reducing Engine efficiency by less. It is therefore preferred to utilise the air undergoing compression to at least partially regeneratively cool the Combustion Chamber and Expansion Passage.

To enable regenerative cooling of the Combustion Chamber and Expansion Passage using the air undergoing compression as well as to minimise the Combustion Chamber and Expansion Passage wall area it is preferred to surround the Combustion Chamber and Expansion Passage with the Compression Passage. This has a secondary benefit of interposing relatively cool air between the hot Combustion Chamber and Expansion Passage and the cooler Tensile Structure.

Efficiency is improved by having the combustion occur at or near the Maximum Flow Radius where pressures are highest. It takes a certain amount of time for fuel to mix and burn with the air in the Combustion Chamber, so in relatively small Engines it is desirable to slow the average radial flow rate within the Combustion Chamber to ensure that the combustion is completed nearer to the Maximum Flow Radius, this results in a requirement for a relatively large Combustion Chamber cross-sectional flow area in the radial direction. After combustion is complete it becomes desirable to accelerate and flow the Combustion Gases directly radially inwards at relatively high flow velocities to reduce the required wall area within the Expansion Passage and thereby reduce unwanted heat transfer to the Expansion Passage walls as well as reducing the tendency for cooler outward flowing jet flows to form on the tangentially trailing face of the Expansion Passage due to the higher dynamic pressure of the radially inward flowing Combustion Gases. The resulting smaller wall area of the Expansion Passage also has the secondary benefits of reducing the mass of the Expansion Passage, and in the case of a radially compressively loaded Combustion Chamber and Expansion Passage it means that the compressive forces are spread over an Expansion Passage wall and Combustion Chamber wall cross-sectional area that increases with increasing radius, thereby reducing the compressive stress levels at large radii compared to a constant cross sectional area Expansion Passage.

As Rotor Diameter increases it will generally become feasible to employ higher radial flow velocities within the Combustion Chamber without reducing Engine efficiency significantly, and so for larger Rotors the optimal reduction in cross sectional area between the Combustion Chamber and Expansion Passage is likely to be smaller, and there may be no reduction at all in very large Rotors.

As the Combustion Gas flows radially inwards through the Expansion Passage it will reduce in temperature, pressure and density and this may make it preferable to increase the cross-sectional flow area of the Expansion Passage with decreasing radius at radii below the radius at which the maximum Combustion Gas radial flow velocity is achieved in order to prevent further increases in the radial flow velocity with consequent increased flow losses.

If the Combustion Gases flowing radially inwards and expanding within the Expansion Passage expand and drop in temperature to below the material temperature limits of the Expansion Passage wall then it may become desirable to insulate the exterior of the Expansion Passage to limit heat transfer to the air undergoing compression.

In order to maintain the Combustion Chamber wall and Expansion Passage wall under the desired temperature limits it may additionally be necessary to enhance the heat transfer to the air undergoing compression. This may be in part or wholly achieved by restricting the radial cross sectional flow area around the Combustion Chamber and Expansion Passage to increase the radial flow velocity of the air using a Combustion Chamber Shroud or the like. The heat transfer may also be enhanced by creating increased wall surface area on the outer surface of the Combustion Chamber wall and Expansion Passage wall by means of the addition of fins, grooves or other similar features. Should such heat transfer enhancement be required in order to limit Combustion Chamber wall or Expansion Passage wall temperatures, then such area restriction and/or increased wall surface area features are preferred solutions.

Care must be taken with the Combustion Chamber design to ensure that the Combustion Gases do not flow back out of the Combustion Chamber Air Inlets and into the Compression Passage. A number of design features may help to prevent this: Increasing the pressure drop through the Combustion Chamber Air Inlets by decreasing their size, make fuel injection and/or combustion occur at a smaller radial distance from the Rotor Axis than the radius of the Combustion Chamber Air Inlets, make all of the air inlets at or near the same radial distance from the Rotor Axis so that the air pressure at each Combustion Chamber Air Inlet is nearly equal, connect the Combustion Chamber Air Inlets together with an air passage external to the Combustion Chamber at a radius the same or greater than the radius of the Combustion Chamber Air Inlets.

Significant problems arise in trying to transfer the extremely high loads from the Ceramic Combustion Chamber to the polymer fibre composite Tensile Structure without creating unacceptable stresses in either. They also undergo significant differences in thermal expansion during operation, and as it is desirable for both to be loaded to a large proportion of their ultimate strength, the ceramic in compression, the polymer composite in tension that produces elastic strain of opposite signs in the ceramic Combustion Chamber and the Tensile Structure. While allowing large compressive stresses to exist within the Ceramic it is very important to limit the tensile stresses to relatively small values in order to prevent failures. Ceramics and polymer composites also have different material properties in terms of hardness, stiffness, and thermal expansion. Ceramics are in most cases homogenous and isotropic, while fibre reinforced composites are generally not homogenous and are anisotropic.

Of the solutions investigated the preferred solution is a Combustion Chamber with a convex domed radially outermost surface retained within a complementary concave radial inward facing cup in the Tensile Structure, optionally with a thin thermally insulating and/or compliant Combustion Chamber Interlayer separating them. This solution has a number of significant advantages: the relatively large radii of curvature and relatively thin shells of both the Combustion Chamber and the Tensile Structure adjacent the Combustion Chamber helps to limit the stress variation through the shell thickness of each; the loads within the ceramic are mostly compressive, while those in the Tensile Structure are mostly tensile; dimensional changes due to thermal and elastic deformation are accommodated by slight deformation of the relatively thin and large-radius of curvature domes, optionally helped by compliance in the interface between them; the thermally insulating and/or compliant Combustion Chamber Interlayer is retained in a way that reduces or even in some cases eliminates the requirement for it to have strength at elevated temperature, and for some configurations may even allow it to be a liquid or powder.

It is therefore a preferred embodiment to utilise one or more Combustion Chamber and Expansion Passage that are in part or wholly constructed from a ceramic of which Silicon Carbide and Silicon Nitride are preferred examples, the Combustion Chamber being in general form a convex dome shell covering over the larger end of a conical frustum transition to a tubular Expansion Passage aligned in an approximately radial direction. The convex dome being at the end distal most the Rotor Axis and being retained against Rotor centrifugal reaction forces by a complementary convex cup within a Tensile Structure external to the Combustion Chamber, air entering the Combustion Chamber by means of one or more orifices through the surface of the Combustion Chamber at or near the same radial distance from the Rotor Axis to be combusted with a Fuel before flowing radially inwards through a transition to the Expansion Passage that is in general form a conical frustum, optionally there may be fins or other means of increasing heat transfer area on the outer surface of the Combustion Chamber.

Benefits of Single Combustion Chamber

Apart from the typically reduced cooling losses and lower manufacturing costs that a single Combustion Chamber Engine is likely to enjoy, there are also a number of other advantages: A single larger Combustion Chamber is likely to have proportionally thicker walls that if subjected to erosion by steam in the Combustion Gases will lose proportionally less thickness in the same amount of time than would a smaller thinner Combustion Chamber, thereby likely increasing the safe life of the Combustion Chamber; Multiple smaller Combustion Chambers are more likely to be subject to minimum thickness limitations in the ceramic manufacturing process that may make their walls thicker than would otherwise be desirable, thereby making the Combustion Chamber relatively more massive for the volume contained within than would be the case in larger sizes, leading to higher interfacial pressures between the Combustion Chamber and the Tensile Structure that in combination with smaller radii of curvature of the Combustion Chamber and Tensile Structure domes may also lead to higher material stresses in this area.

Multiple Combustion Chambers also face problems with the potential for flow-reversal if operated with parallel flow because the high pressure Combustion Gases from one Combustion Chamber can potentially flow backwards through another Combustion Chamber into the Rotor Air Inlet, thereby quickly leading to overheating of components not designed for high temperatures and consequent Rotor failure. This issue may not occur during normal operation as if flow through a Combustion Chamber starts to slow while the fuel flow remains the same then the combustion will generally increase in temperature and so create higher pressure to counteract the reduction—in effect all Combustion Chambers will tend to equalise in the temperature and pressures they produce by varying the mass flow through them, but if there is a failure in ignition in one or more chambers or the combustion temperature drops too low in one Combustion Chamber leading to a cessation of combustion then the likelihood of flow reversal becomes a serious problem.

In some cases there may also be potential for undesirable pressure-wave oscillations that form between multiple Combustion Chambers, that if strong enough may lead to destructive flow reversal.

Yet another potential benefit to a single Combustion Chamber is that the Counterbalance Mass that is used to counterbalance the single Radial Compression and Combustion Arm on the opposite side of the Rotor Axis may be located at a relatively small radius. While this requires greater mass it reduces the Rotor moment of inertia, and as a consequence reduces the Rotor rotational kinetic energy—generally leading to faster Rotor acceleration and less energy to be supplied or removed when starting and stopping as well as less energy to be dissipated in a Rotor Failure. The reduction in the moment of inertia may also be beneficial in reducing gyroscopic reaction forces on the Rotor Bearings if the orientation of the Rotor Axis is altered.

Transpiration Cooling.

It may also be useful to utilise transpiration cooling of the Combustor Chamber and/or Expansion Passage, in which cooler air flows through passages within the walls before being injected into the Combustion Chamber to cool the surfaces and dilute the combustion gases, thereby better cooling the walls and potentially allowing higher Combustion Chamber gas temperatures.

The cooling air injected into the Combustion Chamber and/or Expansion Passage radially inwards from the radially outermost Combustion Chamber Air Inlets needs to be at elevated pressure at the same radius relative to the rest of the air that enters the Combustion Chamber through the radially outermost Combustion Chamber Air Inlets. This is preferably achieved by Internally Intercooling the cooling air within a separate Compression Passage in the Rotor to a lower temperature and/or to a larger radius than the rest of the air that enters the Combustion Chamber through the radially outermost Combustion Chamber Air Inlets so as to give a higher air pressure at the Maximum Flow Radius. Alternatively a higher pressure source of air may be supplied to the rotor through a separate Rotor Air Inlet.

Combustion Chamber Interlayer

The Combustion Chamber Interlayer is preferably in general form a domed shell that fits between the domed radially outer end of the Combustion Chamber and the complementary concave radial inward facing cup in the Tensile Structure and provides a deformable compliant layer that can accommodate slight mismatches in the relative shapes of the Combustion Chamber and the Tensile Structure in the region of contact thereby reducing the likelihood of localised excessive forces by more evenly distributing the compressive contact pressure forces between the Combustion Chamber and the Tensile Structure. This may helpfully reduce the tolerances required in manufacturing as well as better accommodating relative dimensional changes caused by Rotor operation.

The Combustion Chamber Interlayer also preferably provides some thermal insulation between the Combustion Chamber and the Tensile Structure to reduce the amount of cooling required for the Tensile Structure.

There are a number of preferred options for creating the Combustion Chamber Interlayer.

It is preferred that the interlayer incorporates dense solids and/or powders and/or fibres made of ceramics, of which Silica, Calcium Silicate and Calcium Alumosilicate are preferred examples due to their relatively low thermal conductivity and low density, but many other ceramics may also be suitable.

In a preferred solution the Combustion Chamber Interlayer will incorporate a layer of ceramic fibres and/or powder and/or metallic fibres and/or sintered metallic wires that have microscopic internal voids that allow the Combustion Chamber Interlayer to be plastically crushable in areas with highest interfacial pressure. This may not be sufficiently capable of redistributing interfacial pressure loads at very high Rotor Tip Speeds, and more complex Combustion Chamber Interlayer solutions may be required.

Alternatively a weak plastically deformable material that is solid at ambient temperatures and that has appropriate density may be used to create the Combustion Chamber Interlayer. When subjected to high centripetal accelerations and heat the material will deform and flow to distribute pressure over the dome with a radial hydrostatic pressure gradient such that the Combustion Chamber will in effect be floating on the Combustion Chamber Interlayer. Such an Interlayer may also incorporate an additional layer of thermally insulating material to reduce heat conduction.

Alternatively a relatively low density plastically deformable solid or liquid may be sealed within a double walled metallic domed shell Combustion Chamber Interlayer in order to more equally distribute pressure over the inner and outer surfaces of the dome without relying upon the Rotor radial hydrostatic pressure gradient to provide all of necessary interfacial pressure. The double walled metallic domed shell effectively acting as the membrane of a balloon that redistributes pressure internally. Optionally a Coolant Fluid liquid that fills the double walled metallic domed shell may be circulated to remove heat from the Interlayer and then itself be cooled elsewhere. Additionally there may also be a layer of thermally insulating material internal or external to the double walled metallic domed shell.

If the thermally insulating material incorporated in the interlayer is physically weak or has voids within it such as a layer of powder or fibre might have then it may be necessary to cover it in a thin impermeable and ductile metallic foil skin to prevent the insulating material from being penetrated by a liquid or plastically deformable interlayer component and to also prevent it from becoming dislodged when the Rotor is stopped.

In another preferred embodiment The Combustion Chamber will have external grooves on its domed outer surface through which air flows to enter the Combustion Chamber through Combustion Chamber Air Inlets in the domed outer surface of the Combustion Chamber. The compliant Combustion Chamber Interlayer must then be prevented from blocking the external grooves on the Combustion Chamber surface and so it is preferred that there be a Metallic Dome Shell Layer in contact with the Combustion Chamber domed outer surface that is thick enough to prevent pressure within the Interlayer from pushing the Metallic Dome Shell Layer inwards to block off the external grooves.

Internal Insulation and/or Corrosion Inhibiting Coatings

The Combustion Chamber and Expansion Passage may have a thermally insulating and/or corrosion inhibiting coating applied over part or all of its internal surfaces to reduce heat transfer and/or erosion of the walls. In particular it is preferred that a layer of thermal insulation be applied to the inner surface of the radially outermost dome end of the Combustion Chamber as centrifugal reaction forces directed radially outwards will in part press the thermal insulation against the inner surface of the dome thereby helping to maintain the position of the thermally insulating coating. Relatively cool air entering the Combustion Chamber will tend to accumulate at the radially outermost extent of the dome due to buoyancy effects and thereby generally maintain the gas temperatures in the radially outermost area of the Combustion Chamber below the peak Combustion Gas temperatures.

Expansion Passage

Combustion Gas temperatures within the Expansion Passage reduce in approximate proportion to the tangential velocity squared, so that for example approximately 75% of the Combustion Gas temperature reduction within the Rotor will occur by the time the Combustion Gases reach 50% of the Maximum Flow Radius. This means that for a Rotor Tip Velocity of 1000 m·s$^{-1}$ the temperature will drop by as much as 400K between the Combustion Chamber and the Rotor Outlet. In many cases this will drop the Combustion Gas temperatures below the maximum allowable Expansion Passage wall temperature at some radius intermediate the Combustion Chamber and the Rotor Axis.

The Expansion Passage is preferable a radially aligned tube in order to reduce its surface area and mass as well as to keep centrifugal reaction forces directed along its length to thereby avoid creating bending loads within the Expansion Passage. Optionally the Expansion Passage will have variable diameter along its length in order to create the desired Combustion Gas radial flow velocity at any given radius. The Expansion Passage joins to a Combustion Gas Bend Transition by means of an Expansion Passage Radial Expansion Joint that provides a partially or completely sealed joint between the Expansion Passage and the Combustion Gas Bend Transition and that allows the Expansion Passage to move radially with respect to the Combustion Gas Bend Transition in order to accommodate the radial displacements caused by thermal expansion and centrifugal reaction force induced strains.

The Combustion Gas Bend Transition optionally includes an additional inner radial section of the Expansion Passage that is subject to tensile stresses along its length and extends radially outwards to the Expansion Passage Radial Expansion Joint. The Combustion Gas Bend Transition redirects the radially inward flowing Combustion Gas to flow axially through the Rotor Combustion Gas Outlet Tube, and may incorporate Flow Bend Vanes within the Combustion Gas Bend Transition flow passage to reduce flow losses that would otherwise occur when the Combustion Gases change direction from flowing radially inwards to flowing axially.

The Internal surfaces of at least part of the Combustion Gas Bend Transition and Rotor Combustion Gas Outlet Tube are preferably thermally insulated by coatings or the like so that the inlet air flowing around them can help keep their outer surface temperatures lower and reduce undesirable heat transfer between the hot Combustion Gases and the cold air entering the Rotor.

Rotor Combustion Gas Outlet and Seals

The Rotor Combustion Gas Outlet is preferably located at one end of the Rotor with air flowing into the Rotor through a Hot End Rotor Air Inlet that encircles the Rotor Combustion Gas Outlet Tube and that terminates in the Rotor Combustion Gas Outlet. This advantageously means that the Hot End Rotor Vacuum Seal is not directly exposed to hot and high pressure Combustion Gas, but is instead exposed to relatively cold and low pressure air.

In many cases the Rotor Combustion Gas Outlet will require a Combustion Gas Outlet Rotary Seal to seal between the spinning Rotor Combustion Gas Outlet Tube and a stationary external Combustion Gas Outlet Manifold such as the inlet to an External Turbine. This Combustion Gas Outlet Rotary Seal prevents the hot pressurised Combustion Gases from escaping into the atmosphere or into the Rotor Air Inlet. A number of preferred options exist for the Combustion Gas Outlet Rotary Seal including: Brush Seals, Gas or Liquid Lubricated Face Seals, Labyrinth Seals, Polymeric Lip Seals and Dynamic Seals that preferably use water or oil as the Barrier Liquid and as a coolant.

Some of these potential Combustion Gas Outlet Rotary Seal types are sensitive to heat and will require cooling either by a liquid coolant and/or lubricant or possibly by the Rotor inlet air. The Combustion Gas Outlet Rotary Seal may be further protected from high temperatures by cooled labyrinth seals or the like that cool any Combustion Gas leakage before it reaches the Seal, and the Seal may be further protected by Thermal Insulation between it and the Rotor Combustion Gas Outlet and/or the Rotor Combustion Gas Outlet Tube.

Turbines

Unlike typical turbo-machinery dynamic compression and expansion processes the compression and expansion processes within the Rotor have the potential to be extremely efficient even in relatively small Engine sizes and at relatively low mass flow rates. This may make it possible to achieve relatively high Engine efficiencies in Engines with less than 100 kW output, however overall Engine efficiency is very strongly dependent upon the efficiency of the External Turbine.

An Internally Intercooled Engine of the current invention has the potential to produce very large turbine temperature drops owing to the large amount of temperature rise in the Combustion Chamber and the high Engine pressure ratios achievable.

It is generally difficult to build simple efficient turbines that can accommodate large temperature drops (temperature is approximately proportional to enthalpy) at low mass flow rates. This is partly due to the large change in Combustion Gas density through the turbine associated with large temperature drops that typically requires a similarly large change in the flow area through the turbine which is difficult to achieve in radial inflow and axial flow turbines, but is also in part due to the high flow velocities typically required to permit large enthalpy drops per stage. High flow velocities result in small flow passage sizes that have increased flow losses as well as blade tip clearances that tend to grow proportionally larger in small sizes, further reducing efficiency. Small Engines will typically also need to be built cheaply in order to be competitive with other types of Engines meaning that complex multi-stage axial compressors and turbines may not be economically justifiable.

Multi-stage axial flow compressors and turbines will normally be able to achieve higher efficiencies than equivalent radial flow compressors and turbines, but will also generally require more stages for the same temperature drop and will typically incur far higher manufacturing costs. Single spool (a group of stages that are connected to rotate together) axial flow turbines comprised of multiple successive stage pairs of stator and rotor blades have difficulties in accommodating very large drops in temperature owing to the large change in density of the expanding gases from inlet to outlet that generally requires a similarly large change in the flow area through the turbine. As a result in high pressure ratio turbines there is often more than one turbine spool used with the lower pressure spools typically rotating at slower speeds owing to their larger diameter.

While multi-stage and multi-spool Engines are generally economically acceptable in large sizes, for small Engines of the current invention it may be preferable to utilise a cheap and simple single stage radial inflow External Turbine such as are used in Internal Combustion Engine turbochargers and that allow relatively high Combustion Gas temperature drops in a single stage. A single stage radial inflow External Turbine can be matched to a Rotor in which mass flow is increased and the temperature rise in the Combustion Chamber is decreased relative to more optimally efficient multi-megawatt Engines, so that the temperature drop through the single stage External Turbine is acceptably low.

It is also likely that in some cases small Engines with more than one stage of radial or axial turbine will be the preferred solution, and in order to accommodate large changes in Combustion Gas density it may be preferable to have one or more stages of the turbine spinning at different speeds in a multi-spool External Turbine.

Due to the expected high efficiency of the Engine of the current invention as well as the significant temperature drop between the Combustion Chamber and the Rotor Combustion Gas Outlet it is anticipated that the External Turbine inlet temperatures will in many cases be relatively low when compared to conventional Gas Turbine Engines and in most cases the External Turbine will be uncooled. The External Turbine temperatures may be reduced further by likely economic limitations on the maximum Combustion Gas temperature drop through the External Turbine created by the added complexity and cost of multi-stage and multiple-spool External Turbines. Lower External Turbine inlet temperatures may make it possible to use cheaper materials and manufacturing techniques to create the External Turbine, and may also enable higher operating speeds that may in turn allow greater Combustion Gas temperature drops through a single stage External Turbine.

Turbine Variable Inlet Guide Vanes

In many applications it is desirable to be able to alter the amount of output power rapidly and efficiently. While Combustion Gas flow rates through the Rotor may be altered very quickly an External Turbine of non-Variable Geometry connected to a Generator or other load may not be able to alter its speed as fast as is desired and may not be able to efficiently convert a wide range of Combustion Gas volume flow rates into External Turbine output power.

In order to allow the power output of the External Turbine to be efficiently and rapidly varied, and to more efficiently accommodate changing External Turbine inlet pressures and temperatures and volume flow rates it is preferred that a Variable Geometry External Turbine having at least one turbine stage with Adjustable Stator Vanes be utilised.

In one preferred embodiment the External Turbine will incorporate at least one stage of radial inflow turbine with a plurality of pivoting Adjustable Stator Vanes that allow the tangential velocity of the Combustion Gases entering the radial inflow turbine rotor to be varied at least partially independently of the volume flow rate of Combustion Gas.

Contra-Rotating Turbines

Contra-rotating turbines in which two turbine spools sharing a common rotational axis rotate in opposite directions allow large pressure and enthalpy drops in a relatively small number of stages, and may eliminate or reduce the need for stator blades, or allow much slower turbine speeds for the same temperature drop when compared to conventional multi-stage axial flow turbines. The potential elimination of stators and the reduced number of stages means that contra-rotating turbines are potentially far cheaper, lighter and more compact than equivalent conventional multistage axial flow turbines, though they still have problems with large changes in flow area through the turbine for a large temperature drop, and contra-rotating turbines are generally difficult to make due to the inherent difficulties in trying to physically link the rotation of every second stage together with the other turbine stages rotating in the same direction. Nevertheless it is a preferred solution that if more than one turbine spool is used in the External Turbine that the spools be contra-rotating to allow greater temperature drop and reduce costs.

Torque Producing Combustion Outlet Nozzles and Contra-Rotating Turbine

In a preferred embodiment the Rotor Combustion Gas Outlet is in the form of one or more Torque Producing Nozzles through which the Combustion Gas exits the Rotor with tangential velocity at a radial distance from the Rotor Axis. This creates a reaction torque upon the Rotor that may be used to power the rotation of the Rotor and optionally to drive other mechanical loads of which gearboxes, belt drives and generators or motor-generators attached to the Rotor are examples.

The pressure and temperature of the Combustion Gases exiting the Torque Producing Nozzles are significantly reduced compared to the Combustion Gas within the Rotor Combustion Gas Outlet Tube. An External Turbine may then be used to extracts the residual power from the incompletely expanded Combustion Gases exiting the Torque Producing Nozzles and this may advantageously reduce the temperature and pressure at the External Turbine inlet as well as increasing the physical size and reducing the necessary rotational speed Of the External Turbine compared to the External Turbine that would be required in the absence of the Torque Producing Nozzles. It also advantageously reduces the temperature and pressure applied by the Combustion Gases to any Combustion Gas Outlet Rotary Seal that seals between the Hot End Air Inlet and the Combustion Gases exiting the Torque Producing Nozzles.

In a preferred configuration the high tangential velocity of the Combustion Gases exiting the Torque Producing Nozzles is then used to drive a contra-rotating External Turbine of either axial or radial inflow type that has an axis of rotation parallel or nearly parallel with the Rotor Axis and that rotates in the opposite direction to the Rotor. For this reason it is preferred that the Combustion Gases exiting the Torque Producing Nozzles have angular momentum about the Rotor Axis in opposite direction to the Rotor's angular momentum, or in other words they are rotating in the opposite direction to the Rotor about the Rotor Axis. These gases may then be used to drive a contra-rotating External Turbine.

In another preferred configuration the Turbine Casing within which the External Turbine rotates about an axis or rotation coincident with the Rotor Axis, is attached to the body of the Torque Producing Nozzles. This further reduces the pressure of the Combustion Gases before they exit the Turbine Casing as they are expanded further, and in many cases may even be fully expanded to ambient atmospheric pressure. This reduces the pressure differential across the Combustion Gas Outlet Rotary Seal and in some cases will advantageously eliminate the need for a Combustion Gas Outlet Rotary Seal entirely.

Ljungström Turbine

A Ljungström Turbine is a preferred type of External Turbine for the Engine of the current invention that is a contra-rotating radial outflow turbine in which the Combustion Gases flow radially outwards between two coaxial disks that rotate in opposite directions with successive rings of axially extending turbine blades being each attached to the opposite disk compared to the preceding ring of turbine blades. This offers a number of useful advantages over axial flow contra-rotating turbines, particularly for large temperature drops and for small volume flow rates: The flow area through the Ljungström Turbine may be made to increase greatly as the gases flow radially outwards as the circumference of the blade rings increases linearly with radius and the blade lengths can also be increased; Hotter radially inner blade rings are subjected to relatively smaller centrifugal reaction forces and material stresses than cooler radially outer blade rings; By using many blade rings on each disk the contra-rotating disks may be able to rotate at relatively low speeds that may reduce bearing friction and make attachment to transmissions and other loads easier; The blades in each ring may be made prismatic in the axial direction meaning that they can potentially all be easily formed or finished in a single simple and relatively cheap manufacturing process; Relatively large radial misalignment or vibration in one or both of the disks can be accommodated without requiring an increase in blade tip clearances and thereby hurting efficiency; Blade tip clearances can potentially be maintained at very low values in operation, and may even be actively monitored and adjusted during operation by moving the disks axially with respect to each other in order to improve overall Ljungström Turbine efficiency.

When applied to the Engine of the current invention one of the disks of a Ljungström Turbine may be advantageously attached to the Rotor at the end of the Rotor Combustion Gas Outlet Tube with the Combustion Gas passing through the middle of the disk attached to the Rotor to enter the blade rings of the Ljungström Turbine. This allows the Motor that is used to drive the Rotor rotation to be additionally used as a generator for the Ljungström turbine and also eliminates the need for a high temperature and high pressure capable Combustion Gas Outlet Rotary Seal.

Ignition

There are a number of preferred methods for initiating combustion within the Rotor of the current invention, some of which require the use of an External Compressor to drive air through the spinning Rotor prior to ignition and some of which do not.

If an External Compressor is required to initiate combustion then it is generally preferred to have it operating while the Rotor is speeding up, unless the External Compressor is of a positive displacement type or the Rotor is Internally Intercooled. If it is left until after the Rotor is spinning at maximum speed to start pumping air through the Rotor using an External Compressor then a relatively high Rotor Air Inlet pressure will be required to overcome the reversed centrifugal thermosiphon created when relatively hot air is pushed into the Rotor to replace the cold dense compressed air already within the Combustion Chamber. It will typically not be possible to create the high Rotor Air Inlet pressures required to do this at low flow rates with External Compressors of the centrifugal type, but if the air flow is initiated at low Rotor speeds and if there is no Internal Intercooler then it may be possible to maintain the air flow using an External Compressor of the centrifugal type.

In many cases it is expected that combustion may be initiated and maintained by auto-ignition of the Fuel with hot air in the Combustion Chamber, with the air being heated by compression as it flows radially outwards to the Combustion Chamber in the spinning Rotor. Preferably air will be blown into the Rotor Air Inlets as it is bought up to operational Rotational Speed by an External Compressor or the like prior to injecting Fuel that will initiate and sustain combustion by auto-ignition once the Rotor Speed and therefore Combustion Chamber air temperature is sufficiently high.

Additionally or alternatively a source of ignition at the Rotor Combustion Gas Outlet such as a spark plug or glow plug may be utilised to ignite an air-fuel mixture produced by mixing Fuel with the air being blown through the Combustion Chamber by an External Compressor or the like. Combustion may then propagate backwards through the slow flowing air-fuel mixture in the Rotor Combustion Gas Outlet Tube into the Expansion Passage and then Combustion Chamber. If the Fuel has a lower average molecular weight than air such as for example methane does then buoyancy will make it flow naturally from the Combustion Chamber and out of the Rotor Combustion Gas Outlet, mixing with air as it does so, in which case an External Compressor may not be required.

It is therefore a preferred method of ignition to utilise a Fuel with lower density than air such as hydrogen, methane or ammonia injected within the Combustion Chamber that will flow to the Rotor Combustion Gas Outlet of the spinning Rotor due to buoyancy effects without necessarily utilising an External Compressor to drive air flow through the Rotor. A source of ignition such as a spark plug or glow plug at the Rotor Combustion Gas Outlet may then ignite the air-fuel mixture and combustion may then propagate back in to the Combustion Chamber. After ignition is achieved in this manner the Fuel may be optionally changed to an alternative Fuel.

If using an ignition source at the Rotor Combustion Gas Outlet it may be necessary to restrict the volume flow rate from the Rotor Combustion Gas Outlet using an Exhaust Control Valve or the like in order to slow the air flow rate sufficiently for combustion to be able to propagate backwards into the Combustion Chamber even as the centrifugal thermosiphon created by the hot backwards propagating combustion is starts to drive rapid acceleration of the air flow through the Rotor.

An alternative preferred method of ignition is to use an ignition source at the Rotor Combustion Gas Outlet to ignite a mixture of air pumped through the Rotor by an External Compressor with Fuel injected within the Combustion Chamber while the Rotor is still at low speed or stopped. The combustion will then propagate backwards into the Combustion Chamber with the diminished low-speed centrifugal thermosiphon meaning that less or no flow restriction on the Rotor Combustion Gas Outlet may be required.

Additionally or alternatively the temperature of the air being blown through the Rotor by an External Compressor or the like may be temporarily and gradually raised by a heater prior to it entering the Rotor and undergoing compression thereby increasing the temperature of the air when it reaches the Combustion Chamber and thereby making it possible to initiate combustion by means of auto-ignition. This heating may be readily accomplished by combusting some fuel in the air prior to it entering the Rotor.

Additionally or alternatively a Fuel with a lower autoignition temperature than the normal Fuel may be used to initiate combustion before switching to the normal Fuel with higher auto-ignition temperature once combustion is established. Use of low temperature auto-ignition Fuels such as Silane or Triethylborane that auto-ignite below or near room temperature may then not require the use of an External Compressor or other means to raise the air temperature within the Combustion Chamber prior to ignition.

While it is less preferred, a source of ignition within the Combustion Chamber such as a spark plug or glow plug may also be employed to initiate combustion.

It may be advantageous to supply fuel to the Rotor in gaseous form until combustion is established, in order to prevent dangerous accumulation of dense liquid fuel within the Rotor should ignition fail.

For Rotors with Internal Intercooling it will be more difficult to blow air through the Rotor when it is spinning at high speeds and so it will generally be preferred not to use auto-ignition for combustion initiation unless using a low temperature auto-ignition fuel. The method of ignition for Rotors with Internal Intercooling is therefore generally preferred to be an ignition source in the Rotor Combustion Gas Outlet with combustion being initiated at low Rotor Speeds or utilising a gaseous fuel with lower density than air.

Rotor Bearings

The Rotor Bearings that support the Rotor present a number of challenges. It is desirable to have low bearing frictional losses but the Rotor Bearings need to operate at high Rotor angular speeds and may be required to withstand large gyroscopic reaction forces. The Rotor Bearings must also be very reliable to prevent dangerous failures at high speeds and need to be integrated in a manner that does not cause them to be overheated by hot Combustion Gases flowing out of the Rotor.

There are a number of preferred Rotor Bearing solutions. Hydrodynamic Journal Bearings, with or without the intermediate cylindrical bushes commonly known as Floating Rings between the inner and outer bearing surfaces that are commonly employed in high speed automotive turbochargers are very attractive in that they are: very cheap, reliable, potentially very long lived with no wear and operate at high internal diameter tangential speeds that may exceed 100 $m \cdot s^{-1}$ thereby allowing relatively large bore diameters that will in most cases permit the Rotor Combustion Gas Outlet Tube to pass through the bearing. They may also be designed to have relatively low radial stiffness yet very high load capacity, and a circulating supply of cooled lubricant may be used to keep them cool even in close proximity to the Rotor Combustion Gas Outlet Tube. They may also be usefully combined with Rotary Seals that are kept cool by the circulating bearing lubricant.

Rolling element bearings can operate at similar speeds to Hydrodynamic Journal bearings and will typically have lower friction, but will generally be more expensive and may not be as durable or reliable at the high internal diameter tangential speeds that may be necessary. In most cases they will still require an external supply of cooling and lubricating oil.

In a preferred configuration a Rotor Bearing being either a Rolling Element Bearing or a Hydrodynamic Journal Bearing will be located at each end of the Rotor to provide widely spaced support that is better able to withstand Rotor inertial forces upon the Rotor Bearings, and air will flow into the Rotor without passing through either Rotor Bearing's inner diameter, though optionally Fuel and/or Coolant Fluid and/or Combustion Gases may flow through the inner diameter of one or both Rotor Bearings.

It is preferred that only a single Rotor Bearing incorporate a capability to resist axial loads from the Rotor so as not to create unnecessary axial bearing loads in both Rotor Bearings.

Preferably in the case of a Rolling Element Bearing or Hydrodynamic Journal Bearing located at an end of the Rotor having a Rotor Air Inlet there will be two or more Bridging Struts bridging across the annular opening of the Rotor Air Inlet in order to radially stiffen the location of the central mounting point of the Rotor Bearing with respect to the Rotor.

Another preferred type of Rotor Bearing is Air Bearings, particularly Foil Air Bearings that while typically expensive are very reliable and may operate at very high internal diameter tangential speeds exceeding 200 $m \cdot s^{-1}$ with low friction and high load capacity, while also being potentially capable of operating at high temperatures.

Magnetic Bearings are another preferred Rotor Bearing option, though in actively controlled form they tend to be expensive and may not be sufficiently reliable. Passive magnetic bearings in which there are no sensors or actively controlled electromagnets may be very reliable and provide very low frictional losses with relatively low radial stiffness and very high internal diameter tangential speeds similar to Air Bearings, though they require an additional Rotor Bearing to provide axial Rotor constraint.

The high speed capabilities and low friction of Air Bearings and Magnetic Bearings means that in many cases all the fluids will be able to enter and exit the Rotor through their inner diameter, and their use may be particularly advantageous at the Hot End of a Rotor with a central hot Rotor Combustion Gas Outlet Tube as it may allow the inner diameter of the Rotor Bearing to be further away from the Rotor Combustion Gas Outlet Tube to reduce or eliminate the need for cooling of the Rotor Bearing.

Therefore in a preferred configuration there is an Air Bearing or Magnetic Bearing at the Hot End of the Rotor that the Rotor Combustion Gas Outlet Tube extends from. In such case the opposite Cold End of the Rotor is preferably supported by a Rolling Element Bearing or Hydrodynamic Bearing that provides both radial and axial constraint to the Rotor.

Optionally one or both Rotor Bearings will be cooled by heat transfer to air entering the Rotor.

Rotor Fluid Supply

The Fuel enters the Rotor through a Fuel inlet at or near the Rotor Axis. If the Coolant Fluid is cooled in an Off-Rotor Coolant Cooler then the Coolant Fluid will enter the Rotor through a Coolant Fluid Inlet and leave the Rotor through a Coolant Fluid Outlet and all of these Inlets and Outlets will preferably be sealed by Rotary Seals or other means to prevent or reduce leakage.

All fluids that are supplied to the Rotor will preferably be filtered to remove particulates that might accumulate within the Rotor.

The Fuel Inlet and the Coolant Fluid Inlet and Coolant Fluid Outlet if present are preferably at the Cold End opposite to the Hot End with its Rotor Combustion Gas Outlet.

Sub-Atmospheric Engine

For some low power applications it may be desirable to operate with the Rotor Air Inlets substantially below ambient pressure having passed through an External Turbine, optionally with the Combustion Gases from the Rotor Combustion Gas Outlet at or near to ambient pressures. Some or all of the Combustion Gases exiting the Rotor are then passed through a Recuperative or Regenerative Heat Exchanger to transfer their heat to air. This air heated by the Regenerative or Recuperative Heat Exchanger is then combined with any Combustion Gases that didn't pass through the Regenerative or Recuperative Heat Exchanger and expanded through the External Turbine. The outlet gases from the External Turbine are then cooled in a Turbine Exhaust Cooler prior to re-entering the Rotor through the Rotor Air Inlets.

There are a number of potential benefits to such a sub-atmospheric Engine: The External Turbine will be physically larger and will rotate at lower angular speed than would be the case with higher density combustion gases from a Rotor operating with an inlet at or near atmospheric pressure, and this may increase the achievable External Turbine efficiencies; It may increase the External Turbine bearing durability and make the External Turbine significantly cheaper to manufacture; The reduced combustion pressures within the Rotor may reduce corrosion and heat transfer within the Rotor thereby increasing the Rotor durability; The lower Rotor Air Inlet pressures will require smaller pressure differentials across the Rotor Vacuum Seals that may reduce Rotor Vacuum Seal losses and increase their life; The Rotor Casing Vacuum Pump may be vented to the lower pressure Rotor Air Inlet; If using natural gas as a Fuel it may not be necessary to have a compressor to compress the natural gas supply to the Rotor.

External Compressor

At very high Rotor Tip Speeds the use of an External Compressor and an External Intercooler or Internal Intercooler to cool the air will generally have little efficiency benefit, but may still give advantages in terms of keeping the Combustion Chamber, Tensile Structure and Expansion Passages cooler.

At lower Rotor Tip Speeds external compression and both External Intercooling and Internal Intercooling will generally produce substantial Engine efficiency increases.

At lower Rotor Tip Speeds the optimal amount of compression in an External Compressor will typically increase with increasing Engine size as the External Compressor and External Turbine efficiencies increase.

Utilising an External Intercooler to cool the air after compression in an External Compressor will generally also produce higher Engine efficiencies, though this is somewhat dependent upon the pressure losses in the External intercooler.

It is generally preferred to drive an External Compressor using an External Turbine coupled to the External Compressor. It is also preferred that such an External Compressor and External Turbine also be coupled to a Motor/Generator that may power the External Compressor to supply air to the Rotor during starting and Generate power from the External Turbine when the Engine is producing power.

The amount of external compression and Internal Intercooling may ultimately be limited by increases in unwanted $NO_x$ emissions and/or the amount of water vapour in the Combustion Gases created by the higher combustion pressures and greater proportion of fuel being burnt with the air leading to greater erosion of the materials from which the Combustion Chamber is made.

Filter

It will generally be necessary to filter out particles from the air entering the Rotor in order to prevent gradual accumulation of particulates within the Rotor that may lead to unacceptable blockage of flow paths or excessive unbalanced mass build-up.

Very small particles in the air will typically be transported out of the Rotor by Combustion Gases that increase in density towards the Maximum Flow Radius. Many organic and other particles will also be either burnt or turned into gaseous compounds within the Combustion Chamber. Larger particulates in the air will typically be more acceptable in Engines with larger Rotor diameters as the centripetal accelerations within the Rotor will typically be lower and so the Combustion Gases will more easily transport particulates out of the Rotor, so filtering requirements may be relaxed for larger diameter Rotors and also for Internally Intercooled Rotors where the gas densities within the Rotor will typically be higher due to increased gas pressures.

It is generally preferred that the air pass through the Filter immediately prior to entering the Rotor, however if an External Compressor is used it may be preferable to utilise a Filter prior to the External Compressor and any External Intercooler in order to reduce the pressure on the chamber that houses the Filter, or even eliminate the need for such a chamber.

Cleaning

It may be necessary to clean accumulated particulates and other deposits from within the Rotor whenever they have built up to unacceptable levels or as part of regular operational processes.

Such particle or deposit accumulation in addition to erosion or damage of the Combustion Chamber or other components within the Rotor may be monitored by a sensor that measures the Rotor imbalance while it is spinning.

It is preferred that a cleaning process be utilised when the Rotor is stopped wherein compressed air supplied by an External Compressor is blown through the Rotor and carries particulates out of the Rotor Combustion Gas Outlet, or optionally a liquid such as water or some other chemically reactive liquid is pumped through the Rotor and may better dissolve or transport accumulated particulates out of the Rotor.

Optionally Solid Cleaning Particles may be added to the air or liquids flowing through the stationary Rotor to aid in dislodging deposits and particulates, the Solid Cleaning Particles being preferably of a composition that may be combusted or vaporised without solid residue within the Rotor during operation.

Autobalancer

The centre of mass of the Rotor and all the fluids that it contains may shift away from the Rotor Axis slightly over time and with changing Rotor speed owing to a number of factors such as: changing fluid densities, variable filling of fluid passageways, accumulation of detritus in fluid passages, erosion or corrosion of fluid passages and hot components, elastic or thermal deformation, plastic deformation of components, foreign object ingestion and damage, outgassing from polymeric materials and Rotor asymmetry due to design and/or manufacturing variance. Such Rotor imbalance may lead to high Rotor Bearing forces that are detrimental to both bearing life and bearing friction. For this reason it is preferred that the Rotor Bearings or Rotor Bearing Mounts for the Rotor have relatively low radial stiffness and that the Rotor operate at a speed above the first natural frequency of radial oscillation for the Rotor mass in the low stiffness radial bearings so that the Rotor has a tendency to rotate about an axis of rotation that is moved from the Rotor Axis towards the Rotor's centre of mass. Additionally it is preferred that one or more Autobalancers be incorporated within the Rotor so that when operating at speeds above said first natural frequency of radial oscillation the Autobalancer redistributes mass within itself in a manner that tends to bring the centre of mass of the Rotor back into coincident alignment with the Rotor Axis thereby helping to reduce radial oscillation of Rotor Bearings and seals. The Autobalancer will typically be constructed of a number of identical Rollers that partially fill the circumference of a cavity of revolution about the Rotor Axis. Additionally there may be a viscous fluid of some type partially filling the cavity of revolution in order to rapidly reduce angular speed differentials between the Rollers and the Rotor during Rotor angular acceleration. The centre of mass of the Autobalancer Rollers is preferably in the same plane perpendicular to the Rotor Axis as the Rotor Centre of Mass. If there are multiple Autobalancers within the Rotor then it is preferred that the Rotor Centre of Mass lies between them.

Gimbal

The very large angular momentum of the Rotor will induce relatively large Rotor Bearing forces should the Rotor Axis be rotated about an axis that is not parallel to the Rotor Axis. Higher Rotor Bearing forces as a result of gyroscopic inertial forces may require the use of larger Rotor Bearings and may result in larger frictional losses. They may also make it more difficult to utilise low stiffness Rotor Bearing mounts that may allow the Rotor to be operated above the first natural radial frequency of the Rotor-Bearing system and so allow the use of an Autobalancer. This issue is most significant in vehicular applications such as aircraft, cars, trucks and ships where the vehicle may turn or rotate relatively rapidly.

For ground vehicle applications it will generally be preferable to mount the Rotor within the vehicle with the Rotor Axis vertical so that rapid turning of the vehicle will not induce large gyroscopic reaction forces in the Rotor Bearings. For aircraft and ships it will generally be preferable to mount the Rotor with the Rotor Axis aligned along the length of the aircraft so that large gyroscopic reaction forces are not created when the aircraft or ship rolls rapidly.

It may also be beneficial to mount the Rotor within a gimbal arrangement that allows the Rotor Axis to maintain a relatively constant orientation as the vehicle rotates, thereby reducing or eliminating gyroscopic reaction forces in the Rotor Bearings.

The Rotor Gimbal Mount may have a limited range of rotational movement to allow for easier external fluid connections, and may have a preferred or default orientation of the Rotor Axis that aligns with the axis about which the vehicle typically rotates most rapidly, the preferred Rotor Axis orientation will generally be vertical in ground vehicles, while for aircraft and ships it may be along the vehicle roll axis.

Braking

It may be desirable to rapidly stop the Rotor under some circumstances. A very simple and cheap method of achieving this is to quickly fill the Rotor Casing with air or another gas by opening a valve, though this will cause the exterior surfaces of the Rotor to briefly experience high temperatures. A slower rate of pressure increase may be used to reduce the peak temperatures. Use of water vapour instead of air for braking purposes would reduce the peak temperatures substantially owing to higher isobaric specific heat $c_p$, the water may even be introduced as a fine spray or mist at relatively small radii in order to absorb more heat energy in vaporisation.

In many cases the Motor used to maintain the rotation of the Rotor will also be able to be used as a generator to slow the Rotor, recovering energy as it does so.

Optionally a friction brake such as a drum or disk brake may also be attached to the Rotor.

DESCRIPTION OF THE DRAWINGS

FIG. 1 shows a cross sectional view of a preferred embodiment of the Engine of the current invention coincident with the Rotor Axis 2 in which a Rotor 4 made up of a large number of components rotates at a Rotor Angular Speed on Rotor Hydrodynamic Journal Bearings 6 about the Rotor Axis in a clockwise direction when viewed from the left within a Rotor Casing 8 that is in general form a shell of revolution about the Rotor Axis. Rotor Casing Gases from within the volume inside the Rotor Casing but exterior to the Rotor are evacuated by a Vacuum Pump (not shown) that extracts the Rotor Casing Gases through a Vacuum Pump Inlet 10 located at the end of a Vacuum Pump Inlet Diffuser 12 near the maximum radius of the Rotor Casing. The Vacuum Pump Inlet Diffuser is shaped and oriented such that it recovers and converts some of the velocity of the Rotor Casing Gases that are made to spin about the Rotor Axis by the Rotor's motion into increased pressure at the Vacuum Pump Inlet.

Rotor Vacuum Seals 14 are located adjacent to the minimum opening diameter of the Rotor Air Inlets 16 at each end of the Rotor. The Rotor Vacuum Seals allow the Rotor Casing to be partially evacuated by the Vacuum Pump to reduce Windage Drag upon the Rotor. The Rotor Air Inlets receive air from the Air Inlet Manifolds 18 that in turn receive air from a supply (not shown) that will generally be filtered to remove particulates, and may optionally be compressed in an External Compressor (not shown) to above atmospheric pressure and may then also be optionally intercooled in an External Intercooler (not shown) to reduce the temperature of the compressed air prior to it entering the Rotor.

The Rotor Journal Bearings are mounted off of the Rotor Casing on Rotor Bearing Mounts 20 that have sufficiently low radial stiffness to ensure that the Rotor is above its first natural frequency of radial oscillation when at maximum Rotor Angular Speed.

Air entering the Rotor through the Rotor Air Inlets is accelerated rotationally to approximately match the Rotor Angular Speed by Air Inlet Inducers 22. Rotor Air Inlet Diffusers 24 slow the air that has passed through the minimum flow area of the Rotor Air Inlets recovering some of the dynamic air pressure to increase the static air pressure within the Rotor.

The Air then flows radially outwards towards the single Combustion Chamber 26 that is made out of ceramic, undergoing compression and increasing in temperature as it does so while passing sequentially through first an Uncooled Compression Passage 28 and then a Combustion Chamber Shroud 32 internal to the Cooled Compression Passage 30, all of which are contained within the fibre reinforced polymer composite of the Tensile Structure 34. The Uncooled Compression Passage extends from near the Rotor Axis out to the radius at which the rising air temperature due to compression exceeds the allowable temperature of the polymer composite from which the Tensile Structure is made, at which radius the Cooled Compression Passage starts. The Combustion Chamber Shroud within the Cooled Compression Passage reduces the rate of heat transfer from the air to the Tensile Structure and Coolant Fluid while also increasing the radial air flow speed around the Combustion Chamber and compressively loaded Outer Expansion Passage 36 to improve their regenerative air cooling. The Combustion Chamber Shroud is supported off of the Tensile Structure at both its inner radial end and its outer radial end so that the end most proximal the Rotor Axis is loaded in tension and the end most distal the Rotor Axis is loaded in compression and is constructed from a material with higher temperature capabilities than the Tensile Structure examples of which may include High Strength Steels, Titanium Alloys, Ceramics, Ceramic Matrix Composites and Metal Matrix Composites.

Air flows into the Combustion Chamber through a plurality of Combustion Chamber Air Inlets 38 distributed around the Combustion Chamber at approximately the same radius from the Rotation Axis (the Maximum Flow Radius). Fuel is injected through a Fuel Injector 40 and burns with the air in the Combustion Chamber, ignition being spontaneous once air compression raises the air temperature sufficiently high to achieve auto-ignition, to produce Combustion Gases that then accelerate radially towards the Rotation Axis through a Conical Frustum Converging Section 42 between the Combustion Chamber and the rest of the Outer Expansion Passage. The Combustion Chamber has a Convex Domed End 44 that is held within a complementary Convex Cup 46 in the Tensile Structure, with a Combustion Chamber Interlayer 48 between the Combustion Chamber and the cooled Tensile Structure that provides some capacity to redistribute surface pressure loads more evenly through localised changes in thickness (compliance) in the Combustion Chamber Interlayer between the Combustion Chamber and the Tensile Structure as well as having some thermal insulation that reduces the amount of heat flowing from the hot Combustion Chamber to the cooler Tensile Structure.

The Combustion Gases flow radially inwards from the Expansion Passage through a sealed Radial Expansion Joint 50 to a tensile loaded Inner Expansion Passage 52 that extends radially outwards from the Combustion Gas Bend Transition 54. The Combustion Gases then flow axially along the Rotor Combustion Gas Outlet Tube 56 that ends in a radial outflow Ljungström External Turbine 58, one disk of which is attached to the Rotor Combustion Gas Outlet Tube, and the other disk of which rotates about the Rotor Axis in the opposite direction to the Rotor (clockwise when viewed from the right hand end of the Rotor where the Ljungström External Turbine is) and is attached to a Generator 60.

The Tensile Structure extends radially outwards from near the Rotor Axis over the Convex Domed End of the Combustion Chamber and also extends in the opposite radial direction to a Rotor Counterbalance Mass 62 that provides a counterbalance mass for the various Rotor parts on the radial opposite side of the Rotor Axis, while also sealing off the Rotor Assembly Opening Port 64 through which the Combustion Chamber, Combustion Chamber Shroud and other components are inserted into the Tensile Structure during assembly.

Coolant Fluid enters the Rotor through a Coolant Fluid Inlet 66 and exits the Rotor via a Coolant Fluid Outlet 68, with Fuel entering the Rotor through a Fuel Inlet 70 and both Fuel and Coolant Fluid flow axially into the Rotor through a Fluid Inlet Tube 72 containing separate passages for the Fuel, Rotor Coolant Inlet Flow and Rotor Coolant Outlet Flow, before entering flow passages embedded within the Tensile Structure.

The Fluid Inlet Tube and Rotor Combustion Gas Outlet Tube each have a Rotor Journal Bearing mounted off of them, and are each stiffened radially with respect to the Rotor by three Bridging Struts 74 that bridge across the Rotor Air Inlets.

Two Autobalancers 76 are located axially to either side of the Tensile Structure, and each comprise an annular cavity coaxial with the Rotor Axis in which a plurality of cylindrical rollers in a small quantity of a viscous liquid are free to roll and find their minimum energy condition. When the Rotor is spinning above its first radial natural frequency of oscillation it is in effect rotating about its own centre of mass, and when that occurs the cylindrical rollers will redistribute themselves within the Autobalancer annular cavity in a way that makes the centre of mass of the Rotor approximately coincident with the Rotor Axis, thereby reducing radial oscillation of the Rotor.

An Axial Flux Motor-Generator 78 located within the Rotor Casing is used to accelerate the Rotor up to operational speed and then operates as a Generator to absorb the torque produced by the Ljungström External Turbine attached to the Rotor.

FIG. 2 shows an enlarged detail view of the FIG. 1 Engine cross section that shows part of the ceramic Combustion Chamber 26 and its interface with the Tensile Structure 34. Air enters the Combustion Chamber through a plurality of Combustion Chamber Air Inlets 38 distributed around the periphery of the Combustion Chamber at approximately the same radial distance from the Rotation Axis. A metallic Cooled Inner Wall 80 bonded to the inner surface of the Tensile Structure has Cooling Tubes 82 bonded to its outer surface within the Tensile Structure through which Coolant Fluid flows to keep the Tensile Structure cool. The radial outermost end of the Combustion Chamber Shroud 32 is supported against centrifugal reaction forces by the Cooled Inner Wall. The Combustion Chamber Interlayer 48 prevents excessive localised pressure forces between the Combustion Chamber and the Tensile Structure that might otherwise lead to a failure. The Combustion Chamber Interlayer also provides some thermal insulation that reduces undesirable heat flow from the Combustion Chamber to the Coolant Fluid.

FIG. 3 is an enlarged detail view of the FIG. 1 Engine cross section that shows the radially innermost end of the Combustion Chamber Shroud 32 where it is supported off of the metallic Cooled Inner Wall 80 that is bonded to the inner surface of the Tensile Structure 34.

FIG. 4 is an enlarged detail view of the FIG. 1 Engine cross section that shows the Radial Expansion Joint 50 that allows relative radial movement between the Outer Expansion Passage 36 that is formed as part of the Ceramic Combustion Chamber and the Inner Expansion Passage 52 that extends radially outwards from near the Rotor Axis. The Radial Expansion Joint utilises a Floating Seal Ring 84 made of a similar material to the Inner Expansion Passage so that it will approximately match the thermal expansion of the Inner Expansion Passage. The Floating Seal Ring can move radially with respect to the Inner Expansion Passage, and has an annular groove on its radially inner end that is a close complementary sliding fit to the radial outer end of the Inner Expansion Passage. Centrifugal reaction forces hold the Floating Seal Ring against the radial inner end of the Outer Expansion Passage.

FIG. 5 is an enlarged detail view of the FIG. 1 Engine cross section that shows the Fuel Inlet 70, Coolant Fluid Inlet 66 and Coolant Fluid Outlet 68, in addition to one of the Rotor Hydrodynamic Journal Bearings 6, that runs on the cylindrical outer surface of the Fluid Inlet Tube 72 through which by means of three separate flow passages the Fuel enters the Rotor and the Coolant Fluid both enters and exits the Rotor. For greater clarity the rotary seals between the Fuel Inlet, Coolant Fluid Inlet and Coolant Fluid Outlet are not shown, but in practice would be employed to keep the different fluids separate. An Air Inlet Manifold Rotary Dynamic Seal 86 seals the pressure differential that may exist between the Air Inlet Manifold 18 and ambient conditions external to the Air Inlet Manifold. The Air Inlet Manifold Dynamic Rotary Seal employs an annular ring attached to the outer surface of the Fluid Inlet Tube that rotates within a larger stationary annular cavity filled with a Barrier Liquid. A radial pressure gradient is created within the Barrier Liquid by the rotation of the annular ring within the annular cavity, and any gas pressure difference between the two sides of the annular ring is then compensated for by a difference in the radius of the inner free-surface of the Barrier Liquid on each side of the annular ring, with almost no resulting gas leakage.

FIG. 6 is an enlarged detail view of the FIG. 1 Engine cross section that shows the end of the Rotor from which the Combustion Gases exit the Rotor. A Rotor Vacuum Seal 14 seals the partial vacuum of the Rotor Casing Gas 92 from the air in the Air Inlet Manifold 18. The Rotor Vacuum Seal is of the dynamic seal type in which a low vapour pressure Barrier Liquid creates a nearly gas-tight rotary vacuum seal between two axial sides of a rotating ring attached to the outside of the Rotor Air Inlet 16 adjacent to its smallest internal opening diameter in order to reduce frictional heating and losses in the seal. The rotating ring of the Rotor Vacuum Seal rotates with clearance within an annular cavity in the Rotor Casing 8 that is partially filled with the Barrier Liquid. The pressure difference between the Air Inlet Manifold and the Rotor Casing Gas is balanced by the radial pressure gradient established by centripetal acceleration in the rotating Barrier Liquid with the inner radius of the Barrier Liquid being larger on the higher pressure Air Inlet Manifold side of the rotating ring.

Combustion Gases flow from the Rotor through the Rotor Combustion Gas Outlet Tube 56 that passes through one of the Rotor Hydrodynamic Journal Bearings 6 and then passes through the wall of the Air Inlet Manifold that is sealed by an Air Inlet Manifold Rotary Dynamic Seal 90 before reaching the radial outflow Ljungström External Turbine 58. Because the Combustion Gases are very hot it is necessary to reduce the heat transfer to the Rotor Hydrodynamic Journal Bearing 6 and the Air Inlet Manifold Rotary Dynamic Seal that must both be kept relatively cool due to the liquid within them. To reduce unwanted heat conduction in this area a Thermally Insulating Radial Gap 88 optionally filled with insulating powders or fibres is built into the Rotor Combustion Gas Outlet Tube between the inner and outer tube walls adjacent the Rotor Hydrodynamic Journal Bearing and the Air Inlet Manifold Rotary Dynamic Seal. Unwanted heat transfer may be further reduced by the use of a thermally insulating coating on the internal surface of the Rotor Combustion Gas Outlet Tube. The radial location of the Rotor Hydrodynamic Journal Bearing on the relatively weak hot Rotor Combustion Gas Outlet Tube is stiffened with respect to the Rotor by the three Bridging Struts 74 that bridge across the Rotor Air Inlet. The Rotor Hydrodynamic Journal Bearings are mounted off of the Rotor Casing in a manner that has low radial stiffness using in this embodiment three equal length Axial Flexure Beams 94 equi-spaced around the Rotor Axis that provide radial flexibility to the Rotor Bearing Mount 20, however there are many other alternative methods known to those skilled in the art that can also provide low radial stiffness bearing mounts. The low radial stiffness allows the Rotor to operate at well above the speed of the first natural frequency of radial oscillation, which allows the Autobalancers to operate as needed to bring the Rotor's centre of mass onto the Rotor Axis and thereby reduce the Rotor Bearing loads and also providing a simple means to accommodate changing fluid mass distributions within the Rotor during operation.

FIG. 7 is a cross sectional view of the Engine of FIG. 1 taken in a plane perpendicular to the Rotor Axis and through the centre of the Combustion Chamber when viewed from the Hot End of the Rotor with the Ljungström External Turbine. The Rotor spins in an anticlockwise direction about the Rotor Axis 2, and as it does so causes the Rotor Casing Gases within the Rotor Casing 8 to rotate at high velocity about the Rotor Axis, with both the tangential velocity and the Rotor Casing Gas pressure, as a result of centrifugal reaction force induced radial pressure gradient, typically increasing with radius. The Vacuum Pump Inlet Diffuser 12 is located and oriented to take advantage of the higher pressure and tangential velocity of the Rotor Casing Gases at the maximum radial distance from the Rotor Axis, recovering some of the Rotor Casing Gas tangential velocity to increase the Rotor Casing Gas pressure at the Vacuum Pump Inlet 10 (vacuum pump not shown) in effect making use of the Rotor as an additional low-efficiency centrifugal vacuum pumping impeller.

The Rotor Casing Is mounted in Rotor Primary Gimbal Bearings 96 that allow the Rotor Casing to rotate about a Primary Gimbal Axis 94 perpendicular to the Rotor Axis, these Rotor Primary Gimbal Bearings are mounted off of a Gimbal Cradle 98 that in turn rotates about a Secondary Gimbal Axis 102 perpendicular to both the Rotor Axis and the Primary Gimbal Axis on a Secondary Gimbal Bearing 100 that rotates in a Gimbal Mounting Base (not shown). The Rotor Casing may thus maintain the same inertial orientation within a moving and turning Gimbal Mounting Base such as a vehicle, thereby reducing or eliminating gyroscopic reaction forces on the Rotor Bearings.

The radial tensile load on the Tensile Structure 34 decreases with increasing radius making it more optimal to reduce (taper) the total cross-sectional area of the Tensile Structure with increasing radius, though the density specific tensile strength of carbon fibre polymer composites is so high that in some cases it may not be necessary to taper the Tensile Structure at all, which may present some advantages in manufacturing. On the radially opposite side of the Rotor Axis from the Combustion Chamber 26 there is less benefit to tapering the Tensile Structure as added mass is required to balance the opposite side of the Rotor anyway, and it is beneficial to have more mass at a reduced radius when compared to the Combustion Chamber for a number of reasons: reduced Windage power losses, reduced Rotor moment of inertia, reduced gyroscopic reaction forces in the Rotor Bearings as a result of reduced moment of inertia, reduced Rotor kinetic energy for faster starting and stopping and to reduce the energy released in a Rotor failure, ensuring that no cooling is required of the Rotor Counterbalance Mass 62 and reducing the air pressure that must be sealed in by the Rotor Counterbalance Mass in closing off the Rotor Assembly Opening Port 64 from the partial vacuum in the Rotor Casing. The Rotor Counterbalance Mass is in this embodiment retained by a plurality of Double Shear Pins 112 in holes that pass through the Rotor Counterbalance Mass, the Tensile Structure and into the Rotor Counterbalance Mass so that the Double Shear Pins are in double shear transferring the centrifugal reaction force from the Rotor Counterbalance Mass to the Tensile Structure. The Rotor Counterbalance Mass is preferably made of a low density material that will break apart easily and with high energy dissipation in the event of a Rotor failure so that it does not produce dangerous, large, dense and fast moving fragments.

FIG. 8 is an enlarged detail view of the FIG. 7 Engine cross section that shows where the Fuel that has flowed outwards in the Radial Fuel Delivery Tube 106 through the Tensile Structure passes through the Cooled Inner Wall 80 of the Tensile Structure and is injected into the Combustion Chamber 26 by the Fuel Injector 40 on the rotationally trailing side of the Combustion Chamber to be combusted with the air that enters the Combustion Chamber by means of the Combustion Chamber Air Inlets 38. If the Fuel is a gaseous hydrocarbon such as methane then the Radial Fuel Delivery Tube may need to be cooled by the Coolant Fluid in order to prevent overheating of the Tensile Structure around the Radial Fuel Delivery Tube, and this will have the added advantage of increasing the pressure of the gaseous fuel more than would be the case without cooling, and will thus reduce the external Fuel supply pressure requirements.

FIG. 9 is an enlarged detail view of the FIG. 7 Engine cross section that shows the area near the Rotor Axis 2. The Fuel and Coolant Fluid enter the Rotor by means of the Fluid Inlet Tube 72 and then flow into the Tensile Structure 34 by means of the Fuel Transfer Tube 104 and the Coolant Fluid Inlet Transfer Tube 108 respectively. Once the Coolant Fluid has been heated within the Tensile Structure it then passes back to the Fluid Inlet Tube by means of the Coolant Fluid Outlet Transfer Tube 110 to then exit the Rotor. Air Inlet Inducers 22 and Rotor Air Inlet Diffusers 24 that both contribute to lower pressure losses in the air entering the Rotor are also visible in this view as is one of the Rotor Bearing Mounts 20.

FIG. 10 is an isometric view, in isolation, of the Coolant Fluid Manifold and Fuel Delivery Manifold that are embedded within the Tensile Structure of the Engine of FIGS. 1-9 viewed from the Cold End of the Rotor through which the Coolant Fluid enters and exits. The Coolant Fluid enters the Coolant Fluid Manifold through the Coolant Fluid Inlet Transfer Tube 108 and then flows to a Coolant Distribution Tube 112 that distributes the Coolant Fluid to flow through a plurality of small Cooling Tubes 114 that extend radially until they come into contact with the Cooled Inner Wall 80 to which they are bonded to improve heat transfer and to stiffen the Cooled Inner Wall structurally, and then continue radially outwards over the Domed End 116 of the Cooled Inner Wall, and then radially inwards on the other side of the Cooled Inner Wall until they finally terminate within a Coolant Collection Tube 118 that brings all of the Coolant Fluid together again to flow out of the Coolant Fluid Manifold by means of the Coolant Fluid Outlet Transfer Tube 110. The Coolant Collection Tube and Coolant Distribution Tube are each at nearly constant radius from the Rotor Axis 2 so that gas bubbles within the Coolant Fluid are less likely to accumulate in any radially outward facing pockets within them.

This Coolant Fluid Manifold configuration has a number of useful advantages: the Coolant Tubes are approximately equally spaced over the surface of the Cooled Inner Wall to provide relatively consistent cooling over the surface of the Cooled Inner Wall, the Cooling Tubes do not have any joints at large radii from the Rotor Axis and have relatively large radii of curvature in order to reduce the likelihood of failures caused by high Coolant Fluid pressures even with relatively thin walled Cooling Tubes, the Cooling Tubes are relatively small diameter in order to improve heat transfer to the Coolant Fluid while the flow path length through each Cooling Tube is also relatively short in order to reduce the pressure losses over the length of each Cooling Tube, hotter spots on any Cooling Tube will tend to increase the centrifugal thermosiphon pressure gain within that Cooling Tube thereby increasing the flow velocity and cooling effect within that Cooling Tube to partially compensate. There are a large number of different Coolant Fluids that may be used in such a configuration, though Hydrogen, Helium, Alcohols, Alkanes, Ammonia and Water, or miscible mixtures of these fluids are generally preferred.

The Fuel is transported to the Combustion Chamber from the Fuel Transfer Tube 104 by the Radial Fuel Delivery Tube 106 that is also bonded to the Cooled Inner Wall so that in the case of liquid Fuel the Fuel may provide some additional cooling, while in the case of gaseous Fuel the Fuel may itself be cooled to prevent damaging heating of the Tensile Structure adjacent to the Radial Fuel Delivery Tube.

A plurality of Wall Anchoring Features 120 are bonded to and distributed over the outer surface of the Cooled Inner Wall at various radii in the predominantly radially aligned regions of the Cooled Inner Wall in order to provide a stronger mechanical bond between the dissimilar materials of the Tensile Structure and the Cooled Inner Wall, they may also advantageously increase the thermal conductivity through the Tensile Structure to better cool the exterior surface of the Tensile Structure as it is heated by friction with the Rotor Casing Gas.

FIG. 11 is an isometric view, in isolation, of the Cooling System and Fuel Delivery Manifold that are embedded within the Tensile Structure of the Engine of FIGS. 21-25 in which the Cooling System incorporates a Rotor Integrated Coolant Cooler 122 that transfers heat from a Rotor Tip Coolant Fluid to a Coolant Fluid in fluid isolation from the Rotor Tip Coolant Fluid. The Rotor Tip Coolant Fluid circulates through Cooling Tubes 124 that are bonded to the surface of the Cooled Inner Wall 126 and extend from the Rotor Integrated Coolant Cooler radially outwards over the Domed End 128 of the Cooled Inner Wall and back to the Rotor Integrated Coolant Cooler, with the Cooling Tubes being approximately evenly spaced over the surface of the Cooled Inner Wall in order to more evenly cool the Cooled Inner Wall. The circulation of the Rotor Tip Coolant Fluid within the Coiling Tubes is driven by centrifugal thermosiphon that establishes itself due to the heating of the Rotor Tip Cooling Fluid at larger radii compared to where it is cooled within the Rotor Integrated Coolant Cooler.

The Fuel is transported to the Combustion Chamber from a Fuel Transfer Tube 130 by the Radial Fuel Delivery Tube 131.

The Coolant Fluid enters the Coolant Fluid Manifold through a Coolant Fluid Inlet Transfer Tube 132 and flows to a Coolant Distribution Tube 134 that distributes the Coolant Fluid to flow through a plurality of small Outward Radial Connecting Tubes 136 through which the Coolant Fluid flows to the Rotor Integrated Coolant Cooler to be heated and from there flows back to a Coolant Collection Tube 138 by means of a plurality of Inward Radial Connecting Tubes 140. The Cooling Fluid then leaves the Coolant Fluid Manifold through a Coolant Fluid Outlet Transfer Tube 142, and is cooled externally to the Rotor before being returned through the Coolant Fluid Inlet Transfer Tube.

Both the Rotor Tip Coolant Fluid and the Coolant Fluid are circulated by centrifugal thermosiphon, as they are heated at relatively larger radii to where they are cooled. By having Rotor Tip Coolant Fluid and Coolant Fluid isolated from each other it is possible to have a lower pressure in the Rotor Tip Coolant Fluid Circuit at larger radii as the pressure within the Rotor Tip Coolant Fluid may be kept relatively close to zero within the Rotor Integrated Coolant Cooler. High pressure is primarily an issue for Liquid Coolants, and so this configuration with the Rotor Integrated Coolant Cooler at relatively large radius from the Rotor Axis is most advantageous when using a Liquid Coolant of which water, alcohols, ammonia and alkanes are preferred examples, to cool the Domed End of the Cooled Inner Wall.

FIG. 12 shows a cross sectional view coincident with the Rotor Axis 2 of another preferred embodiment of the Engine of the current invention in which a Symmetrical Two Radial Compression and Combustion Arm Rotor 144, made up of a number of components, rotates at a Rotor Angular Speed about a Rotor Axis within a partially evacuated Rotor Casing 146 that is in general form a shell of revolution about the Rotor Axis. The Rotor rotates upon a Roller Bearing 148 at the Cold End of the Rotor and an Air Bearing or Magnetic Bearing 150 at the Hot End of the Rotor. The Air bearing being optionally of the foil air bearing type, and the magnetic bearing being either an active magnetic bearing with a control system that varies the magnetic forces in the bearing to levitate the rotating journal or a passive magnetic bearing utilising repulsive forces between permanent magnets to achieve the necessary levitation.

Air enters the Rotor by means of a Cold End Rotor Air Inlet 152 and a Hot End Rotor Air Inlet 154, each having a Rotary Vacuum Seal 156 of the Dynamic Seal type located radially outside of their respective smallest opening diameters to seal the partial vacuum within the Rotor Casing from the Air Inlets. Inlet Diffusers 158 recover some of the dynamic pressure of the fast flowing inlet air to increase the static air pressure within the Rotor, and each Air Inlet also has an Autobalancer 160 radially outside of it. After the air has passed through the Inlet Diffusers it proceeds to flow radially outwards towards the two identical ceramic Combustion Chambers 162 in the opposing Radial Compression and Combustion Arms on opposite sides of the Rotor Axis lying on a common Radial Arm Axis 164 that passes through the Rotor Axis. The use of two Combustion Chambers helps to create an approximately dynamically balanced Rotor in which component masses and changing fluid densities within the Rotor will be approximately matched within the opposing Radial Compression and Combustion Arms. The Air Flows out to the Combustion Chambers by means of the Uncooled Compression Passages 166 whose walls are the Tensile Structure 168 made out of a fibre reinforced polymer composite, and then at larger radii where the air temperatures have risen higher than the permissible operating temperature of the Tensile Structure the Compression Passages transition to Cooled Compression Passages 170 in which there are Cooled Inner Walls 172 comprised of thin metal walls with Cooling Tubes bonded to their outer surface through which Coolant Fluid flows. The Cooled Compression Passage tapers inwards, becoming axially narrower with increasing radius so that the Cooled Inner Walls are pressed against the Tensile Structure by a component of the radially outwards directed centrifugal reaction forces within the spinning Rotor. This usefully increases the strength of the mechanical bond between the Cooled Inner Walls and the Tensile Structure, but is not necessary or desirable in planes perpendicular to the Rotor Axis as even parallel sides to the Cooled Compression Passage in planes perpendicular to the Rotor Axis will have a component of the radially directed centrifugal reaction forces pressing the Cooled Inner Walls onto the Tensile Structure, and it is better to keep the Compression Passage cross sectional area smaller to reduce the exposed area of the Cooled Inner Wall. A secondary advantage of the axial tapering of the Compression Passage is that it makes it easier to insert the ceramic Combustion Chambers with their integrally formed Outer Expansion Passages 180 into the Rotor through a relatively small diameter Inlet Opening 200 in the Tensile Structure, which is useful as larger Inlet Openings may weaken the Tensile Structure.

The air flows radially outwards around the Combustion Chambers, passing around the domed ends of the Combustion Chambers by means of a plurality of Air Flow Grooves 174 distributed around the domed end of each Combustion Chamber thereby reaching the radially outermost part of the domed end of the Combustion Chambers from where the air enters each Combustion Chamber by means of a Central Combustion Chamber Air Inlet 176 through which the Fuel is also injected from the Fuel Injector 178. Hot Combustion Gases are produced by Combustion within the Combustion Chamber and the Combustion Gases then accelerate radially inwards through the Outer Expansion Passages that are formed as part of their respective Combustion Chambers and then passes through the Radial Expansion Joints 182 to the Inner Expansion Passages 184. The Inner Expansion Passages meet at the Rotor Axis but are separated by an Axial Flow Diverter 188 that helps to redirect the Combustion Gas flow out of the Rotor Combustion Gas Outlet Tube 190 while also helping to reduce pressure wave interactions between the two Combustion Chambers. The Rotor Combustion Gas Outlet Tube passes through a Combustion Gas Outlet Rotary Dynamic Seal 192 that is partially insulated from the hot Rotor Combustion Gas Outlet Tube and provides a seal between the rotating Rotor Combustion Gas Outlet Tube and the stationary Combustion Gas Outlet Manifold 194 that may then deliver the hot pressurised Combustion Gases to an External Turbine (not shown) or for some other use.

Fuel enters the Rotor through the Fuel Inlet 196 and flows through the middle of the Roller Bearing, providing cooling to the bearing, and then through the Fluid Inlet Tube 198 that passes down the centre of the Cold End Rotor Air Inlet and then through a Fluid Strut (not visible due to cross sectioning) to enter the Fuel Manifold (not visible) within the Tensile Structure that delivers fuel to the Combustion Chamber. Mounted off of the Fluid Inlet Tube between the Cold End Rotor Air Inlet and the Roller Bearing is an Exterior Rotor Integrated Coolant Cooler in which Coolant Fluid from inside the Rotor is cooled by heat transfer to ambient air before it returns to the Rotor. Circulation of the Coolant Fluid through the Exterior Rotor Integrated Coolant Cooler is driven by the centrifugal thermosiphon that operates between the hotter Cooled Inner Walls at relatively large radius and the colder Exterior Rotor Integrated Coolant Cooler at relatively small radius. The Coolant Fluid passes from the Coolant Fluid Manifold 202 in the Tensile Structure through a Coolant Fluid Outflow Strut 204 that bridges across the opening of the Inlet Diffuser and then out of the Cold End Rotor Air Inlet by means of a Coolant Fluid Outflow Passage 206 within the Fluid Inlet Tube, it then flows radially outwards through a plurality of passages to pass axially away from the Cold End Rotor Air Inlet through a plurality of Outwards Axial Cooling Tubes 208 that are cooled by a plurality of Annular Heat Transfer Fins 210 coaxial with the Rotor Axis before flowing into a Connecting Coolant Gallery 214 and then flowing axially back towards the Cold End Rotor Air Inlet through a plurality of Inwards Axial Cooling Tubes 216 that are also cooled by the Annular Heat Transfer Fins. The Coolant Fluid then flows radially inwards and through a Cooling Fluid Inflow Passage 218 in the Fluid Inlet Tube that takes it back into the Coolant Fluid Manifold within the Tensile Structure by means of a Coolant Fluid Inflow Strut 220. Ambient air is drawn into the Exterior Rotor Integrated Coolant Cooler through the Open End 224 of the Cooler by Radial Inducer Blades 222 that also expel the air radially through the Annular Cooling Fins, all driven by the rotation of the Rotor. The radial location of the Exterior Rotor Integrated Coolant Cooler and the Roller Bearing with respect to the Rotor Axis are made more rigid by the three Cold End Inlet Bridging Struts 226 that bridge across the Cold End Rotor Air Inlet as well as the Radial Inducer Blades that help to rigidify the Exterior Rotor Integrated Coolant Cooler.

A Coolant Fluid Accumulator 221 contains an expandable pressurised gas filled Coolant Fluid Accumulator Bladder 223 inside a chamber that contains Coolant Fluid and that is connected to the Coolant Fluid Outflow Passage. The Coolant Fluid Accumulator maintains the Coolant Fluid pressure near the Rotor Axis above the Coolant Fluid vapour pressure. The Accumulator Bladder expands and contracts to compensate for changes in the volume of the Coolant Fluid during Rotor operation that are caused by effects such as Coolant Fluid compression and thermal expansion as well as compensating for elastic and thermal expansion or contraction of the components containing the Coolant Fluid. The location of the Coolant Fluid Accumulator on the Rotor Axis advantageously reduces the pressure that it needs to operate at.

This method of cooling the Coolant Fluid has numerous advantages: No external fan or other Coolant Fluid pumping means is required to cool the Rotor; The Coolant Fluid may be permanently sealed within the system, with no rotating seals or other points of leakage; The Roller Bearing may be of very small diameter for longer life and lower friction as the Coolant Fluid does not need to flow through the middle of it; The Roller Bearing is rigidly located with respect to the Rotor Axis; Allows the easier use of potentially more optimal Coolant Fluids such as toxic Ammonia with its high vapour pressure or Ethane and Hydrogen with very high Rotor Integrated Coolant Cooler pressures, any of which will have far lower Coolant Fluid pressures within the Cooling Tubes adjacent the Combustion Chamber when compared to more commonly available potential Coolant Fluids like Water or various Alcohols.

The ambient air used to cool the Coolant Fluid in the Exterior Rotor Integrated Coolant Cooler may also be replaced by cooling water or some other available Heat Sink Fluids depending upon the application. If using environmentally sourced water as the Heat Sink Fluid the Exterior Rotor Integrated Coolant Cooler will typically be physically much smaller than is necessary for an Exterior Rotor Integrated Coolant Cooler that uses ambient air as the Heat Sink Fluid.

Those skilled in the art will also be able to see that a Rotary Seal and optionally a Rotor Bearing could instead be located between the Cold End Rotor Air Inlet and Exterior Rotor Integrated Coolant Cooler in order to allow the Rotor Air Inlet to be operated at different air pressure to the Exterior Rotor Integrated Coolant Cooler.

FIG. 13 is an enlarged detail view of the FIG. 12 Engine cross section that shows the Domed End of one of the ceramic Combustion Chambers 162. The air flows From the Cooled Compression Passage 170 over the Domed End by means of a plurality of Air Flow Grooves 174 in the outer surface of the of the Combustion Chamber, these Air Flow Grooves are evenly distributed around the Radial Arm Axis 164 and converge at the Radially outermost centre of the Domed End where a Central Combustion Chamber Air Inlet 176 allows the air to flow radially inwards into the Combustion Chamber along with the fuel injected at the Fuel Injector 178. The Air Flow Grooves are covered over by a Domed Metal Shell 228 that serves as part of a Combustion Chamber Interlayer that also includes an Insulating Layer 230 that is sandwiched between the Domed Metal Shell and the Cooled Inner Wall 172. The Cooled Inner Wall has Cooling Tubes 232 bonded to it through which the Coolant Fluid flows to keep the Tensile Structure 168 at allowable temperatures. The area around the Central Combustion Chamber Air Inlet in the Domed End of the Combustion Chamber 234 is thickened as the compressive stresses created by the tension of the Tensile Structure over the compressively loaded Domed End of the Combustion Chamber mean that the Compressive Loads are very high in this area, and so thickening helps to reduce the compressive stresses. It also makes the Radially Inward Facing Surface 236 of the inside of the Combustion Chamber relatively flatter, which may allow the use of relatively weak thermally insulating materials on this surface to reduce heat transfer from the Combustion Gases to the Combustion Chamber.

The Domed Metal Shell bridges over the Air Flow Grooves, preventing the relatively weak Insulating Layer from falling into the Air Flow Grooves and blocking the air flow. Together the Domed Metal Shell and the Insulating Layer work together as a Combustion Chamber Interlayer that with some compliance in both the Domed Metal Shell and the Insulating Layer prevents excessive localised contact pressures between the Tensile Structure and the Combustion Chamber as well as reducing the amount of undesirable heat conduction to the Cooled Inner Wall.

The Air Flow Grooves provide an air flow path to the Central Combustion Chamber Air Inlet but also cool the Combustion Chamber owing to the relatively high air flow velocity through the Air Flow Grooves and the relatively high surface area of the Air Flow Grooves. Injecting the air and fuel into the Combustion Chamber at the maximum possible radius makes best use of the available air compression produced by the Rotor Tip Velocity and helps to maximises the usefulness of the volume of the Combustion Chamber to release as much combustion heat as possible at the greatest radius for increased Engine efficiency. The fuel is also well mixed with the air entering the combustion chamber and buoyancy of hot combustion gases combined with a single air inlet point into the combustion chamber means that Combustion Gases are very unlikely to reverse flow back into the Compression Passage as there would be a relatively large compression ratio required to do so.

FIG. 14 is an enlarged detail view of the FIG. 12 Engine cross section that shows the Hot End of the Rotor. The Air Bearing 150 (or optionally a Magnetic Bearing) is sufficiently large diameter and low friction that the Hot End Rotor Air Inlet 154 passes through the Air Bearing's inner diameter, with the Air Bearing thereby not being subjected to high temperatures by the Rotor Combustion Gas Outlet Tube 190. Three Hot End Inlet Bridging Struts 238 spaced equally around the Rotor Axis 2 support an Inner Hot End Rotor Air Inlet Body 241 off of which the rotor disk of the Combustion Gas Outlet Rotary Dynamic Seal 192 is mounted and which also supports the hot Rotor Combustion Gas Outlet Tube through an intermediate layer of Insulation 240 that also seals the gap between them against the high pressure Rotor Combustion Gases. The stationary Combustion Gas Outlet Manifold 194 is cooled in close proximity to the Combustion Gas Outlet Rotary Dynamic Seal in order to prevent it from over-heating, this cooling may be most easily achieved by using a supply of water as the Barrier Liquid in the Combustion Gas Outlet Rotary Dynamic Seal.

FIG. 15 shows a cross sectional view coincident with the Rotor Axis 2 of another preferred embodiment of the Engine of the current invention that incorporates Internal Intercooling into the Rotor 242 that made up of many components. Air enters an Air Inlet Manifold 244 on each end of the Rotor Casing 246 and then passes through circular corrugated Air Filter Elements 248, coaxial with the Rotor Axis 2 at each end of the Rotor Casing. The air then passes through a plurality of Variable Pre-Swirl Vanes 250, each rotating upon a respective individual Pre-Swirl Vane Axis 252, that are arrayed symmetrically about the Rotor Axis at each end of the Rotor Casing in order to introduce a swirling motion into the inlet air in the direction of Rotor rotation before it enters the Rotor by means of the Cold End Air Inlet 254 and Hot End Air Inlet 255. In operation the Variable Pre-Swirl Vanes may be rotated so that they create an optimal amount of pre-swirl in the air entering the Rotor Air Inlets in response to changing air flow volume and Rotor Angular Speed so as to reduce flow losses in the air entering the Rotor.

The air that enters the Rotor Air Inlets is then slowed in the conical frustum Inlet Air Diffusers 256 in order to recover pressure and then proceeds to flow radially outwards through first a Radially Inner Intercooler Array of plate-and-fin Inner Intercoolers 258 each located approximately equidistant from the Rotor Axis and then a Radially Outer Intercooler Array of plate-and-fin Outer Intercoolers 260, each located approximately equidistant from the Rotor Axis. Together the Radially Inner Intercooler Array and the Radially Outer Intercooler Array make up the Internal Intercooler of the Engine. The air flows radially through the gaps between the large number of parallel fins in each of the Inner Intercoolers and the Outer Intercoolers, the thinnest dimension of each fin being approximately perpendicular to the centrifugal reaction forces within the fin in order to minimise bending loads on each fin caused by centrifugal reaction forces.

The Internal Intercooler is divided into a Radially Outer Intercooler Array and a Radially Inner Intercooler Array so that the radial span of each array is smaller, thereby reducing the total centrifugal reaction force that each Inner Intercooler and each Outer Intercooler is subjected to. Due to the greater circumference of the Radially Outer Intercooler Array it also allows a greater number of Outer Intercoolers of the same thickness between plates as in the Radially Inner Intercooler Array to be incorporated within the Radially Outer Intercooler Array. This allows the Radially Outer Intercooler Array to be made axially shorter than the Radially Inner Intercooler Array, aided by the significantly higher air density within the Radially Outer Intercooler Array that therefore does not require as much volume to maintain the same air flow velocity as the Radially Inner Intercooler Array.

The air is compressed and cooled as it passes through these Intercooler Arrays, and undergoes greater compression than it would without the Internal Intercooling because of the greater average density of the air as it is kept cool during the centripetal acceleration driven compression process.

It is not necessary to restrict or direct air flow through any of the Inner Intercoolers or Outer Intercoolers as the flow through each is automatically shared and balanced by the increased cooling and compression that will occur if flow slows through any particular heat exchanger and the reduced cooling and compression that will occur if the flow speeds up through any particular plate-and-fin heat exchanger.

The Coolant Fluid flows through Intercooler Coolant Passages within the plates of each Inner Intercooler and each Outer Intercooler, with higher Engine efficiency typically being achieved by routing the Coolant Flow through the Internal Intercooler in a generally radially outwards direction as it is heated so that the Internal Intercooler is coldest at its inner radius. The Coolant Fluid flow is driven partly or wholly by the centrifugal thermosiphon that occurs as a result of the Coolant Fluid being heated at a greater radius than where it is cooled nearer the Rotor Axis or external to the Rotor. The Coolant Fluid flows through many small diameter Intercooler Coolant Passages in parallel within the Internal Intercooler so that the overall pressure drop is relatively low, while fluid flow velocities and total Coolant Fluid volume flow rate are relatively high.

The Coolant Fluid is cooled externally to the Rotor and enters and exits the Rotor by means of a Coolant Fluid Inlet 262 and Coolant Fluid Outlet 264 respectively, passing through the Cold End Air Inlet by means of an axial Fluid Inlet Tube 266 coaxial with the Rotor Axis that is supported off of three Cold End Inlet Stiffening Struts 268 spaced equally about the Rotor Axis. Cold Coolant Fluid is distributed within the Rotor to flow in parallel within the Internal Intercooler and Structural Coolant Fluid Manifold 274 by means of a toroidal Coolant Distribution Manifold 270 and warmed Coolant Fluid from the Intercooler is collected together from the multiple parallel flow passages by a Coolant Collection Manifold 272. Both the Coolant Distribution Manifold and the Coolant Collection Manifold are connected to the Fluid Inlet Tube by radial connection tubes.

The Inner Intercoolers and Outer Intercoolers are retained within the Tensile Structure 276, constructed from a fibre reinforced polymer composite and that is in general form a body of revolution about the Rotor Axis with a Radial Compression and Combustion Arm 278 extending radially outwards from it along a Radial Arm Axis 280. The radial outer end of each Inner Intercooler and each Outer Cooler presses directly against inwards facing surfaces within the Tensile Structure. To allow the air to flow out of the radial outer ends of the Inner Intercoolers and the Outer Intercoolers where they press against the Tensile Structure surfaces the Radial Outer Edges 282 of the Inner Intercoolers and Outer Intercoolers are serrated so that the tips of the serrations transfer the radial centrifugal reaction forces to the Tensile Structure while the compressed air flowing through the Inner Intercoolers and the Outer Intercoolers passes through the gaps between the radial outer tips of these serrations.

Air that has passed through the Outer Intercoolers may flow circumferentially through the Axial Gaps 284 on either axial side of the Outer Intercoolers in order to reach the Radial Compression and Combustion Arm. Because the compressed and intercooled air entering the Compression Passage is relatively cold the Compression Passage does not require cooling until it reaches a much greater radius and Rotor tangential velocity than would be the case for an Rotor that is not Internally Intercooled, and this will in general reduce the amount of cooling required for the Tensile Structure of an Internally Intercooled Rotor of the current invention. The inner radial portion of the Compression Passage is thus an Uncooled Compression Passage 286 and the Cooled Compression Passage 288 does not begin until relatively near to the Combustion Chamber where the temperature of the air undergoing compression has risen above the allowable temperature of the Tensile Structure. In some Internally Intercooled Engines it may not be necessary to have a Cooled Compression Passage at all. The Cooled Compression Passage has a metallic Cooled Inner Wall 290 that is cooled by the Coolant Fluid flowing through Cooling Tubes bonded to its outer surface, and to reduce the heat transfer to the Cooled Inner Wall and increase the speed of the cooling air flow radially outwards around the ceramic Combustion Chamber 292 there is a Combustion Chamber Shroud 294. Air Flow Grooves 296 on the outer surface of the Outer Expansion Passage 298 formed as part of the Combustion Chamber, extend radially outwards over part of the radial outer dome of the Combustion Chamber to the Combustion Chamber Air Inlets 300 and increase the surface area of the outer surface of the hot Combustion Chamber and Outer Expansion Passage so that the radially outwards flowing air can keep the ceramic walls cooler than they would be the case without the Air Flow Grooves.

Air enters the Combustion Chamber through a plurality of Combustion Chamber Air Inlets distributed around the Radial Arm Axis at approximately the same radius from the Rotation Axis and at the radial outermost end of the Air Flow Grooves and is combusted with Fuel injected into the Combustion Chamber through the Fuel Injector 302 to produce hot Combustion Gases that then accelerate radially inwards through a converging transition section to the Outer Expansion Passage, expanding and cooling as they do so.

The Combustion Gases pass through the Radial Expansion Joint 304 to the Inner Expansion Passage 306, and from there they flow through the Rotor Combustion Gas Outlet Tube 308, that passes through the Hot End Roller Bearing 310 and the Combustion Gas Outlet Rotary Dynamic Seal 312 that seals the Air Inlet Manifold from the Combustion Gases and then into a Tangential Nozzle Wheel 314 in which the Combustion Gases flow radially outwards before being expanded through nozzles directed substantially in a tangential direction to the Tangential Nozzle Wheel within a Turbine Casing 316 thereby imparting a reaction torque to the Rotor that provides the torque necessary for overcoming the frictional torque on the Rotor, as well as typically a surplus of torque that may be turned into electrical power within the Rotor Axial Flux Motor-Generator 342.

The partially expanded Combustion Gases from the Tangential Nozzle Wheel have a large tangential velocity with respect to the Rotor Axis, and flow radially inwards through an External Radial Inflow Turbine 318 that spins in the opposite direction to the Rotor about an axis coincident with the Rotor Axis and extracts more power from the expanding Combustion Gases before they are expelled through the Exhaust Outlet 320. The External Radial Inflow Turbine is connected to an External Motor-Generator 322 and also to an External Compressor 324 that draws in ambient air through the External Compressor Inlet 326 and provides compressed air to the Air Inlet Manifolds. The connecting air flow passages for air flow between the External Compressor Outlet 328 and the Air Inlet Manifolds are not shown. There is also optionally an External Intercooler (not shown) between the External Compressor Outlet and the Air Inlet Manifolds.

Fuel enters the Engine through Rotor Fuel Inlet 330 and passes through the Cold End Roller Bearing 332 mounted off of the Rotor Casing. The Rotor Casing Gases within the Rotor Casing and exterior to the Rotor are maintained in a partial vacuum by a Vacuum Pump (not shown) with the Vacuum Pump Inlet 334 being at the end of a Vacuum Pump Inlet Diffuser 336. Rotor Vacuum Seals 338 seal between the Rotor Air Inlets and the partially evacuated Rotor Casing, and the Autobalancers 340 balance the Rotor when it is operating above its first natural frequency of radial vibration so that the Rotor Bearing loads may be reduced.

FIG. 16 is an enlarged detail view of the FIG. 15 Engine cross section that shows part of the Combustion Chamber 292, and the various parts that lie between it and the Tensile Structure 276. The Combustion Chamber Shroud 294 increases the radial flow velocity of the compressing air flowing past the outer surface of the Combustion Chamber, and the cooling effect of this air on the Combustion Chamber walls is further enhanced by the increased surface area provided by the Air Flow Grooves 296 in the Combustion Chamber's outer surface. These Air Flow Grooves extend radially outwards over part of the domed radially outermost surface of the Combustion Chamber where they terminate in the Combustion Chamber Air Inlets 300 and in one case also the Fuel Injector 302 in the rotationally trailing inner surface of the Combustion Chamber.

Immediately adjacent the domed outer end of the Combustion Chamber is a Double Walled Metal Bladder in which an Inner Metal Domed Shell 342 and an Outer Metal Dome Shell 344 are joined together along their inner radial edges 352 to contain a thin layer of low strength plastically deformable solid or a liquid Bladder Filling 346 between them. During Engine operation the Bladder Filling redistributes itself within the Double Walled Metal Bladder to create even radial pressure gradients over the Inner Metal Domed Shell and the Outer Domed Shell thereby permitting some dynamic variation in the overall thickness of the Double Walled Metal Bladder to compensate for changes in the relative shapes of the Combustion Chamber and the Tensile Structure during operation. The Inner Metal Dome Shell also bridges over the Air Flow Grooves through which the air flows to the Combustion Chamber.

Between the Double Walled Metal Bladder and the Cooled Inner Wall 290 of the Tensile Structure is an Insulating Layer 348 that reduces the amount of heat that flows from the Combustion Chamber to the Cooled Inner Wall. The Cooled Inner Wall is bonded to the Tensile Structure and has Cooling Tubes 350 bonded to its outer surface through which Coolant Fluid flows to cool the Cooled Inner Wall.

FIG. 17 is an enlarged detail view of the FIG. 15 Engine cross section that shows the Combustion Gas outlet through the Tangential Nozzle Wheel 314 attached to the end of the Rotor Combustion Gas Outlet Tube 308. The hot Combustion Gases flow through the Rotor Combustion Gas Outlet Tube that is surrounded and supported by an Outlet Support Body 356, supported by three Hot End Inlet Bridging Struts 360 that bridge across the opening of the Hot End Air Inlet 255. An Insulating Layer 358 reduces heat transfer from the Rotor Combustion Gas Outlet Tube to the Outlet Support Body and helps to prevent overheating of the Hot End Roller Bearing 310 and the Combustion Gas Outlet Rotary Dynamic Seal 312 that seals the Hot End Air Inlet from the Combustion Gases. The Outlet Support Body is at least partially cooled by the fast flowing air entering the Hot End Air Inlet.

The Combustion Gases flow radially outwards through Radial Passages 352 within the Tangential Nozzle Wheel before being partially expanded through Outlet Nozzles 354 directed substantially in a tangential direction to the Tangential Nozzle Wheel within a Turbine Casing 316. The partially expanded Combustion Gases then expand further as they flow radially inwards through an External Radial Inflow Turbine 318 that rotates in the opposite direction to the Rotor about an axis coincident with the Rotor Axis. This arrangement has the benefit of increasing the physical size and reducing the necessary rotational speed and temperatures experienced by the External Radial Inflow Turbine, while the Tangential Nozzle Wheel is hotter than the External Radial Inflow Turbine it rotates at lower peripheral tangential speeds and so is subjected to smaller material stresses. The External Motor Generator attached to the External Turbine may also be reduced in size as the Axial Flux Motor Generator 361 attached to the Rotor will absorb some of the power from the expansion of the Combustion Gases. A Heat Shielding Disk 362 on the Rotor Combustion Gas Outlet Tube located between the Combustion Gas Outlet Rotary Dynamic Seal and the hot partially expanded Combustion Gases within the Turbine Casing helps to reduce the heat transfer from the Combustion Gases to the Combustion Gas Outlet Rotary Dynamic Seal, and so reduces the necessary cooling of the Combustion Gas Outlet Rotary Dynamic Seal. Water may be used as a Barrier Liquid in the Combustion Gas Outlet Rotary Dynamic Seal and may be continuously supplied and boiled off to cool it using the large heat energy input required to evaporate water.

FIG. 18 is an isometric view of the complete Rotor of the Engine of FIGS. 15-19 from the Hot End of the Rotor, without the Rotor Casing, Turbine Casing, External Radial Inflow Turbine, External Motor Generator or External Compressor showing.

FIG. 19 is an isometric view of the Rotor of the Engine of FIGS. 15-19 from the Hot End with a quarter section removed, the quarter section having one sectioning face perpendicular to the Rotor Axis 2 and coincident with the Radial Arm Axis 280 and the other sectioning face coincident with both the Radial Arm Axis and the Rotor Axis. The External Turbine, External Motor Generator and External Compressor and the Rotor Casing are omitted for clarity, though the Hot End Inlet Manifold and its internal components are shown.

Air entering the Air Inlet Manifold 244 passes through circular corrugated Air Filter Element 248 and then through Variable Pre-Swirl Vanes 250, each rotating about a separate Pre-Swirl Vane Axis 252 arrayed about the Rotor Axis. The swirling air then enters the Rotor through the Hot End Air Inlet 255.

The Outlet Nozzles 354 of the Tangential Nozzle Wheel 314 through which the Combustion Gases expand and accelerate are directed substantially in a tangential direction in order to provide a reaction torque that drives the rotation of the Rotor.

The Inner Intercoolers 258 and Outer Intercoolers 260 are arrayed about the Rotor Axis, though they are omitted in a sector adjacent the Radial Compression and Combustion Arm 278 so that the mass of the Inner and Outer Intercoolers diametrically opposite Radial Compression and Combustion Arm may to some extent balance the mass of the Radial Compression and Combustion Arm.

Each Inner Intercooler and each Outer Intercooler is a plate and fin heat exchanger in which a large number of planar thin Fins 364 are arrayed in parallel at constant pitch spacing with their thinnest dimension approximately perpendicular to the Rotor Axis. In each Inner Intercooler and each Outer Intercooler the Fins bridge between two Cooling Plates 366 through which the Coolant Fluid flows through numerous Intercooler Coolant Passages 368, the Cooling Plates having approximate mirror symmetry in a radial plane that is coincident with the Rotor Axis and that lies between the two Cooling Plates.

The Radial Outer Ends 282 of each Inner Intercooler and each Outer Cooler presses directly against Inwards Facing Surfaces 370 and 372 respectively within the Tensile Structure 276, and the Radial Outer Ends of the Inner Intercoolers and Outer Intercoolers are serrated so that air flowing through the Inner Intercoolers and the Outer Intercoolers passes through the gaps between the radial outer tips of these serrations.

The Radial Compression and Combustion Arm extends radially outwards along a Radial Arm Axis from the rest of the Tensile Structure that is in general form a body of revolution about the Rotor Axis. The ceramic Combustion Chamber 292 within the Radial Compression and Combustion Arm has Air Flow Grooves 296 in its outer surface that are arrayed about the Radial Arm Axis and extend in a generally radial direction from the Outer Expansion Passage 298 up to the Combustion Chamber Air Inlets 300.

FIG. 20 shows a cross sectional view coincident with the Rotor Axis of an alternative preferred embodiment to the Tangential Nozzle Wheel 314 of the Engine of FIGS. 15-19 in which the Turbine Casing 316 attached to the Rotor Casing is replaced by a Tangential Nozzle Wheel And Turbine Casing 317 in which the Turbine Casing that surrounds the External Radial Inflow Turbine 318 is attached directly to the Tangential Nozzle Wheel, thereby eliminating the need for the separate Turbine Casing and also reducing the pressure differential that must be withstood by the Combustion Gas Outlet Rotary Dynamic Seal 312 to the pressure difference between the Air Inlet Manifold 244 and the ambient atmosphere.

FIG. 21 shows a cross sectional view coincident with the Rotor Axis 2 and the Radial Arm Axis 374 of another preferred embodiment of the Engine of the current invention in which there is a single Rotor Air Inlet 376 at the Hot End of the Rotor and in which the Rotor is supported on a Floating Ring Hydrodynamic Bearing 378 and a Rolling Element Bearing 380 that are both at the Cold End of the Rotor opposite the end with the Combustion Gas Outlet Manifold 382.

Air enters the Engine by means of the Air Inlet Manifold 384, having optionally already been compressed in an External Compressor (not shown) and then also optionally intercooled in an External Intercooler (not shown). The air then passes through a circular corrugated Air Filter Element 386 to remove particulates and then through Variable Pre-Swirl Vanes 388, each rotating upon a separate Pre-Swirl Vane Axis 390, arrayed about the Rotor Axis before the swirling air enters the Rotor through the Rotor Air Inlet. The air is then slowed to recover pressure by the Air Inlet Diffuser 392 and is also accelerated rotationally to better match the Rotor Angular Speed by the Air Inlet Inducer Blades 394 within the Air Inlet Diffuser.

The air undergoes compression and heating as it flows radially outwards towards the Combustion Chamber 396. It enters the Combustion Chamber and is heated by combustion with Fuel to produce hot Combustion Gases that then flow radially inwards by means of first the Outer Expansion Passage 398 and then the Inner Expansion Passage 400, and then out of the Rotor by means of the Rotor Combustion Gas Outlet Tube 402 that passes through the Combustion Gas Outlet Rotary Dynamic Seal 404 and into the Combustion Gas Outlet Manifold that supplies the Combustion Gases to whatever purpose they are applied to, such as an External Turbine (not shown). The Coolant Fluid Manifold and Fuel Manifold embedded within the Tensile Structure 416 are identical to that shown in greater detail in FIG. 11.

An Axial Flux Motor 406 is used to drive and control the speed of rotation of the Rotor against frictional and Windage losses, Autobalancers 408 are used to maintain the balance of the Rotor when operating above the first natural frequency of radial oscillation. The Floating Ring Hydrodynamic Bearing and Rolling Element Bearing are mounted off of the Rotor Casing in Bearing Housing Body 410 that is mounted off of the Rotor Casing 412 by means of three Flexure Posts 414 arrayed symmetrically about the Rotor Axis that provide low stiffness to movements of the Bearing Housing Body with respect to the Rotor Casing in directions perpendicular to the Rotor Axis, while maintaining greater stiffness against relative rotation of the Bearing Housing Body with respect to the Rotor Casing, which is advantageous in making it more feasible to overcome gyroscopic reaction forces when rotating the Rotor about axes not parallel to the Rotor Axis.

An Air Lubricated Face Seal 418 acts as a Rotary Vacuum Seal and is located at the minimum opening diameter of the Rotor Air Inlet. The static air pressure at this minimum opening diameter is lowest owing to it having the highest air flow velocity and this combined with the minimum internal diameter of the Air Lubricated Face Seal means that the rate of air leakage through the small gap that exists between the faces of the Air Lubricated Face Seal is nearer to a practical minimum. Leakage through the Air Lubricated Face Seal must be compensated for by an increased volume of vacuum pumping by the Vacuum Pump (not shown) from the Vacuum Pump Inlet 420, but the added power this consumes may be compensated for by the relatively low frictional losses of the Air Lubricated Face Seal, as well as the relatively large diameter Rotor Air Inlet that it may permit to be integrated within a given overall diameter of Rotor. As the Engine size increases the relative amount of leakage will typically reduce so that in large Engines the rate of leakage may become more acceptable.

FIG. 22 is an enlarged detail view of the FIG. 21 Engine cross section that shows part of the Rotor Air Inlet 376 and the Air Lubricated Face Seal 418. A Rotating Face Seal Element 422 is mounted off of the Rotor with an axially compliant sealing arrangement incorporating a Sealing O-Ring 424 and has a Planar Seal Face perpendicular to the Rotor Axis axially adjacent to and opposing across a small axial gap a complementary Planar Seal Face on the Fixed Face Seal Ring 426 that is mounted off of the Rotor Casing. Air serves as the lubricating film that maintains the separation of the two Planar Seal Faces when the Rotor is rotating. The O-Ring provides some axial and angular compliance in the location of the Rotating Face Seal Element with respect to the Rotor so that the very small gap between the Planar Seal Faces may be better maintained. There are many other axially compliant sealing arrangements that could also be used between the Rotor and the Rotating Face Seal Element in order to achieve similar functional results.

FIG. 23 is an enlarged detail view of the FIG. 21 Engine cross section that shows a non-contacting Annular Coolant Fluid Inlet 428 and circular non-contacting Liquid Fuel Inlet 430 to the Rotor, with Fuel and Coolant Fluid being supplied to the Rotor by an External Fuel Supply Tube 432 and an External Coolant Supply Tube 434 respectively. Both the Rotor Fuel Inlet Passage 436 and the Rotor Coolant Inlet Passage 438 are in general form conical frustum surfaces of revolution about the Rotor Axis with internal diameters that increase with distance from their respective inlets. In this manner liquids within the fast spinning Rotor Fuel Inlet Passage and Rotor Coolant Inlet Passage are driven into the Rotor by centrifugal reaction forces that therefore generally prevent the liquids from leaking back out of their respective passage ends, thereby advantageously eliminating the need for potentially unreliable rotating seals at these liquid inlets.

FIG. 24 is an enlarged detail view of the FIG. 21 Engine cross section that shows the Rotor Combustion Gas Outlet Tube 402 that passes through the Combustion Gas Outlet Rotary Dynamic Seal and into the Combustion Gas Outlet Manifold 382. The Combustion Gas Outlet Rotary Dynamic Seal is comprised of an Annular Groove 440 concentric with the Rotor Axis with a radially inwards facing opening in which Annular Seal Ring 444 rotates, driving the rotation of the Barrier Liquid 446 within the Annular Groove and balancing the pressure differential between the two sides of the seal by means of the radial pressure gradient established in the Barrier Liquid by centrifugal reaction forces and the difference in the inner radius of the Barrier Fluid on either side of the Annular Seal Ring. The Annular Seal Ring is attached to the Rotor Combustion Gas Outlet Tube by means of an Axial Tubular Extension 442 that is joined to the Rotor Combustion Gas Outlet Tube at an axial location a small distance away from the Annular Seal Ring in order to reduce the amount of heat conducted to the Annular Seal Ring from the Rotor Combustion Gas Outlet Tube. The Combustion Gas Outlet Rotary Dynamic Seal is cooled by means not shown, but that may optionally include circulating the Barrier Liquid through an external cooler, or relying upon evaporation of a continuous supply of water to the Seal, or by heat transfer to the air entering the Rotor.

FIG. 25 is an enlarged detail view of the FIG. 21 Engine cross section near the Rotor Axis on the Cold End of the Rotor. The Rotor rotates in an oil lubricated Floating Ring Hydrodynamic Bearing 378 that rotates at a rotational speed lower than the Rotor upon the Bearing Journal 448 on the Cold End Fluid Transfer Shaft 450 and within the Floating Ring Bearing Housing 452 inside the Bearing Housing 410. The Rotor Fuel Inlet Passage 436 and the Rotor Coolant Inlet Passage 438 as well as the Rotor Coolant Outlet Passage 454 all pass through the Cold End Fluid Transfer Shaft as they travel to and from the Coolant and Fuel passages within the Tensile Structure 416 through the centre of the Floating Ring Hydrodynamic Bearing. The Fuel passing from the Rotor Fuel Inlet Passage to the Fuel Transfer Tube 130, the Coolant Fluid passing from the Rotor Coolant Inlet Passage into the Coolant Fluid Inlet Transfer Tube 132 and the Coolant Fluid passing from the Coolant Fluid Outlet Transfer Tube 142 to the Rotor Coolant Outlet Passage 454 before flowing out of the Coolant Fluid Outlet Holes 456 and into the External Coolant Outflow Tube 458.

A Rotary Vacuum Dynamic Seal utilising a low vapour pressure liquid as the Vacuum Barrier Liquid 460 seals between the Cold End Fluid Transfer Shaft and the Rotor Casing 412. The Annular Vacuum Seal Ring 462 attached to and rotating with the Cold End Fluid Transfer Shaft has an outside diameter that is only slightly larger than the Inner Diameter 464 on the higher pressure side of the Annular Groove in which the Vacuum Barrier Liquid maintains the seal, so that as the Rotor Speed increases any Vacuum Barrier Liquid that is surplus to the volume required to match the gas pressure difference between the two sides of the Annular Seal Ring is able to leak away out of the Annular Groove, thereby maintaining the minimum necessary amount of Vacuum Barrier Liquid in contact with the Annular Seal Ring and so minimising the frictional losses of the Rotary Vacuum Dynamic Seal, while making it possible for the seal to withstand greater pressure differentials at low rotational speeds by adding more Vacuum Barrier Liquid to the Annular Groove. The Vacuum Barrier liquid may be optionally also utilised as the lubricant for the Floating Ring Hydrodynamic Bearing.

FIG. 26 is a simplified flow diagram and cross-section of an Internally Intercooled Engine of the current invention that omits much detail and some components to improve clarity and shows the general configuration of fluid flows within the Engine. Air from Air Intake 466 passes through an Air Filter 468 and is then compressed in an External Compressor 470 driven by a Variable Geometry Secondary External Turbine 472 and/or External Motor-Generator 474. The Variable Geometry Secondary External Turbine has Adjustable Stator Vanes that may be moved while the engine is operating to alter the power developed by the Variable Geometry Secondary External Turbine by a given volume flow rate of Combustion Gases, and in combination with the variable torque input or output from the External Motor/Generator this allows the speed of the External Compressor to be varied to control the amount of external compression that the air receives prior to entering the Rotor. This provides a partial means for controlling the power output of the Engine given a relatively constant Combustion Gas temperature in the Combustion Chamber 498.

After being compressed in the External Compressor the air is cooled in an External Intercooler 476 by transferring heat energy to a Heat Sink Fluid 478 that in most cases will be ambient air or a liquid primarily composed of water either from an environmental source or circulating within a closed ancillary Heat Sink Fluid system. The cooled compressed air then enters the Cold End Inlet Manifold 480 and the Hot End Inlet Manifold 482 that are mounted on each end of the Rotor Casing 484 within which the Rotor 486 rotates about the Rotor Axis 488. The air then enters the Rotor in parallel through the Cold End Rotor Inlet 490 and the Hot End Rotor Inlet 492 before flowing radially outwards through the Internal Intercooler 494 undergoing compression and cooling as it flows out to and around the Combustion Chamber that it then enters by means of the Combustion Chamber Air Inlet 496 along with the Fuel from the Fuel Injector 500. The air in the Combustion Chamber is heated by combustion of the Fuel to create hot Combustion Gases that then flow radially inwards through the Expansion Passage 502 to the Rotor Combustion Gas Outlet Tube 504 that passes through the Combustion Gas Outlet Rotary Dynamic Seal 534 and into the Combustion Gas Outlet Manifold 506 from where it enters the Primary External Turbine 508 that drives the External Generator 510. The Primary External Turbine is also optionally a Variable Geometry Primary External Turbine with Adjustable Stator Vanes. Combustion Gases from the Primary External Turbine pass to the Variable Geometry Secondary External Turbine and then to an Exhaust Control Valve 512 before being exhausted to the atmosphere.

Autoignition of the Fuel with the relatively cool Internally Intercooled air in the Combustion Chamber may not be possible or reliable with many Fuels, and it will generally be difficult for a non-positive displacement External Compressor such as a preferred centrifugal compressor to overcome the blocking centrifugal thermosiphon pressure caused by the cooling of the air within the Internal Intercooler when the Rotor is at maximum rotational speed. Therefore to ignite combustion within the Combustion Chamber the External Motor-Generator powers the External Compressor to blow air through the Rotor while it is either stopped or spinning only relatively slowly. Fuel is injected into the Combustion Chamber, where in gaseous form it mixes with the flowing air and flows to the Combustion Gas Outlet Manifold where it is ignited by Igniter 514 powered by power supply 516 while the Exhaust Control Valve is used to restrict the rate of air flow through the Engine so that the combustion can propagate back through the flowing air-fuel mixture to the Combustion Chamber.

A Fuel Supply 518 supplies fuel to the Rotor through a Fuel Filter 520 that removes any particulates and in the case of gaseous fuels at sufficient pressure to overcome air pressure within the Combustion Chamber. The Fuel passes through a Cold End Fluid Transfer Shaft 522 that is part of the Rotor and extends through the Cold End Inlet Manifold with a Cold End Air Inlet Manifold Dynamic Rotary Seal 524 preventing air leakage from the Cold End Inlet Manifold to the atmosphere.

Coolant Fluid, of which water is a preferred example, enters the Rotor through the Cold End Fluid Transfer Shaft before flowing in parallel radially outwards in multiple Intercooler Coolant Passages within the Internal Intercooler. Some of this Coolant Fluid then flows out further radially to cool the Tensile Structure in Coolant Tubes 528 around the Combustion Chamber before flowing radially inwards along with the rest of the Coolant Fluid flow from the Intercooler to exit the Rotor through the Cold End Fluid Transfer Shaft and be cooled by heat transfer to the Heat Sink Fluid within the Off-Rotor Coolant Cooler 526 from where it then circulates back to the Rotor. This Coolant Fluid flow is driven by centrifugal thermosiphon, though if necessary an External Coolant Circulation Pump could be used as well.

The Rotor Casing is partially evacuated by a Vacuum Pump 530 to reduce Rotor Windage, with Rotor Vacuum Seals 532 providing the seal between the rotating Rotor and the Rotor Casing.

Figure 27:
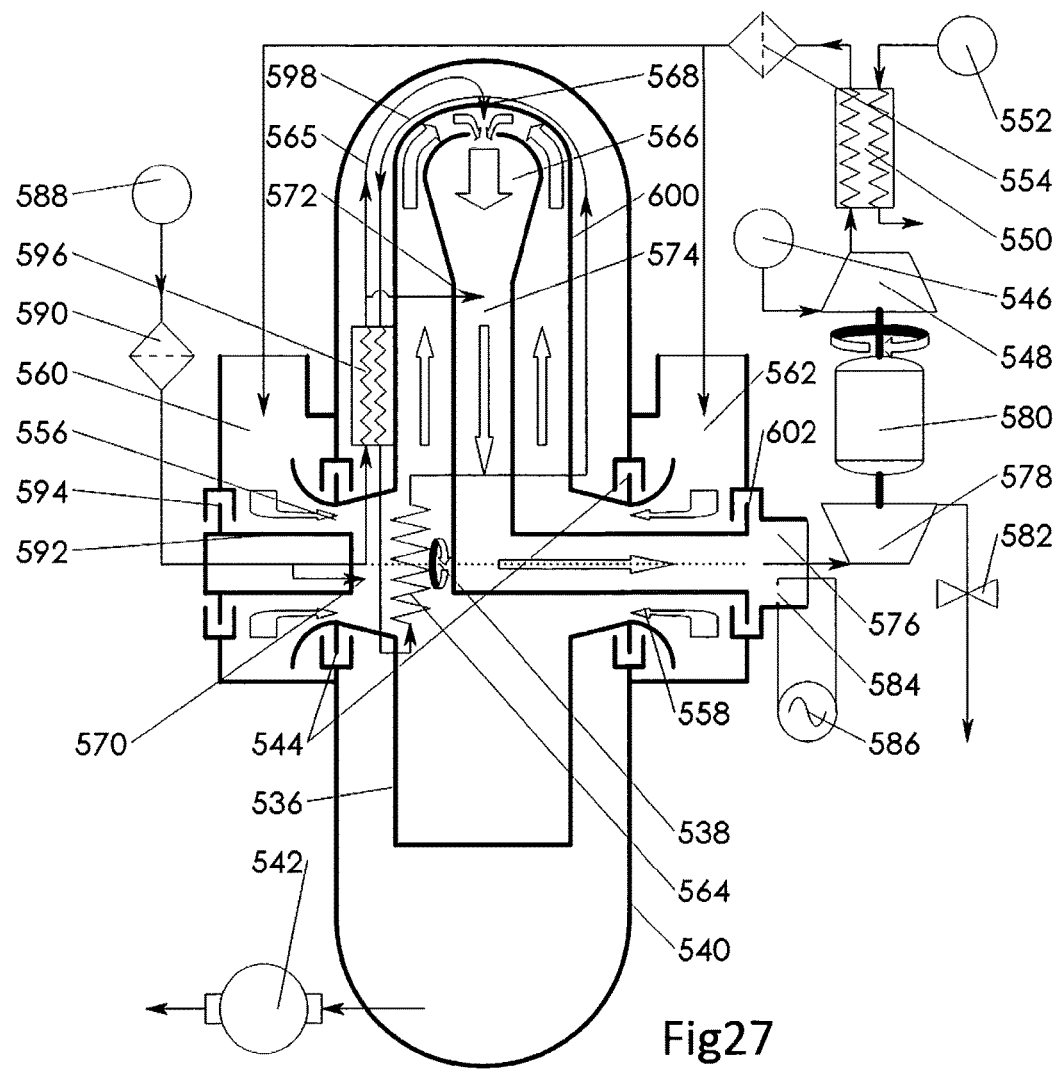
FIG. 27 is a simplified flow diagram and cross-section of an Engine of the current invention that omits much detail and some components to improve clarity and shows the general configuration of fluid flows within an Engine in which the Rotor is cooled by the air and fuel entering the Rotor.

FIG. 27 is a simplified flow diagram and cross-section of an Engine of the current invention that omits much detail and some components to improve clarity and shows the general configuration of fluid flows within an Engine in which the Rotor is cooled by the air and fuel entering the Rotor. The Rotor 536 rotates about the Rotor Axis 538 within the Rotor Casing 540 that is partially evacuated by Vacuum Pump 542, with Rotor Vacuum Seals 544 sealing between the spinning Rotor and the Rotor Casing.

Air from Air Intake 546 is compressed within External Compressor 548 that is preferably a dynamic compressor of the radial and/or axial type, with radial being preferred in smaller sizes and axial in larger sizes. The Air is then cooled in the External Intercooler 550 by transferring heat into the Heat Sink Fluid 552. The Air is then filtered to remove particulates in Air Filter 554, taking advantage of the reduced volume of the air after compression and intercooling that reduces the necessary size of the Air Filter for a given air pressure loss. Air enters the Rotor by means of the Cold End Rotor Inlet 556 and the Hot End Rotor Inlet 558 that receive compressed air from the Cold End Inlet Manifold 560 and the Hot End Inlet Manifold 562 respectively. Some portion of the air that enters the Rotor cools the Coolant Fluid in the Rotor Integrated Coolant Cooler 564 near the Rotor Axis raising the temperature of the air slightly, and this will typically reduce Engine efficiency, through it has the benefit of potentially greater simplicity due to not requiring any fluids other than air and Fuel to enter the Rotor.

A portion of the Fuel is injected into the air within the Rotor near the Rotor Axis by the Fuel Pre-Combustion Chamber Injector 570 to produce a non-combusting air-Fuel mixture. In the case of liquid Fuel this may advantageously produce slight cooling as the Fuel evaporates, and may thereby increase the compression achieved within the Rotor and enhance Engine efficiency. By injecting this Fuel into the air within the Rotor near the Rotor Axis rather than in the Cold Air Inlet Manifold it advantageously does not increase the necessary gas volume flow rate through the Cold End Rotor Inlet. In the case of gaseous Fuels with density lower than air such as methane and hydrogen injecting some of the Fuel into the air near the Rotor Axis has the advantages of reducing the amount of compressed Fuel that must be supplied to the Rotor and reducing the necessary size of the Radial Fuel Delivery Tube 565 within the Tensile Structure that delivers Fuel to the Fuel Injector 568 in the Combustion Chamber 566.

The air-fuel mixture flows radially outwards and enters the Combustion Chamber where it is combusted with more Fuel injected into the Combustion Chamber by the Fuel Injector to produce hot Combustion Gases. Additional Fuel is injected into the partially expanded and slightly cooled Combustion Gases at the Reheat Fuel Injector 572 within the Expansion Passage 574 where it is combusted with the already hot Combustion Gases in order to increase the Combustion Gas temperature and pressure at the Combustion Gas Outlet Manifold 576 without increasing the temperature or pressure of the Combustion Gases within the Combustion Chamber.

The hot, high pressure Combustion Gases in the Combustion Gas Outlet Manifold are sealed from the Hot End Inlet Manifold by a Combustion Gas Outlet Rotary Dynamic Seal 602 and flow through the External Turbine 578 that drives the External Motor-Generator 580 and the External Compressor, before passing through the Exhaust Control Valve 582 and being exhausted to the atmosphere. The External Turbine is optionally a Variable Geometry External Turbine with Adjustable Stator Vanes.

It will in many cases be possible to ignite combustion within the Rotor when it is Rotating at high speed by using the External Compressor driven by the External Motor-Generator to blow air through the Rotor before starting to inject fuel into the Combustion Chamber where it will auto-ignite with the flowing hot compressed air. Igniter 584 powered by power supply 586 and use of the Exhaust Control Valve to restrict Combustion Gas flow may provide an alternative means for igniting combustion at lower Rotor speeds where the Compressed Air within the Combustion Chamber is not sufficiently hot to auto-ignite the injected fuel.

The Fuel Supply 588 supplies Fuel to the Rotor through a Fuel Filter 590 that removes particulates. In the case of gaseous Fuels that have lower density than air such as methane the Fuel Supply will need to be at an elevated pressure sufficient to overcome air pressure at the Fuel Injector. The Fuel passes through a Cold End Fluid Transfer Shaft 592 that is part of the Rotor and extends through the Cold End Inlet Manifold with a Cold End Air Inlet Manifold Dynamic Rotary Seal 594 preventing air leakage from the Cold End Inlet Manifold to the atmosphere. Within the Rotor the Fuel that flows to the Fuel Injector passes through a Fuel Coolant Cooler 596 that provides some cooling of the Rotor Coolant by heat transfer to the Fuel.

The Coolant Fluid is heated within Cooling Tubes 598 embedded within the Tensile Structure of the Compression Passage 600 and near the Combustion Chamber. The Coolant Fluid is cooled at smaller radii from the Rotor Axis within the Fuel Coolant Cooler and the Rotor Integrated Coolant Cooler and is thereby caused to circulate by means of a centrifugal thermosiphon.

Figure 28:
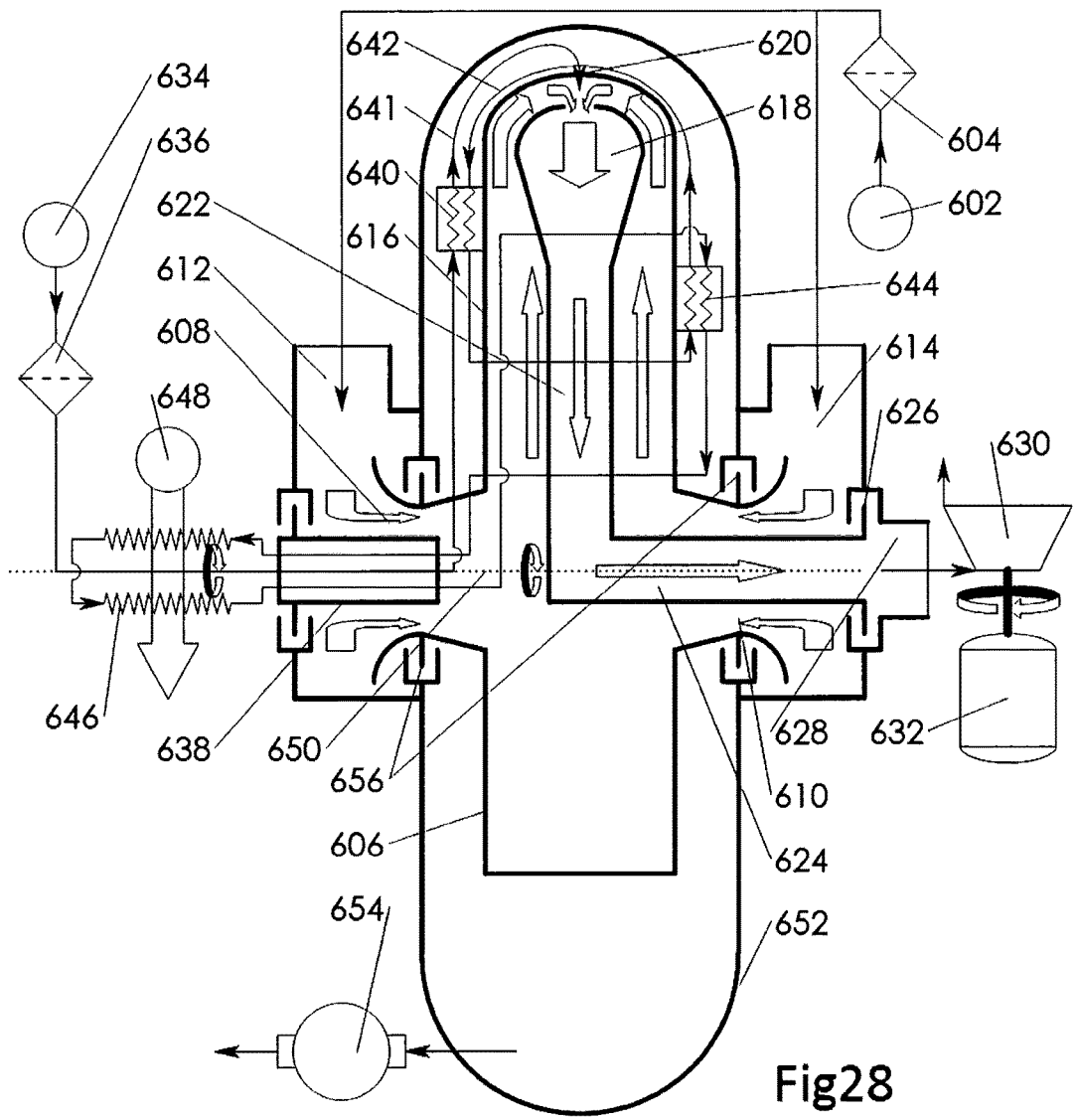
FIG. 28 is a simplified flow diagram and cross-section of an Engine of the current invention that omits much detail and some components to improve clarity and shows the general configuration of fluid flows within an Engine in which the Rotor is cooled by a Coolant Fluid that is in turn cooled by a Secondary Coolant that is itself cooled in an Exterior Secondary Coolant Cooler attached to the Rotor but exposed to and cooled by ambient air or another Heat Sink Fluid.

FIG. 28 is a simplified flow diagram and cross-section of an Engine of the current invention that omits much detail and some components to improve clarity and shows the general configuration of fluid flows within an Engine in which the Rotor is cooled by a Coolant Fluid that is in turn cooled by a Secondary Coolant that is itself cooled in an Exterior Secondary Coolant Cooler attached to the Rotor but exposed to ambient air.

Air from Air Inlet 602 passes through Air Filter 604 and enters the Rotor 606 by means of the Cold End Rotor Inlet 608 and the Hot End Rotor Inlet 610 that receive air from the Cold End Inlet Manifold 612 and the Hot End Inlet Manifold 614 respectively. The air flows radially outwards through the Compression Passage 616 to the Combustion Chamber 618 where it is heated by combustion with Fuel from the Fuel Injector 620 that is ignited by auto-ignition with the hot compressed air to produce hot Combustion Gases. The Combustion Gases expand and cool as they flow radially inwards through the Expansion Passage 622 and then to the Rotor Combustion Gas Outlet Tube 624 and through the Combustion Gas Outlet Rotary Dynamic Seal 626 to the Combustion Gas Outlet Manifold 628 from where the Combustion Gases flow through the External Turbine 630 that drives the External Generator 632 expand and cooling as they do so before being exhausted to the atmosphere.

Fuel from the Fuel Supply 634 passes through Fuel Filter 636 and into the Rotor through the Cold End Fluid Transfer Shaft 638 that is part of the Rotor. Within the Rotor the Fuel flows radially outwards to the Fuel Injector, being cooled in a Rotor Fuel Cooler 640 where it is cooled by heat transfer to the Coolant Fluid to prevent excessive Fuel temperatures that might otherwise lead to damage of the Tensile Structure through which the Fuel flows inside a Radial Fuel Delivery Tube 641.

The Coolant Fluid circulates due to centrifugal thermosiphon about a Coolant Fluid circuit within the Rotor that includes; being heated within the Cooling Tubes 642 embedded within the Tensile Structure surrounding the Compression Passage and near the Combustion Chamber, being heated as it cools the Fuel in the Rotor Fuel Cooler and being cooled within a Rotor Integrated Coolant Cooler 644 at a radius smaller than the Cooling Tubes by heat transfer to a Secondary Coolant Fluid.

The Secondary Coolant Fluid cools the Coolant Fluid within the Rotor Integrated Coolant Cooler, being heated as it does so, and then flows radially inwards and through the Cold End Fluid Transfer Shaft to the Exterior Rotor Integrated Secondary Coolant Cooler 646 that is attached to and rotates with the Rotor, but is external to Cold End Inlet Manifold. Heat Sink Fluid 648 that in most cases will be atmospheric air or a liquid that is primarily water, flows through this Exterior Rotor Integrated Secondary Coolant Cooler to cool the Secondary Coolant Fluid. The Secondary Coolant then flows back to the Rotor Integrated Coolant Cooler completing its flow circuit that is driven by centrifugal thermosiphon. Having separate Coolant Fluid and Secondary Coolant Loops within the Rotor may allow the maximum pressure within the Cooling Tubes that cool the Tensile Structure to be reduced.

The Rotor rotates about the Rotor Axis 650 within the Rotor Casing 652 that is partially evacuated by Vacuum Pump 654, with Rotor Vacuum Seals 656 sealing between the spinning Rotor and the Rotor Casing.

Figure 29:
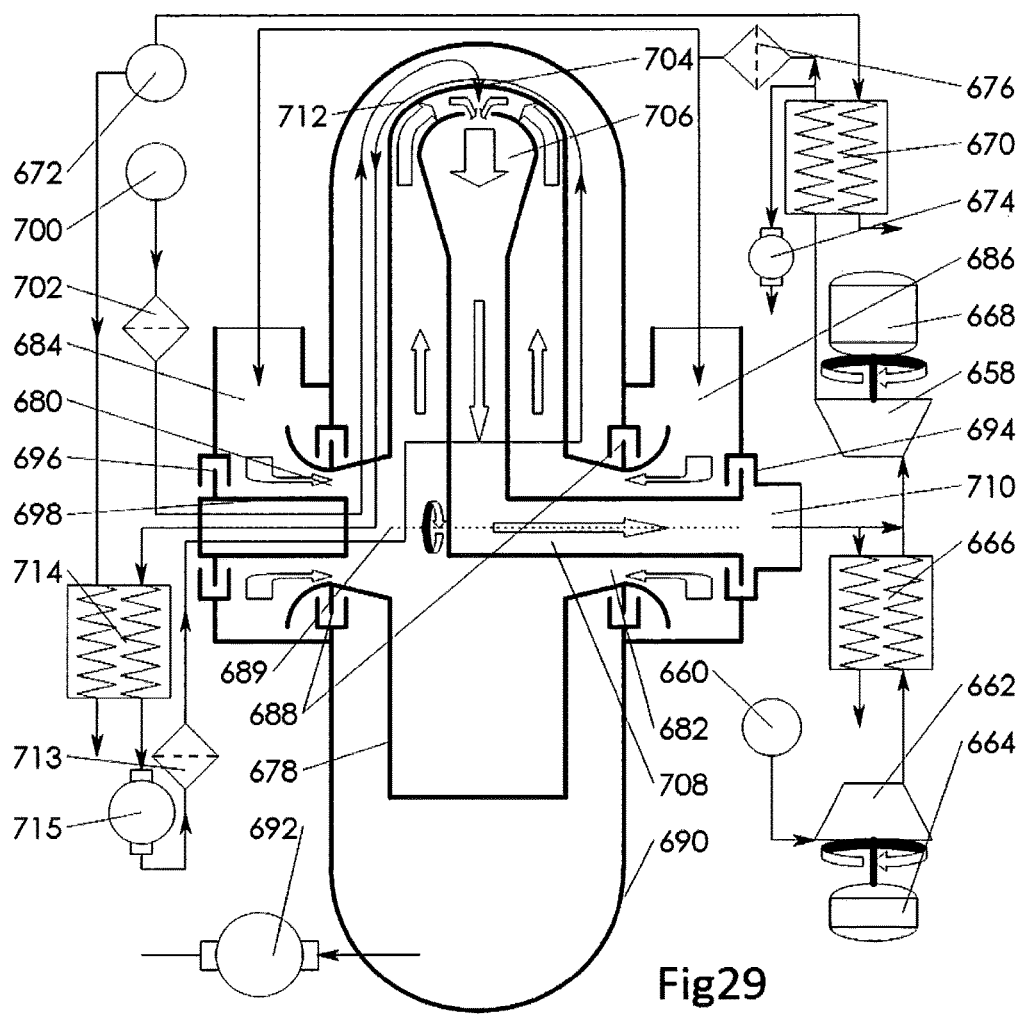
FIG. 29 is a simplified flow diagram and cross-section of an Engine of the current invention that omits much detail and some components to improve clarity and shows the general configuration of fluid flows within an Engine in which the air entering the Rotor is below atmospheric pressure in order to increase the size of the External Turbine in a low power output Engine of the current invention.

FIG. 29 is a simplified flow diagram and cross-section of an Engine of the current invention that omits much detail and some components to improve clarity and shows the general configuration of fluid flows within an Engine in which the air entering the Rotor is below atmospheric pressure in order to increase the size of the External Turbine 658 in a low power output Engine of the current invention.

Air from the Air Inlet 660 passes through an External Compressor 662 powered by External Motor 664 that is used to control the amount of air that enters the Engine, and also to blow air through the Engine prior to and during initiation of combustion.

The air then passes through preferably a Regenerative Heat Exchanger 666, though it could alternatively be a Recuperative Heat Exchanger, in which heat is transferred from a fraction of the hot Combustion Gases coming out of the Rotor and into the air from the External Compressor, thereby heating the air and cooling the Combustion Gases. The cooled Combustion Gases are then exhausted to the Atmosphere while the hot air and the remainder of the hot Combustion Gases coming out of the Rotor are mixed together and pass through the External Turbine that drives the Generator 668 in which the Mixed Gas temperature drops and pressure falls to below ambient atmospheric pressure. The Mixed Gases are then cooled in Gas Cooler 670 by the Heat Sink Fluid 672, and any water vapour that is condensed into liquid water within the Gas Cooler is pumped out of the Gas Cooler and vented to the atmosphere by Condensate Pump 674. The Mixed Gases are filtered by the Filter 676 to remove particulates before they enter the Rotor 678 by means of the Cold End Rotor Inlet 680 and the Hot End Rotor Inlet 682 that receive the Mixed Gases from the Cold End Inlet Manifold 684 and the Hot End Inlet Manifold 686 respectively.

The Mixed Gases within the Cold End Inlet Manifold and the Hot End Inlet Manifold are at a pressure below atmospheric pressure, and this reduces the pressure across the Rotor Vacuum Seals 688 that provide the rotary sealing between the Rotor, spinning about Rotor Axis 689 and the Rotor Casing 690 that is partially evacuated by Vacuum Pump 692. Similarly the pressure across the Combustion Gas Outlet Rotary Dynamic Seal 694 is relatively small, being less than atmospheric pressure, as is the pressure across the Cold End Air Inlet Manifold Dynamic Rotary Seal 696 that seals the opening through which the Cold End Fluid Transfer Shaft 698 that is part of the Rotor passes to admit Fuel and Coolant Fluid to and from the Rotor.

Fuel from the Fuel Supply 700 passes through Fuel Filter 702 and enters the Rotor through the Cold End Fluid Transfer Shaft. The Fuel is injected by the Fuel Injector 704 into the Combustion Chamber 706 where it is combusted with the Mixed Gases to produce hot Combustion Gases that expand and cool as they flow radially inwards to exit the Rotor through the Rotor Combustion Gas Outlet Tube 708 that delivers the Combustion Gases into the Combustion Gas Outlet Manifold 710.

The Rotor is cooled by the Coolant Fluid flowing through Cooling Tubes 712 in the Tensile Structure and the Coolant Fluid is itself cooled in the Off-Rotor Coolant Cooler 714 by heat transfer to the Heat Sink Fluid and is pumped by Coolant Pump 715 and filtered by Coolant Filter 713 before it re-enters the rotor.

FIG. 30 shows an isometric cross sectional view coincident with the Rotor Axis 2 and the Radial Arm Axis 716 of the Rotor of another preferred embodiment of the Engine of the current invention in which the Cooled Compression Passage 718 in which the air temperature exceeds the temperature capabilities of the Rotor Structure 720 is lined by radially overlapping Foil Rings 722 that are each bonded at their radial innermost end to the Cooled Inner Wall of the Cooled Compression Passage and that in their overlapping arrangement create small air gaps that serve to partially insulate the Cooled Inner Wall from the hot air, thereby reducing the amount of cooling required for the Cooled Inner Wall.

The interior surface of the Rotor Structure in areas away from the Cooled Inner Wall is entirely sealed against exposure to air by a thin metallic Inner Wall 724 that serves to reduce the chance of air leakage through small cracks in the fibre reinforced polymer composite Rotor Structure.

The Counterbalance Arm 726 that serves to approximately balance the spinning mass of the single Radial Compression and Combustion Arm 728 has a Rotor Assembly Opening Port 730 through which the Combustion Chamber 732 and other components may be inserted into the Rotor during assembly before being closed off and sealed by a Rotor Counterbalance Mass 734. The Rotor Counterbalance Mass is screwed into the Counterbalance Mass Anchoring Structure 736 that extends off of the metallic Inner Wall and is embedded within the fibre reinforced polymer composite Tensile Structure by multiple Anchoring Fingers 738 distributed about the Radial Arm Axis. The Rotor Counterbalance Mass contains Ballast Pockets 740 that may hold a low density liquid, powder, or other substance that will rapidly fragment or disperse in the event of a Rotor failure, thereby reducing chances that the Rotor Counterbalance Mass will penetrate the Rotor Casing or other protective barriers. The movement of Rollers 742 within each Autobalancer 744 serves to provide any residual balancing of the Rotor when it is rotating at speeds above its first natural frequency of radial vibration.

The Combustion Gas Bend Transition 746 incorporates a Flow Bend Vane 748 in order to reduce flow losses associated with the Combustion Gases changing flow direction. The Combustion Gas Bend Transition also has an Inner Expansion Passage Counterbalance Mass 750 attached to it that approximately counterbalances the mass of the Inner Expansion Passage 752 and reduces the loads upon whatever mounting system (not shown) is used to constrain the location of the combined Combustion Gas Bend Transition, Inner Expansion Passage and Rotor Combustion Gas Outlet Tube 754 within the Rotor.

Three Hot End Inlet Bridging Struts 760 bridging across the annular opening of the Hot End Air Inlet 756 support an Outlet Support Body 758 off of which the Floating Ring Hydrodynamic Bearing 762 on which the Rotor rotates in mounted as is the rotor disk of the Combustion Gas Outlet Rotary Dynamic Seal 764. The ends of the Outlet Support Body also support the hot Rotor Combustion Gas Outlet Tube, with an intermediate layer of Insulation 766 between these ends to reduce heat transfer from the hot Rotor Combustion Gas Outlet Tube to the cooler Outlet Support Body.

The Coolant Fluid is cooled in the Exterior Rotor Integrated Coolant Cooler that is mounted off of the Cold End Air Inlet 768 by three Cold End Inlet Bridging Struts 770, each of which transports either Fuel or Coolant Fluid across the opening between the Cold End Air Inlet and the Exterior Rotor Integrated Coolant Cooler.

The Coolant Fluid passes to the Exterior Rotor Integrated Coolant Cooler through one of the Cold End Inlet Bridging Struts entering one side of the Inner End Coolant Distribution Manifold 772 and flows axially away from the Cold End Rotor Air Inlet through a plurality of Outwards Axial Cooling Tubes 774 that are cooled by a plurality of Annular Heat Transfer Fins 776 coaxial with the Rotor Axis before flowing into a Connecting Coolant Gallery 778 and then flowing axially back towards the Cold End Rotor Air Inlet through a plurality of Inwards Axial Cooling Tubes 780 that are also cooled by the Annular Heat Transfer Fins to arrive at the other side of the Inner End Coolant Distribution Manifold 782 and travelling back across the opening between the Exterior Rotor Integrated Coolant Cooler and the Cold End Air Inlet in another Cold End Inlet Bridging Strut. Air is drawn into the Exterior Rotor Integrated Coolant Cooler and blown radially outwards through the Annular Heat Transfer Fins by Radial Inducer Blades 784 that also stiffen the Exterior Rotor Integrated Coolant Cooler. Near the axial centre of the Exterior Rotor Integrated Coolant Cooler is a Coolant Fluid Reservoir 786 that is at a smaller radius than the Coolant Fluid circulating within the Rotor and Exterior Rotor Integrated Coolant Cooler and compensates for changes in the volume of the Coolant Fluid circulating within the Rotor during operation by altering the volume of Coolant Fluid within the Coolant Fluid Reservoir. Fuel enters the Rotor through Fuel Inlet 788, passing through the Cold End Roller Bearing 790 and then through one of the Cold End Inlet Bridging Struts 792 to the Cold End Air Inlet.

A plurality of small Inlet Fluid Connecting Passages 794 distributed around the circumference of the wall of the Cold End Air Inlet extend axially through the smallest internal diameter section of the Cold End Air Inlet directly inside the Rotor Vacuum Seal 796, each connecting between one of the three Exterior Fluid Collecting Manifolds 798 and one of the three corresponding Interior Fluid Collecting Manifolds 800 distributed around the circumference of the Cold End Air Inlet. Each of the three Exterior Fluid Collecting Manifolds is in direct fluid connection with one of the three Cold End Inlet Bridging Struts, while the three Interior Fluid Collecting Manifolds are each connected to one of; the Coolant Fluid Distribution Manifold that distributes colder Coolant Fluid to Cooling Tubes within the Tensile Structure; the Coolant Fluid Collection Manifold that collects hotter Coolant Fluid from Cooling Tubes within the Tensile Structure; the Radial Fuel Delivery Tube 802 that transports Fuel within the Tensile Structure to the Fuel Injector 804.

FIG. 31 is an enlarged detail view of the FIG. 30 isometric Rotor cross section that shows the radially overlapping Foil Rings 722 bonded to the Cooled Inner Wall 806 of the Compression Passage that protects the Rotor Structure 720 from being over-heated. The Cooled Inner Wall is cooled by Cooling Tubes (not visible in FIG. 30-32) bonded to its outer surface within the Rotor Structure. The radially overlapping Foil Rings are connected at their radial innermost end to the Cooled Inner Wall and in operation are typically pressed against the next Foil Ring at their radial outermost end by the centrifugal reaction forces acting upon each Foil Ring. Spacing Protuberances 810 formed as part of the Cooled Inner Wall help to maintain Insulating Air Gaps 812 along the majority of the length of each Foil Ring even when there are centrifugal reaction forces trying to press the Foil Rings against the Cooled Inner Wall and close the Insulating Air Gaps. The Foil Rings may be distinct parts that are bonded to the Cooled Inner Wall during manufacturing or a portion of their length at the radially inner end of each ring may also form part or all of the Cooled Inner Wall.

FIG. 32 is an enlarged detail view of the FIG. 30 isometric Rotor cross section that shows the Fluid Connecting Passages 794 in the wall of the Cold End Air Inlet 768 at the minimum diameter point where the Cold End Air Inlet passes through the Rotor Vacuum Seal 796. The air flowing through the inner diameter of the Rotary Vacuum Seal provides cooling of the Barrier Liquid in the seal by conduction through the metal and convection from the metal to the air entering the Rotor. The Fluid Connecting Passages connect each of the three Interior Fluid Collecting Manifolds 800 distributed about the Rotor Axis to their respective Exterior Fluid Collecting Manifolds 798 similarly distributed about the Rotor Axis that each deliver or receive a fluid to or from one of the Cold End Inlet Bridging Struts 770.

Figure 33:
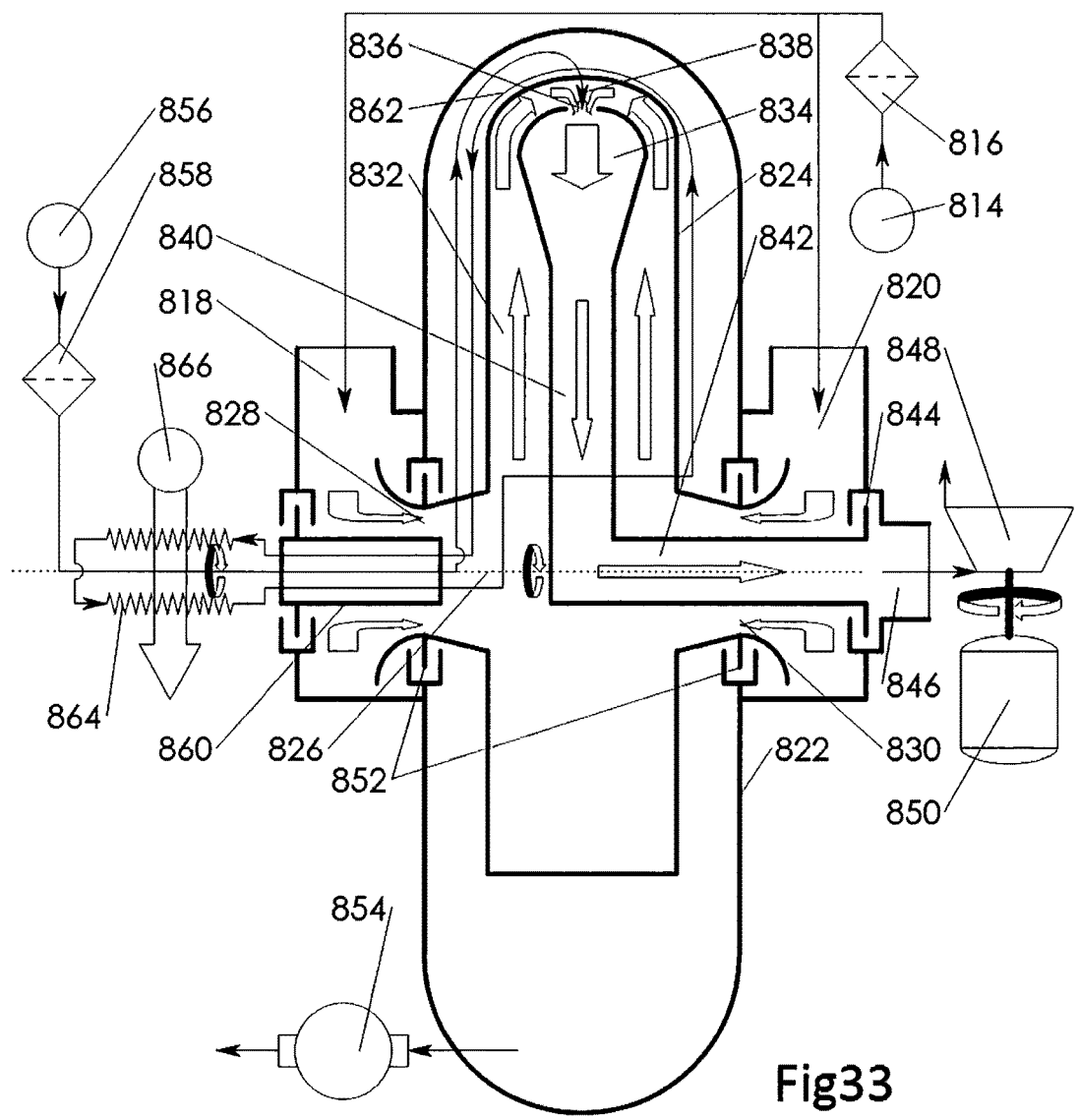
FIG. 33 shows a simplified flow diagram and cross-section of an Engine of the current invention that omits much detail and some components to improve clarity and shows the general configuration of fluid flows within the Rotor of the Engine.

FIG. 33 is a simplified flow diagram and cross-section of an Engine of the current invention that omits much detail and some components to improve clarity and shows the general configuration of fluid flows within the Rotor of the Engine.

Air from an Air Inlet 814 flows through an Air Filter 816 to remove particulate matter from the air and then flows in parallel to a Cold End Inlet Manifold 818 and a Hot End Inlet Manifold 820 that are mounted on each end of an evacuated Rotor Casing 822 within which the Rotor 824 rotates at high speed about the Rotor Axis 826 driven by a rotor torque providing means such as an electric motor that is not shown. The Inlet Manifolds deliver the Air to enter the Rotor in parallel through the Cold End Rotor Inlet 828 and the Hot End Rotor Inlet 830. The Air then flows in parallel through one or more Compression Passage(s) 832 within the Rotor radially outwards from the Rotor Axis out to and around one or more Combustion Chamber(s) near the maximum radius of the Rotor from the Rotor Axis. The Air undergoes compression while flowing radially outwards and heats up as a result before entering the Combustion Chamber/s through the Combustion Chamber Air Inlet 836 where it is then heated by combustion with Fuel introduced to the Combustion Chamber by the Fuel Injector 838 to produce hotter and therefore less dense Combustion Gases compared to the relatively cooler Air entering the Combustion Chamber/s. The hot Combustion Gases then undergo expansion as they flow radially towards the Rotor Axis from each Combustion Chamber through a complementary Expansion Passage 840 reducing in pressure, temperature and density as they expand. The Combustion Gases are hotter than the air undergoing compression, resulting in a smaller pressure drop as they expand towards the Rotor Axis than what the Air flowing from the Rotor Air Inlets towards the Combustion Chamber gains. This creates an overall pressure gain for the partially expanded Combustion Gases at the Rotor Axis compared to the Air at the Rotor Air Inlets. The hot Combustion Gases then flow out of the Rotor by means of the Combustion Gas Outlet Tube 842 that passes through the centre of the Hot End Rotor Inlet and then through a Combustion Gas Outlet Rotary Seal 844 and into the Combustion Gas Outlet Manifold 846 from where they enter the External Turbine 848 that extracts mechanical work from the remaining expansion of the Combustion Gases to drive the External Generator 850.

The partially evacuated interior of the Rotor Casing reduces the Windage power loss of the fast spinning Rotor to acceptably low values and has its low pressure maintained by Vacuum Pump 854. Rotor Vacuum Seals 852 provide rotary sealing between the Rotor and the Rotor Casing to allow fluids to pass to and from the Rotor through the axial ends of the Rotor in fluid isolation from the partially evacuated interior of the Rotor Casing.

A Fuel Supply 856 supplies Fuel to the Rotor through a Fuel Filter 858 that removes any particulates and in the case of gaseous fuels is at sufficient pressure to overcome Air pressure within the Combustion Chamber. The Fuel passes into the Rotor through a Rotary Coupling on the Cold End Fluid Transfer Shaft 860 that is part of the Rotor and extends out through the Cold End Inlet Manifold.

A Coolant Fluid is used to cool the Tensile Structure of the Rotor and circulates through a Coolant Fluid Circuit within the Rotor driven by a centrifugal thermosiphon created by the heating and expansion of the of the Coolant Fluid within the Cooling Tubes 862 embedded within the Tensile Structure surrounding the Compression Passage/s and near the Combustion Chamber/s and then cooling and contraction of the coolant fluid at smaller radial distance from the Rotor Axis in an Exterior Rotor Integrated Coolant Cooler 864 that is part of the Rotor, with the heat energy being transferred in this Exterior Rotor Integrated Coolant Cooler from the Coolant Fluid to a Heat Sink Fluid 866 of which Air is a preferred example.

It will be appreciated by those skilled in the art that many of the individual features and elements described in various preferred embodiments may also be usefully applied in other embodiments.

The invention claimed is:

1. A rotor assembly for an engine, comprising:
  a rotor, supported on one or more bearings configured to allow the rotor to rotate about a rotor axis, a portion of the rotor forming at least one compression passage that extends outwards from the rotor axis, wherein inlet gases entering the rotor through one or more rotor gas inlets at or near the rotor axis and flowing outwards from the one or more rotor gas inlets through the at least one compression passage undergoing compression as the rotor rotates;
  one or more combustion chambers located and supported within the at least one compression passage at or near a maximum radius of the rotor from the rotor axis, the one or more combustion chambers having a closed radially outermost end and one or more combustion chamber gases inlets distributed around the one or more combustion chambers through which the inlet gases enter the one or more combustion chambers, the one or more combustion chambers further having at least one fuel inlet adapted to allow fuel to enter the one or more combustion chambers and therein mix and combust; and
  one or more expansion passages in fluidic connection with and extending radially inwards from the one or more combustion chambers within the at least one compression passage and fluidically connecting at or near the rotor axis to a combustion gas outlet tube that extends along the rotor axis, in use combustion gases created by combustion of the fuel with the inlet gases within the one or more combustion chambers expanding and flow radially inwards through the one or more expansion passages;

the rotor assembly configured so that fuel is injected into the one or more combustion chambers at a smaller radius than the gases inlets of the one or more combustion chambers.

2. A rotor assembly as claimed in claim 1 wherein an outer surface of an outer end of the one or more combustion chambers incorporate external grooves through which the inlet gases flow to the one or more combustion chamber gases inlets.

3. A rotor assembly as claimed in claim 1 wherein the one or more combustion chambers have a plurality of combustion chamber gases inlets spaced about the one or more combustion chambers at approximately constant radius from the rotor axis.

4. A rotor assembly as claimed in claim 1 wherein the one or more combustion chambers further comprises a thermally insulating layer on part or whole of an inner surface of an outer end of the one or more combustion chambers.

5. A rotor assembly as claimed in claim 1 wherein the one or more combustion chambers have a domed outermost end.

6. A rotor assembly as claimed in claim 5 wherein an inner end of the one or more combustion chambers transition from the domed outermost end into the one or more expansion passages of smaller cross sectional area than a maximum cross sectional area of the one or more combustion chambers.

7. A rotor assembly as claimed in claim 5 wherein the one or more compression passages and the one or more expansion passages are substantially radially aligned.

8. A rotor assembly as claimed in claim 1 wherein the one or more combustion chambers is at least partly formed from a ceramic material.

9. A rotor assembly as claimed in claim 8 wherein the one or more combustion chambers is at least partly formed from at least one of: Silicon Carbide, Silicon Nitride, Mullite, Alumina.

10. A rotor assembly as claimed in claim 1 wherein the portion of the rotor that forms the at least one compression passage is formed at least partially from a fibre reinforced polymer composite.

11. A rotor assembly as claimed in claim 1 wherein at least a radially outermost portion of the at least one compression passage comprises a metallic inner liner.

12. A rotor assembly as claimed in claim 11 wherein the metallic inner liner is formed from one or more layers of radially overlapping foil rings that are bonded at a radial innermost end to the metallic inner liner of the at least one compression passage.

13. A rotor assembly as claimed in claim 11 wherein a plurality of coolant flow passages are embedded within a wall of the at least one compression passage to form a coolant fluid manifold, the plurality of coolant flow passages extend along the at least one compression passage and over and around an outer end of the at least one compression passage and supported by a fibre reinforced polymer composite.

14. A rotor assembly as claimed in claim 13 wherein the plurality of coolant flow passages are bonded to the metallic inner liner of the at least one compression passage.

15. A rotor assembly as claimed in claim 11 wherein a plurality of inner liner anchors that engage within an encasing fibre reinforcing polymer composite tensile structure are bonded to and distributed over an outer surface of the metallic inner liner, the plurality of inner liner anchors configured to provide structural support to the components to which the plurality of inner liner anchors are bonded.

16. A rotor assembly as claimed in claim 1 wherein the rotor has a single combustion chamber, and a counterweight element diametrically opposite the combustion chamber, an outermost radius of the counterweight element less than a maximum rotor radius.

17. A rotor assembly as claimed in claim 1 wherein the rotor assembly further comprises a rotor casing that forms a shell of revolution within which the rotor rotates, the rotor casing having one or more rotor casing openings at one or both axial ends of the rotor casing on the rotor axis.

18. A rotor assembly as claimed in claim 17 wherein the rotor casing is filled with a rotor casing gas with low density relative to an ambient atmosphere surrounding the rotor casing, the rotor casing gas being maintained in partial or complete fluid isolation from the ambient atmosphere during rotor operation by one or more rotor vacuum seals that provide a rotating seal between the rotor and the rotor casing at or near the one or more rotor casing openings.

19. A rotor assembly as claimed in claim 18 wherein the one or more rotor vacuum seals is of a barrier liquid type.

20. A rotor assembly as claimed in claim 19 wherein the one or more rotor vacuum seals is a dynamic seal located between the rotor casing and the rotor, the rotor casing further comprising an annular cavity within which at least part of the one or more rotor vacuum seals rotate with clearance, the annular cavity at least partially filled with a barrier liquid.

21. A rotor assembly as claimed in claim 18 wherein the one or more rotor vacuum seals incorporate a gas lubricated face seal.

22. A rotor assembly as claimed in claim 18 wherein the one or more rotor gas inlets are configured to have a minimum flow area at or near the one or more rotor vacuum seals.

23. A rotor assembly as claimed in claim 22 wherein the one or more rotor gas inlets further comprises an inlet diffuser downstream of the minimum flow area.

24. A rotor assembly as claimed in claim 17 wherein the rotor casing has a vacuum pump inlet configured for attachment to a vacuum pump so that any gases inside the rotor casing may be evacuated.

25. A rotor assembly as claimed in claim 17 wherein at least part of an outer end of the combustion gas outlet tube extends into or forms part of a combustion gas outlet.

26. A rotor assembly as claimed in claim 25 wherein the combustion gas outlet tube is concentrically located within the one or more rotor gas inlets.

27. A rotor assembly as claimed in claim 26 wherein the rotor has two rotor gas inlets, the combustion gas outlet tube passing through one of the two rotor gas inlets.

28. A rotor assembly as claimed in claim 1 further comprising at least one polymer composite tensile structure configured to encase the one or more combustion chambers within a radially outermost end of the at least one compression passage.

29. A rotor assembly as claimed in claim 28 wherein the polymer composite tensile structure further comprises one or more cooling tubes in contact with or embedded within the polymer composite tensile structure through which a coolant fluid flows in use.

30. A rotor assembly as claimed in claim 17 wherein the rotor assembly further comprises a coolant fluid manifold within the rotor, configured so that in use a coolant fluid can circulate around the coolant fluid manifold to cool rotor components.

31. A rotor assembly as claimed in claim 30 wherein the rotor assembly further comprises an off-rotor coolant cooler external to the rotor, in use the coolant fluid exiting the rotor and entering the off-rotor coolant cooler so as to be at least partially cooled.

32. A rotor assembly as claimed in claim 30 further comprising an exterior rotor integrated coolant cooler configured to cool the coolant fluid in use.

33. A rotor assembly as claimed in claim 1 wherein the rotor assembly further comprises an internal intercooler located either radially inwards of or within the at least one compression passage, the internal intercooler configured to cool the inlet gases over a span of radii as the inlet gases undergo compression while flowing generally radially outwards from the rotor axis.

34. A rotor assembly as claimed in claim 33 wherein the rotor assembly comprises a single rotor that contains a single combustion chamber, the internal intercooler located within the rotor so as to at least partly counterbalance a mass of the single combustion chamber and the at least one associated compression passage as the internal intercooler rotates about the rotor axis.

35. A rotor assembly as claimed in claim 1 wherein the rotor assembly further comprises a motor connected to the rotor and configured to spin the rotor up to a desired speed on initial startup in use.

36. A rotor assembly as claimed in claim 35 wherein the motor is an electric motor.

37. A rotor assembly as claimed in claim 1 wherein the rotor assembly further comprises an external compressor adapted to compress the inlet gases prior to the inlet gases entering the rotor.

38. A rotor assembly as claimed in claim 37 wherein the rotor assembly further comprises an external intercooler located between the external compressor and the one or more rotor gas inlets, the external intercooler configured to cool the inlet gases before entering the rotor.

39. A rotor assembly as claimed in claim 1 wherein the rotor assembly further comprises at least one external inlet gases filter configured to filter the inlet gases before the inlet gases enter the rotor.

40. A rotor assembly as claimed in claim 1 wherein the rotor assembly further comprises an external turbine, the combustion gas outlet tube configured to supply the combustion gases created within the rotor to the external turbine wherein the combustion gases may be expanded to supply mechanical power to a load.

41. A rotor assembly as claimed in claim 1 wherein the combustion gas outlet tube further comprises one or more torque producing nozzles that are configured to impart mass-specific angular momentum to the combustion gases to create a reaction torque upon the rotor that at least partially drives the rotor's rotation.

42. A rotor assembly as claimed in claim 17 wherein the one or more bearings are mounted between the rotor casing or an extension from the rotor casing and the rotor to support the rotor for rotation about the rotor axis.

43. A rotor assembly as claimed in claim 42 wherein the rotor further comprises one or more autobalancers configured so that in operation at rotor angular frequencies above a fundamental natural frequency of radial oscillation the one or more autobalancers will tend to move a centre of mass of the rotor towards the rotor axis.

44. An engine containing a rotor assembly as claimed in claim 1 wherein the rotor assembly further comprises an external turbine, atmospheric gases expanded through the external turbine to reduce pressure prior to entry into the rotor.

45. A rotor assembly for an engine, comprising:
a rotor, supported on one or more bearings configured to allow the rotor to rotate about a rotor axis, a portion of the rotor forming at least one compression passage that extends outwards from the rotor axis, wherein inlet gases entering the rotor through rotor gas inlets at or near the rotor axis and flowing outwards from the rotor gases inlets through the one or more compression passages undergoing compression as the rotor rotates;
one or more combustion chambers located and supported within the at least one compression passage at or near a maximum radius of the rotor from the rotor axis, the one or more combustion chambers having a closed radially outermost end and one or more combustion chamber gases inlets distributed around the one or more combustion chambers through which the inlet gases enter the one or more combustion chambers, the one or more combustion chambers further having at least one fuel inlet adapted to allow fuel to enter the one or more combustion chambers and therein mix and combust; and
one or more expansion passages in fluidic connection with and extending radially inwards from the one or more combustion chambers within the at least one compression passage and fluidically connecting at or near the rotor axis to a combustion gas outlet tube that extends along the rotor axis, in use combustion gases created by combustion of the fuel with the inlet gases within the one or more combustion chambers expanding and flow radially inwards through the one or more expansion passages;
a radially outer section of the one or more expansion passages formed as part of the one or more combustion chambers, a radially inner section of the one or more expansion passages formed separately to the radially outer section of the one or more expansion passages and fluidically connected to the radially outer section by a radial expansion joint that accommodates relative radial motion between the radially inner section and the radially outer section while also providing a partial or complete fluid seal to thereby restrict combustion gas leakage into the at least one compression passage.

46. A rotor assembly as claimed in claim 45 wherein at least an inner surface of the radially outer section of the one or more expansion passages tapers inwards towards the rotor axis over at least some portion of a radial extent of the inner surface.

47. A rotor assembly for an engine, comprising:
a rotor, supported on one or more bearings configured to allow the rotor to rotate about a rotor axis, a portion of the rotor forming at least one compression passage that extends outwards from the rotor axis, wherein inlet gases entering the rotor through rotor gas inlets at or near the rotor axis and flowing outwards from the rotor gases inlets through the one or more compression passages undergoing compression as the rotor rotates;
one or more combustion chambers located and supported within the at least one compression passage at or near a maximum radius of the rotor from the rotor axis, the one or more combustion chambers having a closed radially outermost end and one or more combustion chamber gases inlets distributed around the one or more combustion chambers through which the inlet gases enter the one or more combustion chambers, the one or more combustion chambers further having at least one fuel inlet adapted to allow fuel to enter the one or more combustion chambers and therein mix and combust; and one or more expansion passages in fluidic connection with and extending radially inwards from the one or more combustion chambers within the at least one compression passage and fluidically connecting at or near the rotor axis to a combustion gas outlet tube that extends along the rotor axis, in use combustion gases created by combustion of the fuel with the inlet gases within the one or more combustion chambers expanding and flow radially inwards through the one or more expansion passages;

wherein the one or more combustion chambers or the one or more associated expansion passages or both further comprise multiple small orifices or porous walls, configured so that the inlet gases and/or the fuel can be injected through the multiple small orifices or porous walls to in use partially or wholly transpiration cool the one or more combustion chambers or the one or more expansion passages or both.

\* \* \* \* \*